(12) United States Patent
Kim

(10) Patent No.: US 10,453,443 B2
(45) Date of Patent: Oct. 22, 2019

(54) PROVIDING AN INDICATION OF THE SUITABILITY OF SPEECH RECOGNITION

(71) Applicant: Apple Inc., Cupertino, CA (US)

(72) Inventor: Yoon Kim, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/109,546

(22) Filed: Aug. 22, 2018

(65) Prior Publication Data

US 2018/0366105 A1    Dec. 20, 2018

Related U.S. Application Data

(63) Continuation of application No. 14/834,239, filed on Aug. 24, 2015, now Pat. No. 10,074,360.
(Continued)

(51) Int. Cl.
*H04R 29/00* (2006.01)
*G10L 15/01* (2013.01)
(Continued)

(52) U.S. Cl.
CPC .............. *G10L 15/01* (2013.01); *G10L 15/22* (2013.01); *G10L 25/60* (2013.01); *H04R 29/008* (2013.01)

(58) Field of Classification Search
CPC ....... G10L 15/20; G10L 15/065; G10L 15/02; G10L 15/08; G10L 25/78; G10L 15/26;
(Continued)

(56) References Cited

U.S. PATENT DOCUMENTS 7,315,809 B2    1/2008  Xun
7,315,818 B2    1/2008  Stevens et al.
(Continued)

FOREIGN PATENT DOCUMENTS

AU    2015203483 A1    7/2015
CA    2694314 A1    8/2010
(Continued)

OTHER PUBLICATIONS

"Alexa, Turn Up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.
(Continued)

*Primary Examiner* — Norman Yu
(74) *Attorney, Agent, or Firm* — Dentons US LLP

(57) ABSTRACT

This relates to providing an indication of the suitability of an acoustic environment for performing speech recognition. One process can include receiving an audio input and determining a speech recognition suitability based on the audio input. The speech recognition suitability can include a numerical, textual, graphical, or other representation of the suitability of an acoustic environment for performing speech recognition. The process can further include displaying a visual representation of the speech recognition suitability to indicate the likelihood that a spoken user input will be interpreted correctly. This allows a user to determine whether to proceed with the performance of a speech recognition process, or to move to a different location having a better acoustic environment before performing the speech recognition process. In some examples, the user device can disable operation of a speech recognition process in response to determining that the speech recognition suitability is below a threshold suitability.

54 Claims, 9 Drawing Sheets

Related U.S. Application Data

(60) Provisional application No. 62/057,979, filed on Sep. 30, 2014.

(51) Int. Cl.
*G10L 25/60* (2013.01)
*G10L 15/22* (2006.01)

(58) Field of Classification Search
CPC ....... G10L 15/265; G10L 25/12; G10L 25/27; G10L 25/51; G10L 25/84; G10L 25/90; G10L 2021/02087; G10L 2021/02165; G10L 21/0272; G10L 15/01; G10L 15/22; G10L 25/60; H04R 29/008; H04R 2225/41; H04R 2225/43; H04M 2201/40; H04M 1/271; H04M 3/4936
USPC ....... 381/56, 57, 58, 306, 95, 110, 108, 122, 381/388; 704/231, 233, 275, 226, 704/E15.039, E15.001, E15.009, E11.003
See application file for complete search history.

(56) References Cited

U.S. PATENT DOCUMENTS

| | | |
|---|---|---|
| 7,318,020 B1 | 1/2008 | Kim |
| 7,319,957 B2 | 1/2008 | Robinson et al. |
| 7,321,783 B2 | 1/2008 | Kim |
| 7,322,023 B2 | 1/2008 | Shulman et al. |
| 7,324,833 B2 | 1/2008 | White et al. |
| 7,324,947 B2 | 1/2008 | Jordan et al. |
| 7,328,155 B2 | 2/2008 | Endo et al. |
| 7,328,250 B2 | 2/2008 | Wang et al. |
| 7,333,998 B2 | 2/2008 | Heckerman et al. |
| 7,337,108 B2 | 2/2008 | Florencio et al. |
| 7,345,670 B2 | 3/2008 | Armstrong |
| 7,345,671 B2 | 3/2008 | Robbin et al. |
| 7,349,953 B2 | 3/2008 | Lisitsa et al. |
| 7,353,139 B1 | 4/2008 | Burrell et al. |
| 7,356,748 B2 | 4/2008 | Taleb |
| 7,359,493 B1 | 4/2008 | Wang et al. |
| 7,359,671 B2 | 4/2008 | Richenstein et al. |
| 7,359,851 B2 | 4/2008 | Tong et al. |
| 7,360,158 B1 | 4/2008 | Beeman |
| 7,362,738 B2 | 4/2008 | Taube et al. |
| 7,363,227 B2 | 4/2008 | Mapes-Riordan et al. |
| 7,363,586 B1 | 4/2008 | Briggs et al. |
| 7,365,260 B2 | 4/2008 | Kawashima |
| 7,366,461 B1 | 4/2008 | Brown |
| 7,369,984 B2 | 5/2008 | Fairweather |
| 7,369,993 B1 | 5/2008 | Atal |
| 7,373,291 B2 | 5/2008 | Garst |
| 7,373,612 B2 | 5/2008 | Risch et al. |
| 7,376,556 B2 | 5/2008 | Bennett |
| 7,376,632 B1 | 5/2008 | Sadek et al. |
| 7,376,645 B2 | 5/2008 | Bernard |
| 7,378,963 B1 | 5/2008 | Begault et al. |
| 7,379,874 B2 | 5/2008 | Schmid et al. |
| 7,380,203 B2 | 5/2008 | Keely et al. |
| 7,383,170 B2 | 6/2008 | Mills et al. |
| 7,386,110 B2 | 6/2008 | Petrunka et al. |
| 7,386,438 B1 | 6/2008 | Franz et al. |
| 7,386,449 B2 | 6/2008 | Sun et al. |
| 7,386,799 B1 | 6/2008 | Clanton et al. |
| 7,389,224 B1 | 6/2008 | Elworthy |
| 7,389,225 B1 | 6/2008 | Jensen et al. |
| 7,392,185 B2 | 6/2008 | Bennett |
| 7,394,947 B2 | 7/2008 | Li et al. |
| 7,398,209 B2 | 7/2008 | Kennewick et al. |
| 7,401,300 B2 | 7/2008 | Nurmi |
| 7,403,938 B2 | 7/2008 | Harrison et al. |
| 7,403,941 B2 | 7/2008 | Bedworth et al. |
| 7,404,143 B2 | 7/2008 | Freelander et al. |
| 7,409,337 B1 | 8/2008 | Potter et al. |
| 7,409,347 B1 | 8/2008 | Bellegarda |
| 7,412,389 B2 | 8/2008 | Yang |
| 7,412,470 B2 | 8/2008 | Masuno et al. |
| 7,415,100 B2 | 8/2008 | Cooper et al. |
| 7,415,469 B2 | 8/2008 | Singh et al. |
| 7,418,382 B1 | 8/2008 | Maes |
| 7,418,389 B2 | 8/2008 | Chu et al. |
| 7,418,392 B1 | 8/2008 | Mozer et al. |
| 7,426,467 B2 | 9/2008 | Nashida et al. |
| 7,426,468 B2 | 9/2008 | Coifman et al. |
| 7,427,024 B1 | 9/2008 | Gazdzinski et al. |
| 7,428,541 B2 | 9/2008 | Houle |
| 7,430,508 B2 | 9/2008 | Williamson et al. |
| 7,433,869 B2 | 10/2008 | Gollapudi |
| 7,433,921 B2 | 10/2008 | Ludwig et al. |
| 7,436,947 B2 | 10/2008 | Wadler et al. |
| 7,441,184 B2 | 10/2008 | Frerebeau et al. |
| 7,443,316 B2 | 10/2008 | Lim |
| 7,444,589 B2 | 10/2008 | Zellner |
| 7,447,360 B2 | 11/2008 | Li et al. |
| 7,447,624 B2 | 11/2008 | Fuhrmann et al. |
| 7,447,635 B1 | 11/2008 | Konopka et al. |
| 7,447,637 B1 | 11/2008 | Grant et al. |
| 7,451,081 B1 | 11/2008 | Gajic et al. |
| 7,454,351 B2 | 11/2008 | Jeschke et al. |
| 7,460,652 B2 | 12/2008 | Chang |
| 7,461,043 B2 | 12/2008 | Hess |
| 7,467,087 B1 | 12/2008 | Gillick et al. |
| 7,467,164 B2 | 12/2008 | Marsh |
| 7,472,061 B1 | 12/2008 | Alewine et al. |
| 7,472,065 B2 | 12/2008 | Aaron et al. |
| 7,475,010 B2 | 1/2009 | Chao |
| 7,475,015 B2 | 1/2009 | Epstein et al. |
| 7,475,063 B2 | 1/2009 | Datta et al. |
| 7,477,238 B2 | 1/2009 | Fux et al. |
| 7,477,240 B2 | 1/2009 | Yanagisawa |
| 7,478,037 B2 | 1/2009 | Strong |
| 7,478,091 B2 | 1/2009 | Mojsilovic et al. |
| 7,478,129 B1 | 1/2009 | Chemtob |
| 7,479,948 B2 | 1/2009 | Kim et al. |
| 7,479,949 B2 | 1/2009 | Jobs et al. |
| 7,483,832 B2 | 1/2009 | Tischer |
| 7,483,894 B2 | 1/2009 | Cao |
| 7,487,089 B2 | 2/2009 | Mozer |
| 7,487,093 B2 | 2/2009 | Mutsuno et al. |
| 7,490,034 B2 | 2/2009 | Finnigan et al. |
| 7,490,039 B1 | 2/2009 | Shaffer et al. |
| 7,493,251 B2 | 2/2009 | Gao et al. |
| 7,493,560 B1 | 2/2009 | Kipnes et al. |
| 7,496,498 B2 | 2/2009 | Chu et al. |
| 7,496,512 B2 | 2/2009 | Zhao et al. |
| 7,499,923 B2 | 3/2009 | Kawatani |
| 7,502,738 B2 | 3/2009 | Kennewick et al. |
| 7,505,795 B1 | 3/2009 | Lim et al. |
| 7,508,324 B2 | 3/2009 | Suraqui |
| 7,508,373 B2 | 3/2009 | Lin et al. |
| 7,516,123 B2 | 4/2009 | Betz et al. |
| 7,519,327 B2 | 4/2009 | White |
| 7,519,398 B2 | 4/2009 | Hirose |
| 7,522,927 B2 | 4/2009 | Fitch et al. |
| 7,523,036 B2 | 4/2009 | Akabane et al. |
| 7,523,108 B2 | 4/2009 | Cao |
| 7,526,466 B2 | 4/2009 | Au |
| 7,526,738 B2 | 4/2009 | Ording et al. |
| 7,528,713 B2 | 5/2009 | Singh et al. |
| 7,529,671 B2 | 5/2009 | Rockenbeck et al. |
| 7,529,676 B2 | 5/2009 | Koyama |
| 7,535,997 B1 | 5/2009 | McQuaide, Jr. et al. |
| 7,536,029 B2 | 5/2009 | Choi et al. |
| 7,536,565 B2 | 5/2009 | Girish et al. |
| 7,538,685 B1 | 5/2009 | Cooper et al. |
| 7,539,619 B1 | 5/2009 | Seligman et al. |
| 7,539,656 B2 | 5/2009 | Fratkina et al. |
| 7,541,940 B2 | 6/2009 | Upton |
| 7,542,967 B2 | 6/2009 | Hurst-Hiller et al. |
| 7,542,971 B2 | 6/2009 | Thione et al. |
| 7,543,232 B2 | 6/2009 | Easton, Jr. et al. |
| 7,546,382 B2 | 6/2009 | Healey et al. |
| 7,546,529 B2 | 6/2009 | Reynar et al. |
| 7,548,895 B2 | 6/2009 | Pulsipher |

(56) References Cited

U.S. PATENT DOCUMENTS

| | | |
|---|---|---|
| 7,552,045 B2 | 6/2009 | Barliga et al. |
| 7,552,055 B2 | 6/2009 | Lecoeuche |
| 7,555,431 B2 | 6/2009 | Bennett |
| 7,555,496 B1 | 6/2009 | Lantrip et al. |
| 7,558,381 B1 | 7/2009 | Ali et al. |
| 7,558,730 B2 | 7/2009 | Davis et al. |
| 7,559,026 B2 | 7/2009 | Girish et al. |
| 7,561,069 B2 | 7/2009 | Horstemeyer |
| 7,562,007 B2 | 7/2009 | Hwang |
| 7,562,032 B2 | 7/2009 | Abbosh et al. |
| 7,565,104 B1 | 7/2009 | Brown et al. |
| 7,565,380 B1 | 7/2009 | Venkatachary |
| 7,568,151 B2 | 7/2009 | Bargeron et al. |
| 7,571,092 B1 | 8/2009 | Nieh |
| 7,571,106 B2 | 8/2009 | Cao et al. |
| 7,577,522 B2 | 8/2009 | Rosenberg |
| 7,580,551 B1 | 8/2009 | Srihari et al. |
| 7,580,576 B2 | 8/2009 | Wang et al. |
| 7,580,839 B2 | 8/2009 | Tamura et al. |
| 7,584,092 B2 | 9/2009 | Brockett et al. |
| 7,584,093 B2 | 9/2009 | Potter et al. |
| 7,584,278 B2 | 9/2009 | Rajarajan et al. |
| 7,584,429 B2 | 9/2009 | Fabritius |
| 7,593,868 B2 | 9/2009 | Margiloff et al. |
| 7,596,269 B2 | 9/2009 | King et al. |
| 7,596,499 B2 | 9/2009 | Anguera et al. |
| 7,596,606 B2 | 9/2009 | Codignotto |
| 7,596,765 B2 | 9/2009 | Almas |
| 7,599,918 B2 | 10/2009 | Shen et al. |
| 7,603,349 B1 | 10/2009 | Kraft et al. |
| 7,603,381 B2 | 10/2009 | Burke et al. |
| 7,606,444 B1 | 10/2009 | Erol et al. |
| 7,607,083 B2 | 10/2009 | Gong et al. |
| 7,609,179 B2 | 10/2009 | Diaz-Gutierrez et al. |
| 7,610,258 B2 | 10/2009 | Yuknewicz et al. |
| 7,613,264 B2 | 11/2009 | Wells et al. |
| 7,614,008 B2 | 11/2009 | Ording |
| 7,617,094 B2 | 11/2009 | Aoki et al. |
| 7,620,407 B1 | 11/2009 | Donald et al. |
| 7,620,549 B2 | 11/2009 | Di Cristo et al. |
| 7,620,894 B1 | 11/2009 | Kahn |
| 7,623,119 B2 | 11/2009 | Autio et al. |
| 7,624,007 B2 | 11/2009 | Bennett |
| 7,627,481 B1 | 12/2009 | Kuo et al. |
| 7,630,900 B1 | 12/2009 | Strom |
| 7,630,901 B2 | 12/2009 | Omi |
| 7,633,076 B2 | 12/2009 | Huppi et al. |
| 7,634,409 B2 | 12/2009 | Kennewick et al. |
| 7,634,413 B1 | 12/2009 | Kuo et al. |
| 7,634,718 B2 | 12/2009 | Nakajima |
| 7,634,732 B1 | 12/2009 | Blagsvedt et al. |
| 7,636,657 B2 | 12/2009 | Ju et al. |
| 7,640,158 B2 | 12/2009 | Detlef et al. |
| 7,640,160 B2 | 12/2009 | Di Cristo et al. |
| 7,643,990 B1 | 1/2010 | Bellegarda |
| 7,647,225 B2 | 1/2010 | Bennett et al. |
| 7,649,454 B2 | 1/2010 | Singh et al. |
| 7,649,877 B2 | 1/2010 | Vieri et al. |
| 7,653,883 B2 | 1/2010 | Hotelling et al. |
| 7,656,393 B2 | 2/2010 | King et al. |
| 7,657,424 B2 | 2/2010 | Bennett |
| 7,657,828 B2 | 2/2010 | Lucas et al. |
| 7,657,844 B2 | 2/2010 | Gibson et al. |
| 7,657,849 B2 | 2/2010 | Chaudhri et al. |
| 7,660,715 B1 | 2/2010 | Thambiratnam |
| 7,663,607 B2 | 2/2010 | Hotelling et al. |
| 7,664,558 B2 | 2/2010 | Lindahl et al. |
| 7,664,638 B2 | 2/2010 | Cooper et al. |
| 7,668,710 B2 | 2/2010 | Doyle |
| 7,669,134 B1 | 2/2010 | Christie et al. |
| 7,672,841 B2 | 3/2010 | Bennett |
| 7,672,952 B2 | 3/2010 | Isaacson et al. |
| 7,673,238 B2 | 3/2010 | Girish et al. |
| 7,673,251 B1 | 3/2010 | Wibisono |
| 7,673,340 B1 | 3/2010 | Cohen et al. |
| 7,676,026 B1 | 3/2010 | Baxter, Jr. |
| 7,676,365 B2 | 3/2010 | Hwang et al. |
| 7,676,463 B2 | 3/2010 | Thompson et al. |
| 7,679,534 B2 | 3/2010 | Kay et al. |
| 7,680,649 B2 | 3/2010 | Park |
| 7,681,126 B2 | 3/2010 | Roose |
| 7,683,886 B2 | 3/2010 | Willey |
| 7,683,893 B2 | 3/2010 | Kim |
| 7,684,985 B2 | 3/2010 | Dominach et al. |
| 7,684,990 B2 | 3/2010 | Caskey et al. |
| 7,684,991 B2 | 3/2010 | Stohr et al. |
| 7,689,245 B2 | 3/2010 | Cox et al. |
| 7,689,408 B2 | 3/2010 | Chen et al. |
| 7,689,409 B2 | 3/2010 | Heinecke |
| 7,689,412 B2 | 3/2010 | Wu et al. |
| 7,689,421 B2 | 3/2010 | Li et al. |
| 7,693,715 B2 | 4/2010 | Hwang et al. |
| 7,693,717 B2 | 4/2010 | Kahn et al. |
| 7,693,719 B2 | 4/2010 | Chu et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,703,091 B1 | 4/2010 | Martin et al. |
| 7,706,510 B2 | 4/2010 | Ng |
| 7,707,026 B2 | 4/2010 | Liu |
| 7,707,027 B2 | 4/2010 | Balchandran et al. |
| 7,707,032 B2 | 4/2010 | Wang et al. |
| 7,707,221 B1 | 4/2010 | Dunning et al. |
| 7,707,226 B1 | 4/2010 | Tonse |
| 7,707,267 B2 | 4/2010 | Lisitsa et al. |
| 7,710,262 B2 | 5/2010 | Ruha |
| 7,711,129 B2 | 5/2010 | Lindahl et al. |
| 7,711,550 B1 | 5/2010 | Feinberg et al. |
| 7,711,565 B1 | 5/2010 | Gazdzinski |
| 7,711,672 B2 | 5/2010 | Au |
| 7,712,053 B2 | 5/2010 | Bradford et al. |
| 7,716,056 B2 | 5/2010 | Weng et al. |
| 7,716,216 B1 | 5/2010 | Harik et al. |
| 7,720,674 B2 | 5/2010 | Kaiser et al. |
| 7,720,683 B1 | 5/2010 | Vermeulen et al. |
| 7,721,226 B2 | 5/2010 | Barabe et al. |
| 7,721,301 B2 | 5/2010 | Wong et al. |
| 7,724,242 B2 | 5/2010 | Hillis et al. |
| 7,724,696 B1 | 5/2010 | Parekh |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,725,838 B2 | 5/2010 | Williams |
| 7,729,904 B2 | 6/2010 | Bennett |
| 7,729,916 B2 | 6/2010 | Coffman et al. |
| 7,734,461 B2 | 6/2010 | Kwak et al. |
| 7,735,012 B2 | 6/2010 | Naik |
| 7,739,588 B2 | 6/2010 | Reynar et al. |
| 7,742,953 B2 | 6/2010 | King et al. |
| 7,743,188 B2 | 6/2010 | Haitani et al. |
| 7,747,616 B2 | 6/2010 | Yamada et al. |
| 7,752,152 B2 | 7/2010 | Paek et al. |
| 7,756,707 B2 | 7/2010 | Garner et al. |
| 7,756,708 B2 | 7/2010 | Cohen et al. |
| 7,756,868 B2 | 7/2010 | Lee |
| 7,756,871 B2 | 7/2010 | Yacoub et al. |
| 7,757,173 B2 | 7/2010 | Beaman |
| 7,757,182 B2 | 7/2010 | Elliott et al. |
| 7,761,296 B1 | 7/2010 | Bakis et al. |
| 7,763,842 B2 | 7/2010 | Hsu et al. |
| 7,774,202 B2 | 8/2010 | Spengler et al. |
| 7,774,204 B2 | 8/2010 | Mozer et al. |
| 7,774,388 B1 | 8/2010 | Runchey |
| 7,777,717 B2 | 8/2010 | Fux et al. |
| 7,778,432 B2 | 8/2010 | Larsen |
| 7,778,595 B2 | 8/2010 | White et al. |
| 7,778,632 B2 | 8/2010 | Kurlander et al. |
| 7,778,830 B2 | 8/2010 | Davis et al. |
| 7,779,353 B2 | 8/2010 | Grigoriu et al. |
| 7,779,356 B2 | 8/2010 | Griesmer |
| 7,779,357 B2 | 8/2010 | Naik |
| 7,783,283 B2 | 8/2010 | Kuusinen et al. |

(56) References Cited

U.S. PATENT DOCUMENTS

| | | |
|---|---|---|
| 7,783,486 B2 | 8/2010 | Rosser et al. |
| 7,788,590 B2 | 8/2010 | Taboada et al. |
| 7,788,663 B2 | 8/2010 | Illowsky et al. |
| 7,796,980 B1 | 9/2010 | McKinney et al. |
| 7,797,265 B2 | 9/2010 | Brinker et al. |
| 7,797,269 B2 | 9/2010 | Rieman et al. |
| 7,797,331 B2 | 9/2010 | Theimer et al. |
| 7,797,629 B2 | 9/2010 | Fux et al. |
| 7,801,721 B2 | 9/2010 | Rosart et al. |
| 7,801,728 B2 | 9/2010 | Ben-David et al. |
| 7,801,729 B2 | 9/2010 | Mozer |
| 7,805,299 B2 | 9/2010 | Coifman |
| 7,809,550 B1 | 10/2010 | Barrows |
| 7,809,565 B2 | 10/2010 | Coifman |
| 7,809,569 B2 | 10/2010 | Attwater et al. |
| 7,809,570 B2 | 10/2010 | Kennewick et al. |
| 7,809,610 B2 | 10/2010 | Cao |
| 7,809,744 B2 | 10/2010 | Nevidomski et al. |
| 7,818,165 B2 | 10/2010 | Carlgren et al. |
| 7,818,176 B2 | 10/2010 | Freeman et al. |
| 7,818,215 B2 | 10/2010 | King et al. |
| 7,818,291 B2 | 10/2010 | Ferguson et al. |
| 7,818,672 B2 | 10/2010 | Mccormack et al. |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,827,047 B2 | 11/2010 | Anderson et al. |
| 7,831,246 B1 | 11/2010 | Smith et al. |
| 7,831,423 B2 | 11/2010 | Schubert |
| 7,831,426 B2 | 11/2010 | Bennett |
| 7,831,432 B2 | 11/2010 | Bodin et al. |
| 7,835,504 B1 | 11/2010 | Donald et al. |
| 7,836,437 B2 | 11/2010 | Kacmarcik et al. |
| 7,840,348 B2 | 11/2010 | Kim et al. |
| 7,840,400 B2 | 11/2010 | Levi et al. |
| 7,840,447 B2 | 11/2010 | Kleinrock et al. |
| 7,840,581 B2 | 11/2010 | Ross et al. |
| 7,840,912 B2 | 11/2010 | Elias et al. |
| 7,844,394 B2 | 11/2010 | Kim |
| 7,848,924 B2 | 12/2010 | Nurminen et al. |
| 7,848,926 B2 | 12/2010 | Goto et al. |
| 7,853,444 B2 | 12/2010 | Wang et al. |
| 7,853,445 B2 | 12/2010 | Bachenko et al. |
| 7,853,574 B2 | 12/2010 | Kraenzel et al. |
| 7,853,577 B2 | 12/2010 | Sundaresan et al. |
| 7,853,664 B1 | 12/2010 | Wang et al. |
| 7,853,900 B2 | 12/2010 | Nguyen et al. |
| 7,865,817 B2 | 1/2011 | Ryan et al. |
| 7,869,998 B1 | 1/2011 | Di Fabbrizio et al. |
| 7,869,999 B2 | 1/2011 | Amato et al. |
| 7,870,118 B2 | 1/2011 | Jiang et al. |
| 7,870,133 B2 | 1/2011 | Krishnamoorthy et al. |
| 7,873,149 B2 | 1/2011 | Schultz et al. |
| 7,873,519 B2 | 1/2011 | Bennett |
| 7,873,654 B2 | 1/2011 | Bernard |
| 7,877,705 B2 | 1/2011 | Chambers et al. |
| 7,880,730 B2 | 2/2011 | Robinson et al. |
| 7,881,283 B2 | 2/2011 | Cormier et al. |
| 7,881,936 B2 | 2/2011 | Longe et al. |
| 7,885,390 B2 | 2/2011 | Chaudhuri et al. |
| 7,885,844 B1 | 2/2011 | Cohen et al. |
| 7,886,233 B2 | 2/2011 | Rainisto et al. |
| 7,889,101 B2 | 2/2011 | Yokota |
| 7,889,184 B2 | 2/2011 | Blumenberg et al. |
| 7,889,185 B2 | 2/2011 | Blumenberg et al. |
| 7,890,330 B2 | 2/2011 | Ozkaragoz et al. |
| 7,890,652 B2 | 2/2011 | Bull et al. |
| 7,895,039 B2 | 2/2011 | Braho et al. |
| 7,895,531 B2 | 2/2011 | Radtke et al. |
| 7,899,666 B2 | 3/2011 | Varone |
| 7,904,297 B2 | 3/2011 | Mirkovic et al. |
| 7,908,287 B1 | 3/2011 | Katragadda |
| 7,912,289 B2 | 3/2011 | Kansal et al. |
| 7,912,699 B1 | 3/2011 | Saraclar et al. |
| 7,912,702 B2 | 3/2011 | Bennett |
| 7,912,720 B1 | 3/2011 | Hakkani-Tur et al. |
| 7,912,828 B2 | 3/2011 | Bonnet et al. |
| 7,913,185 B1 | 3/2011 | Benson et al. |
| 7,916,979 B2 | 3/2011 | Simmons |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,925,525 B2 | 4/2011 | Chin |
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,936,339 B2 | 5/2011 | Marggraff et al. |
| 7,936,861 B2 | 5/2011 | Martin et al. |
| 7,936,863 B2 | 5/2011 | John et al. |
| 7,937,075 B2 | 5/2011 | Zellner |
| 7,941,009 B2 | 5/2011 | Li et al. |
| 7,945,294 B2 | 5/2011 | Zhang et al. |
| 7,945,470 B1 | 5/2011 | Cohen et al. |
| 7,949,529 B2 | 5/2011 | Weider et al. |
| 7,949,534 B2 | 5/2011 | Davis et al. |
| 7,949,752 B2 | 5/2011 | Lange et al. |
| 7,953,679 B2 | 5/2011 | Chidlovskii et al. |
| 7,957,975 B2 | 6/2011 | Burns et al. |
| 7,958,136 B1 | 6/2011 | Curtis et al. |
| 7,962,179 B2 | 6/2011 | Huang |
| 7,974,835 B2 | 7/2011 | Balchandran et al. |
| 7,974,844 B2 | 7/2011 | Sumita |
| 7,974,972 B2 | 7/2011 | Cao |
| 7,975,216 B2 | 7/2011 | Woolf et al. |
| 7,983,478 B2 | 7/2011 | Liu et al. |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 | 7/2011 | Allen et al. |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,244 B1 | 7/2011 | Lewis et al. |
| 7,991,614 B2 | 8/2011 | Washio et al. |
| 7,992,085 B2 | 8/2011 | Wang-Aryattanwanich et al. |
| 7,996,228 B2 | 8/2011 | Miller et al. |
| 7,996,589 B2 | 8/2011 | Schultz et al. |
| 7,996,769 B2 | 8/2011 | Fux et al. |
| 7,996,792 B2 | 8/2011 | Anzures et al. |
| 7,999,669 B2 | 8/2011 | Singh et al. |
| 8,000,453 B2 | 8/2011 | Cooper et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,014,308 B2 | 9/2011 | Gates et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,018,431 B1 | 9/2011 | Zehr et al. |
| 8,019,271 B1 | 9/2011 | Izdepski |
| 8,019,604 B2 | 9/2011 | Ma |
| 8,020,104 B2 | 9/2011 | Robarts et al. |
| 8,024,195 B2 | 9/2011 | Mozer et al. |
| 8,024,415 B2 | 9/2011 | Horvitz et al. |
| 8,027,836 B2 | 9/2011 | Baker et al. |
| 8,031,943 B2 | 10/2011 | Chen et al. |
| 8,032,383 B1 | 10/2011 | Bhardwaj et al. |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |
| 8,042,053 B2 | 10/2011 | Darwish et al. |
| 8,046,363 B2 | 10/2011 | Cha et al. |
| 8,046,374 B1 | 10/2011 | Bromwich et al. |
| 8,050,500 B1 | 11/2011 | Batty et al. |
| 8,054,180 B1 | 11/2011 | Scofield et al. |
| 8,055,502 B2 | 11/2011 | Clark et al. |
| 8,055,708 B2 | 11/2011 | Chitsaz et al. |
| 8,056,070 B2 | 11/2011 | Goller et al. |

(56) References Cited

U.S. PATENT DOCUMENTS

| | | |
|---|---|---|
| 8,060,824 B2 | 11/2011 | Brownrigg, Jr. et al. |
| 8,064,753 B2 | 11/2011 | Freeman |
| 8,065,143 B2 | 11/2011 | Yanagihara |
| 8,065,155 B1 | 11/2011 | Gazdzinski |
| 8,065,156 B2 | 11/2011 | Gazdzinski |
| 8,068,604 B2 | 11/2011 | Leeds et al. |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,073,695 B1 | 12/2011 | Hendricks et al. |
| 8,077,153 B2 | 12/2011 | Benko et al. |
| 8,078,473 B1 | 12/2011 | Gazdzinski |
| 8,082,153 B2 | 12/2011 | Coffman et al. |
| 8,082,498 B2 | 12/2011 | Salamon et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,130,929 B2 | 3/2012 | Wilkes et al. |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,330 B2 | 3/2012 | Cevik et al. |
| 8,140,335 B2 | 3/2012 | Kennewick et al. |
| 8,140,567 B2 | 3/2012 | Padovitz et al. |
| 8,145,489 B2 | 3/2012 | Freeman et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,160,877 B1 | 4/2012 | Nucci et al. |
| 8,160,883 B2 | 4/2012 | Lecoeuche |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,166,032 B2 | 4/2012 | Sommer et al. |
| 8,170,790 B2 | 5/2012 | Lee et al. |
| 8,175,872 B2 | 5/2012 | Kristjansson et al. |
| 8,175,876 B2 | 5/2012 | Bou-Ghazale et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,190,596 B2 | 5/2012 | Nambiar et al. |
| 8,195,467 B2 | 6/2012 | Mozer et al. |
| 8,195,468 B2 | 6/2012 | Kennewick et al. |
| 8,200,489 B1 | 6/2012 | Baggenstoss |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,183 B1 | 6/2012 | Patel et al. |
| 8,213,911 B2 | 7/2012 | Williams et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,608 B2 | 7/2012 | alSafadi et al. |
| 8,224,649 B2 | 7/2012 | Chaudhari et al. |
| 8,228,299 B1 | 7/2012 | Maloney et al. |
| 8,233,919 B2 | 7/2012 | Haag et al. |
| 8,234,111 B2 | 7/2012 | Lloyd et al. |
| 8,239,206 B1 | 8/2012 | LeBeau et al. |
| 8,239,207 B2 | 8/2012 | Seligman et al. |
| 8,244,712 B2 | 8/2012 | Serlet et al. |
| 8,250,071 B1 | 8/2012 | Killalea et al. |
| 8,254,829 B1 | 8/2012 | Kindred et al. |
| 8,255,216 B2 | 8/2012 | White |
| 8,255,217 B2 | 8/2012 | Stent et al. |
| 8,260,247 B2 | 9/2012 | Lazaridis et al. |
| 8,260,617 B2 | 9/2012 | Dhanakshirur et al. |
| 8,270,933 B2 | 9/2012 | Riemer et al. |
| 8,271,287 B1 | 9/2012 | Kermani |
| 8,275,621 B2 | 9/2012 | Alewine et al. |
| 8,279,171 B2 | 10/2012 | Hirai et al. |
| 8,280,438 B2 | 10/2012 | Barbera |
| 8,285,546 B2 | 10/2012 | Reich |
| 8,285,551 B2 | 10/2012 | Gazdzinski |
| 8,285,553 B2 | 10/2012 | Gazdzinski |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,801 B2 | 10/2012 | Sweeney et al. |
| 8,301,456 B2 | 10/2012 | Gazdzinski |
| 8,311,189 B2 | 11/2012 | Champlin et al. |
| 8,311,834 B1 | 11/2012 | Gazdzinski |
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati et al. |
| 8,326,627 B2 | 12/2012 | Kennewick et al. |
| 8,332,205 B2 | 12/2012 | Krishnan et al. |
| 8,332,218 B2 | 12/2012 | Cross et al. |
| 8,332,224 B2 | 12/2012 | Di Cristo et al. |
| 8,332,748 B1 | 12/2012 | Karam |
| 8,335,689 B2 | 12/2012 | Wittenstein et al. |
| 8,340,975 B1 | 12/2012 | Rosenberger |
| 8,345,665 B2 | 1/2013 | Vieri et al. |
| 8,346,563 B1 | 1/2013 | Hjelm et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,485 B2 | 2/2013 | Kerschberg et al. |
| 8,386,926 B1 | 2/2013 | Matsuoka |
| 8,391,844 B2 | 3/2013 | Lamiraux et al. |
| 8,396,714 B2 | 3/2013 | Rogers et al. |
| 8,401,163 B1 | 3/2013 | Kirchhoff et al. |
| 8,406,745 B1 | 3/2013 | Upadhyay et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 | 4/2013 | Shreesha et al. |
| 8,442,821 B1 | 5/2013 | Vanhoucke |
| 8,447,612 B2 | 5/2013 | Gazdzinski |
| 8,452,597 B2 | 5/2013 | Bringert et al. |
| 8,457,959 B2 | 6/2013 | Kaiser |
| 8,458,115 B2 | 6/2013 | Cai et al. |
| 8,458,278 B2 | 6/2013 | Christie et al. |
| 8,464,150 B2 | 6/2013 | Davidson et al. |
| 8,473,289 B2 | 6/2013 | Jitkoff et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,857 B2 | 7/2013 | Kopparapu et al. |
| 8,514,197 B2 | 8/2013 | Shahraray et al. |
| 8,515,750 B1 | 8/2013 | Lei et al. |
| 8,521,513 B2 | 8/2013 | Millett et al. |
| 8,521,531 B1 | 8/2013 | Kim |

(56) References Cited

U.S. PATENT DOCUMENTS

| | | |
|---|---|---|
| 8,527,276 B1 | 9/2013 | Senior et al. |
| 8,537,033 B2 | 9/2013 | Gueziec |
| 8,543,398 B1 | 9/2013 | Strope et al. |
| 8,560,229 B1 | 10/2013 | Park et al. |
| 8,571,851 B1 | 10/2013 | Tickner et al. |
| 8,583,416 B2 | 11/2013 | Huang et al. |
| 8,583,511 B2 | 11/2013 | Hendrickson |
| 8,589,869 B2 | 11/2013 | Wolfram |
| 8,589,911 B1 | 11/2013 | Sharkey et al. |
| 8,595,004 B2 | 11/2013 | Koshinaka |
| 8,600,743 B2 | 12/2013 | Lindahl et al. |
| 8,600,930 B2 | 12/2013 | Sata et al. |
| 8,606,568 B1 | 12/2013 | Tickner et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,638,363 B2 | 1/2014 | King et al. |
| 8,639,516 B2 | 1/2014 | Lindahl et al. |
| 8,645,137 B2 | 2/2014 | Bellegarda et al. |
| 8,645,138 B1 | 2/2014 | Weinstein et al. |
| 8,654,936 B1 | 2/2014 | Tofighbakhsh et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,904 B2 | 3/2014 | Lindahl et al. |
| 8,677,377 B2 | 3/2014 | Cheyer et al. |
| 8,681,950 B2 | 3/2014 | Vlack et al. |
| 8,682,667 B2 | 3/2014 | Haughay et al. |
| 8,687,777 B1 | 4/2014 | Lavian et al. |
| 8,688,446 B2 | 4/2014 | Yanagihara et al. |
| 8,688,453 B1 | 4/2014 | Joshi et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,713,119 B2 | 4/2014 | Lindahl et al. |
| 8,713,418 B2 | 4/2014 | King et al. |
| 8,719,006 B2 | 5/2014 | Bellegarda et al. |
| 8,719,014 B2 | 5/2014 | Wagner et al. |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Rodriguez et al. |
| 8,744,852 B1 | 6/2014 | Seymour et al. |
| 8,760,537 B2 | 6/2014 | Johnson et al. |
| 8,762,145 B2 | 6/2014 | Ouchi et al. |
| 8,762,156 B2 | 6/2014 | Chen et al. |
| 8,762,469 B2 | 6/2014 | Lindahl et al. |
| 8,768,693 B2 | 7/2014 | Lempel et al. |
| 8,768,702 B2 | 7/2014 | Boettcher et al. |
| 8,775,154 B2 | 7/2014 | Clinchant et al. |
| 8,775,931 B2 | 7/2014 | Fux et al. |
| 8,781,456 B2 | 7/2014 | Prociw |
| 8,781,841 B1 | 7/2014 | Wang |
| 8,798,255 B2 | 8/2014 | Lubowich et al. |
| 8,798,995 B1 | 8/2014 | Edara et al. |
| 8,799,000 B2 | 8/2014 | Guzzoni et al. |
| 8,805,690 B1 | 8/2014 | LeBeau et al. |
| 8,812,302 B2 | 8/2014 | Xiao et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,409 B1 | 10/2014 | Mengibar et al. |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,983,383 B1 | 3/2015 | Haskin |
| 8,989,713 B2 | 3/2015 | Doulton |
| 8,990,235 B2 | 3/2015 | King et al. |
| 8,994,660 B2 | 3/2015 | Neels et al. |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,639 B1 | 3/2015 | Faaborg et al. |
| 9,009,046 B1 | 4/2015 | Stewart |
| 9,020,804 B2 | 4/2015 | Barbaiani et al. |
| 9,026,425 B2 | 5/2015 | Nikoulina et al. |
| 9,031,834 B2 | 5/2015 | Coorman et al. |
| 9,037,967 B1 | 5/2015 | Al-Jefri et al. |
| 9,043,208 B2 | 5/2015 | Koch et al. |
| 9,049,255 B2 | 6/2015 | MacFarlane et al. |
| 9,049,295 B1 | 6/2015 | Cooper et al. |
| 9,053,706 B2 | 6/2015 | Jitkoff et al. |
| 9,058,811 B2 | 6/2015 | Wang et al. |
| 9,063,979 B2 | 6/2015 | Chiu et al. |
| 9,070,366 B1 | 6/2015 | Mathias et al. |
| 9,071,701 B2 | 6/2015 | Donaldson et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,447 B2 | 8/2015 | Gruber et al. |
| 9,123,338 B1 | 9/2015 | Sanders et al. |
| 9,171,541 B2 | 10/2015 | Kennewick et al. |
| 9,171,546 B1 | 10/2015 | Pike |
| 9,190,062 B2 | 11/2015 | Haughay |
| 9,208,153 B1 | 12/2015 | Zaveri et al. |
| 9,218,809 B2 | 12/2015 | Bellegarda |
| 9,218,819 B1 | 12/2015 | Stekkelpak et al. |
| 9,223,537 B2 | 12/2015 | Brown et al. |
| 9,255,812 B2 | 2/2016 | Maeoka et al. |
| 9,258,604 B1 | 2/2016 | Bilobrov et al. |
| 9,262,612 B2 | 2/2016 | Cheyer |
| 9,286,910 B1 | 3/2016 | Li et al. |
| 9,292,487 B1 | 3/2016 | Weber |
| 9,292,489 B1 | 3/2016 | Sak et al. |
| 9,299,344 B2 | 3/2016 | Braho et al. |
| 9,300,718 B2 | 3/2016 | Khanna |
| 9,305,543 B2 | 4/2016 | Fleizach et al. |
| 9,305,548 B2 | 4/2016 | Kennewick et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,330,659 B2 | 5/2016 | Ju et al. |
| 9,330,720 B2 | 5/2016 | Lee |
| 9,338,493 B2 | 5/2016 | Van Os et al. |
| 9,349,368 B1 | 5/2016 | LeBeau et al. |
| 9,361,084 B1 | 6/2016 | Costa |
| 9,367,541 B1 | 6/2016 | Servan et al. |
| 9,377,871 B2 | 6/2016 | Waddell et al. |
| 9,378,740 B1 | 6/2016 | Rosen et al. |
| 9,380,155 B1 | 6/2016 | Reding et al. |
| 9,390,726 B1 | 7/2016 | Smus et al. |
| 9,396,722 B2 | 7/2016 | Chung et al. |
| 9,401,147 B2 | 7/2016 | Jitkoff et al. |
| 9,406,224 B1 | 8/2016 | Sanders et al. |

(56) References Cited

U.S. PATENT DOCUMENTS

| | | |
|---|---|---|
| 9,412,392 B2 | 8/2016 | Lindahl |
| 9,423,266 B2 | 8/2016 | Clark et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,454,957 B1 | 9/2016 | Mathias et al. |
| 9,471,566 B1 | 10/2016 | Zhang et al. |
| 9,484,021 B1 | 11/2016 | Mairesse et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,535,906 B2 | 1/2017 | Lee et al. |
| 9,536,527 B1 | 1/2017 | Carlson |
| 9,547,647 B2 | 1/2017 | Badaskar |
| 9,548,050 B2 | 1/2017 | Gruber et al. |
| 9,569,549 B1 | 2/2017 | Jenkins et al. |
| 9,575,964 B2 | 2/2017 | Yadgar et al. |
| 9,578,173 B2 | 2/2017 | Sanghavi et al. |
| 9,607,612 B2 | 3/2017 | Deleeuw |
| 9,620,113 B2 | 4/2017 | Kennewick et al. |
| 9,620,126 B2 | 4/2017 | Chiba |
| 9,626,955 B2 | 4/2017 | Fleizach et al. |
| 9,633,004 B2 | 4/2017 | Giuli et al. |
| 9,633,660 B2 | 4/2017 | Haughay |
| 9,652,453 B2 | 5/2017 | Mathur et al. |
| 9,658,746 B2 | 5/2017 | Cohn et al. |
| 9,665,567 B2 | 5/2017 | Liu et al. |
| 9,668,121 B2 | 5/2017 | Naik et al. |
| 9,672,725 B2 | 6/2017 | Dotan-Cohen et al. |
| 9,691,378 B1 | 6/2017 | Meyers et al. |
| 9,697,827 B1 | 7/2017 | Lilly et al. |
| 9,720,907 B2 | 8/2017 | Bangalore et al. |
| 9,734,839 B1 | 8/2017 | Adams |
| 9,741,343 B1 | 8/2017 | Miles et al. |
| 9,747,083 B1 | 8/2017 | Roman et al. |
| 9,934,785 B1 | 4/2018 | Hulaud |
| 9,967,381 B1 | 5/2018 | Kashimba et al. |
| 9,990,176 B1 | 6/2018 | Gray |
| 10,037,758 B2 | 7/2018 | Jing et al. |
| 2002/0196911 A1 | 12/2002 | Gao et al. |
| 2004/0260547 A1* | 12/2004 | Cohen ............ G10L 15/20 704/233 |
| 2008/0001785 A1 | 1/2008 | Elizarov et al. |
| 2008/0010050 A1 | 1/2008 | Fux et al. |
| 2008/0010355 A1 | 1/2008 | Vieri et al. |
| 2008/0010605 A1 | 1/2008 | Frank et al. |
| 2008/0012950 A1 | 1/2008 | Lee et al. |
| 2008/0013751 A1 | 1/2008 | Hiselius |
| 2008/0015863 A1 | 1/2008 | Agapi et al. |
| 2008/0015864 A1 | 1/2008 | Ross et al. |
| 2008/0016575 A1 | 1/2008 | Vincent et al. |
| 2008/0021708 A1 | 1/2008 | Bennett et al. |
| 2008/0021886 A1 | 1/2008 | Wang-Aryattanwanich et al. |
| 2008/0022208 A1 | 1/2008 | Morse |
| 2008/0027711 A1 | 1/2008 | Rajendran et al. |
| 2008/0027726 A1 | 1/2008 | Hansen et al. |
| 2008/0031475 A1 | 2/2008 | Goldstein |
| 2008/0033719 A1 | 2/2008 | Hall et al. |
| 2008/0033723 A1 | 2/2008 | Jang et al. |
| 2008/0034032 A1 | 2/2008 | Healey et al. |
| 2008/0034044 A1 | 2/2008 | Bhakta et al. |
| 2008/0034081 A1 | 2/2008 | Marshall et al. |
| 2008/0036743 A1 | 2/2008 | Westerman et al. |
| 2008/0040339 A1 | 2/2008 | Zhou et al. |
| 2008/0042970 A1 | 2/2008 | Liang et al. |
| 2008/0043936 A1 | 2/2008 | Liebermann |
| 2008/0043943 A1 | 2/2008 | Sipher et al. |
| 2008/0046239 A1 | 2/2008 | Boo |
| 2008/0046250 A1 | 2/2008 | Agapi et al. |
| 2008/0046422 A1 | 2/2008 | Lee et al. |
| 2008/0046820 A1 | 2/2008 | Lee et al. |
| 2008/0046948 A1 | 2/2008 | Verosub |
| 2008/0048908 A1 | 2/2008 | Sato |
| 2008/0050027 A1 | 2/2008 | Bashyam et al. |
| 2008/0052063 A1 | 2/2008 | Bennett et al. |
| 2008/0052073 A1 | 2/2008 | Goto et al. |
| 2008/0052077 A1 | 2/2008 | Bennett et al. |
| 2008/0052080 A1 | 2/2008 | Narayanan et al. |
| 2008/0052262 A1 | 2/2008 | Kosinov et al. |
| 2008/0055194 A1 | 3/2008 | Baudino et al. |
| 2008/0056459 A1 | 3/2008 | Vallier et al. |
| 2008/0056579 A1 | 3/2008 | Guha |
| 2008/0057922 A1 | 3/2008 | Kokes et al. |
| 2008/0059190 A1 | 3/2008 | Chu et al. |
| 2008/0059200 A1 | 3/2008 | Puli |
| 2008/0059876 A1 | 3/2008 | Hantler et al. |
| 2008/0062141 A1 | 3/2008 | Chaudhri |
| 2008/0065382 A1 | 3/2008 | Gerl et al. |
| 2008/0065387 A1 | 3/2008 | Cross et al. |
| 2008/0071529 A1 | 3/2008 | Silverman et al. |
| 2008/0071544 A1 | 3/2008 | Beaufays et al. |
| 2008/0071742 A1 | 3/2008 | Yang et al. |
| 2008/0072143 A1 | 3/2008 | Assadollahi |
| 2008/0075296 A1 | 3/2008 | Lindahl et al. |
| 2008/0076972 A1 | 3/2008 | Dorogusker et al. |
| 2008/0077310 A1 | 3/2008 | Murlidar et al. |
| 2008/0077384 A1 | 3/2008 | Agapi et al. |
| 2008/0077386 A1 | 3/2008 | Gao et al. |
| 2008/0077391 A1 | 3/2008 | Chino et al. |
| 2008/0077393 A1 | 3/2008 | Gao et al. |
| 2008/0077406 A1 | 3/2008 | Ganong, III |
| 2008/0077859 A1 | 3/2008 | Schabes et al. |
| 2008/0079566 A1 | 4/2008 | Singh et al. |
| 2008/0080411 A1 | 4/2008 | Cole |
| 2008/0082332 A1 | 4/2008 | Mallett et al. |
| 2008/0082338 A1 | 4/2008 | O''Neil et al. |
| 2008/0082390 A1 | 4/2008 | Hawkins et al. |
| 2008/0082576 A1 | 4/2008 | Bodin et al. |
| 2008/0082651 A1 | 4/2008 | Singh et al. |
| 2008/0084974 A1 | 4/2008 | Dhanakshirur |
| 2008/0085689 A1 | 4/2008 | Zellner |
| 2008/0086306 A1 | 4/2008 | Hirota et al. |
| 2008/0091406 A1 | 4/2008 | Baldwin et al. |
| 2008/0091426 A1 | 4/2008 | Rempel et al. |
| 2008/0091428 A1 | 4/2008 | Bellegarda |
| 2008/0091443 A1 | 4/2008 | Strope et al. |
| 2008/0096531 A1 | 4/2008 | Mcquaide et al. |
| 2008/0096533 A1 | 4/2008 | Manfredi et al. |
| 2008/0096726 A1 | 4/2008 | Riley et al. |
| 2008/0097937 A1 | 4/2008 | Hadjarian |
| 2008/0098302 A1 | 4/2008 | Roose |
| 2008/0098480 A1 | 4/2008 | Henry et al. |
| 2008/0100579 A1 | 5/2008 | Robinson et al. |
| 2008/0101584 A1 | 5/2008 | Gray et al. |
| 2008/0103774 A1 | 5/2008 | White |
| 2008/0109222 A1 | 5/2008 | Liu |
| 2008/0109402 A1 | 5/2008 | Wang et al. |
| 2008/0114480 A1 | 5/2008 | Harb |
| 2008/0114598 A1 | 5/2008 | Prieto et al. |
| 2008/0114604 A1 | 5/2008 | Wei et al. |
| 2008/0114841 A1 | 5/2008 | Lambert |
| 2008/0115084 A1 | 5/2008 | Scott et al. |
| 2008/0118143 A1 | 5/2008 | Gordon et al. |
| 2008/0119953 A1 | 5/2008 | Reed |
| 2008/0120102 A1 | 5/2008 | Rao |
| 2008/0120112 A1 | 5/2008 | Jordan et al. |
| 2008/0120196 A1 | 5/2008 | Reed et al. |
| 2008/0120311 A1 | 5/2008 | Reed |
| 2008/0120312 A1 | 5/2008 | Reed |
| 2008/0120330 A1 | 5/2008 | Reed |
| 2008/0120342 A1 | 5/2008 | Reed et al. |
| 2008/0122796 A1 | 5/2008 | Jobs et al. |
| 2008/0124695 A1 | 5/2008 | Myers et al. |
| 2008/0126075 A1 | 5/2008 | Thorn et al. |
| 2008/0126077 A1 | 5/2008 | Thorn |
| 2008/0126091 A1 | 5/2008 | Clark et al. |
| 2008/0126093 A1 | 5/2008 | Sivadas |
| 2008/0126100 A1 | 5/2008 | Grost et al. |
| 2008/0126491 A1 | 5/2008 | Portele et al. |
| 2008/0129520 A1 | 6/2008 | Lee |
| 2008/0130867 A1 | 6/2008 | Bowen |
| 2008/0131006 A1 | 6/2008 | Oliver |

(56) References Cited

U.S. PATENT DOCUMENTS

| | | |
|---|---|---|
| 2008/0132221 A1 | 6/2008 | Willey et al. |
| 2008/0132295 A1 | 6/2008 | Horowitz |
| 2008/0133215 A1 | 6/2008 | Sarukkai |
| 2008/0133228 A1 | 6/2008 | Rao |
| 2008/0133230 A1 | 6/2008 | Herforth et al. |
| 2008/0133241 A1 | 6/2008 | Baker et al. |
| 2008/0133244 A1 | 6/2008 | Bodin et al. |
| 2008/0133245 A1 | 6/2008 | Proulx et al. |
| 2008/0133479 A1 | 6/2008 | Zelevinsky et al. |
| 2008/0133956 A1 | 6/2008 | Fadell |
| 2008/0140413 A1 | 6/2008 | Millman et al. |
| 2008/0140415 A1 | 6/2008 | Shostak |
| 2008/0140416 A1 | 6/2008 | Shostak |
| 2008/0140652 A1 | 6/2008 | Millman et al. |
| 2008/0140657 A1 | 6/2008 | Azvine et al. |
| 2008/0140702 A1 | 6/2008 | Reed et al. |
| 2008/0141125 A1 | 6/2008 | Ghassabian et al. |
| 2008/0141180 A1 | 6/2008 | Reed et al. |
| 2008/0141182 A1 | 6/2008 | Barsness et al. |
| 2008/0146245 A1 | 6/2008 | Appaji |
| 2008/0146290 A1 | 6/2008 | Sreeram et al. |
| 2008/0147408 A1 | 6/2008 | Da Palma et al. |
| 2008/0147411 A1 | 6/2008 | Dames et al. |
| 2008/0147874 A1 | 6/2008 | Yoneda et al. |
| 2008/0150900 A1 | 6/2008 | Han |
| 2008/0154577 A1 | 6/2008 | Kim et al. |
| 2008/0154599 A1 | 6/2008 | Muschett et al. |
| 2008/0154600 A1 | 6/2008 | Tian et al. |
| 2008/0154603 A1 | 6/2008 | Oddo |
| 2008/0154612 A1 | 6/2008 | Evermann et al. |
| 2008/0154828 A1 | 6/2008 | Antebi et al. |
| 2008/0157867 A1 | 7/2008 | Krah |
| 2008/0161113 A1 | 7/2008 | Hansen et al. |
| 2008/0162120 A1 * | 7/2008 | Mactavish ............ G10L 21/06 704/201 |
| 2008/0162137 A1 | 7/2008 | Saitoh et al. |
| 2008/0162471 A1 | 7/2008 | Bernard |
| 2008/0163119 A1 | 7/2008 | Kim et al. |
| 2008/0163131 A1 | 7/2008 | Hirai et al. |
| 2008/0165144 A1 | 7/2008 | Forstall et al. |
| 2008/0165980 A1 | 7/2008 | Pavlovic et al. |
| 2008/0165994 A1 | 7/2008 | Caren et al. |
| 2008/0167013 A1 | 7/2008 | Novick et al. |
| 2008/0167858 A1 | 7/2008 | Christie et al. |
| 2008/0167876 A1 | 7/2008 | Bakis et al. |
| 2008/0168052 A1 | 7/2008 | Ott et al. |
| 2008/0168144 A1 | 7/2008 | Lee |
| 2008/0168366 A1 | 7/2008 | Kocienda et al. |
| 2008/0172698 A1 | 7/2008 | Berger et al. |
| 2008/0183473 A1 | 7/2008 | Nagano et al. |
| 2008/0186960 A1 | 8/2008 | Kocheisen et al. |
| 2008/0189099 A1 | 8/2008 | Friedman et al. |
| 2008/0189106 A1 | 8/2008 | Low et al. |
| 2008/0189110 A1 | 8/2008 | Freeman et al. |
| 2008/0189114 A1 | 8/2008 | Fail et al. |
| 2008/0189360 A1 | 8/2008 | Kiley et al. |
| 2008/0189606 A1 | 8/2008 | Rybak |
| 2008/0195312 A1 | 8/2008 | Aaron et al. |
| 2008/0195388 A1 | 8/2008 | Bower et al. |
| 2008/0195391 A1 | 8/2008 | Marple et al. |
| 2008/0195601 A1 | 8/2008 | Ntoulas et al. |
| 2008/0195630 A1 | 8/2008 | Exartier et al. |
| 2008/0195940 A1 | 8/2008 | Gail et al. |
| 2008/0200142 A1 | 8/2008 | Abdel-Kader et al. |
| 2008/0201000 A1 | 8/2008 | Heikkila et al. |
| 2008/0201306 A1 | 8/2008 | Cooper et al. |
| 2008/0201375 A1 | 8/2008 | Khedouri et al. |
| 2008/0201434 A1 | 8/2008 | Holmes et al. |
| 2008/0204379 A1 | 8/2008 | Perez-Noguera |
| 2008/0207176 A1 | 8/2008 | Brackbill et al. |
| 2008/0208585 A1 | 8/2008 | Ativanichayaphong et al. |
| 2008/0208587 A1 | 8/2008 | Ben-David et al. |
| 2008/0208864 A1 | 8/2008 | Cucerzan et al. |
| 2008/0212796 A1 | 9/2008 | Denda |
| 2008/0219641 A1 | 9/2008 | Sandrew et al. |
| 2008/0221866 A1 | 9/2008 | Katragadda et al. |
| 2008/0221879 A1 | 9/2008 | Cerra et al. |
| 2008/0221880 A1 | 9/2008 | Cerra et al. |
| 2008/0221887 A1 | 9/2008 | Rose et al. |
| 2008/0221889 A1 | 9/2008 | Cerra et al. |
| 2008/0221903 A1 | 9/2008 | Kanevsky et al. |
| 2008/0222118 A1 | 9/2008 | Scian et al. |
| 2008/0226130 A1 | 9/2008 | Kansal et al. |
| 2008/0228463 A1 | 9/2008 | Mori et al. |
| 2008/0228485 A1 | 9/2008 | Owen |
| 2008/0228490 A1 | 9/2008 | Fischer et al. |
| 2008/0228495 A1 | 9/2008 | Cross et al. |
| 2008/0228496 A1 | 9/2008 | Yu et al. |
| 2008/0228928 A1 | 9/2008 | Donelli et al. |
| 2008/0229185 A1 | 9/2008 | Lynch |
| 2008/0229218 A1 | 9/2008 | Maeng |
| 2008/0235017 A1 | 9/2008 | Satomura et al. |
| 2008/0235023 A1 | 9/2008 | Kennewick et al. |
| 2008/0235024 A1 | 9/2008 | Goldberg et al. |
| 2008/0235027 A1 | 9/2008 | Cross |
| 2008/0240569 A1 | 10/2008 | Tonouchi |
| 2008/0242280 A1 | 10/2008 | Shapiro et al. |
| 2008/0242322 A1 | 10/2008 | Scott et al. |
| 2008/0242363 A1 | 10/2008 | Onda et al. |
| 2008/0243501 A1 | 10/2008 | Hafsteinsson et al. |
| 2008/0243834 A1 | 10/2008 | Rieman et al. |
| 2008/0244390 A1 | 10/2008 | Fux et al. |
| 2008/0244446 A1 | 10/2008 | Lefevre et al. |
| 2008/0247519 A1 | 10/2008 | Abella et al. |
| 2008/0247529 A1 | 10/2008 | Barton et al. |
| 2008/0248797 A1 | 10/2008 | Freeman et al. |
| 2008/0249770 A1 | 10/2008 | Kim et al. |
| 2008/0249778 A1 | 10/2008 | Barton et al. |
| 2008/0253577 A1 | 10/2008 | Eppolito |
| 2008/0254419 A1 | 10/2008 | Cohen |
| 2008/0254425 A1 | 10/2008 | Cohen et al. |
| 2008/0255837 A1 | 10/2008 | Kahn et al. |
| 2008/0255842 A1 | 10/2008 | Simhi et al. |
| 2008/0255845 A1 | 10/2008 | Bennett |
| 2008/0256613 A1 | 10/2008 | Grover |
| 2008/0259022 A1 | 10/2008 | Mansfield et al. |
| 2008/0261572 A1 | 10/2008 | Tsui et al. |
| 2008/0262828 A1 | 10/2008 | Och et al. |
| 2008/0262838 A1 | 10/2008 | Nurminen et al. |
| 2008/0262846 A1 | 10/2008 | Burns et al. |
| 2008/0263139 A1 | 10/2008 | Martin |
| 2008/0267416 A1 | 10/2008 | Goldstein et al. |
| 2008/0270118 A1 | 10/2008 | Kuo et al. |
| 2008/0270138 A1 | 10/2008 | Knight et al. |
| 2008/0270139 A1 | 10/2008 | Shi et al. |
| 2008/0270140 A1 | 10/2008 | Hertz et al. |
| 2008/0270151 A1 | 10/2008 | Mahoney et al. |
| 2008/0270344 A1 | 10/2008 | Yurick et al. |
| 2008/0273672 A1 | 11/2008 | Didcock et al. |
| 2008/0277473 A1 | 11/2008 | Kotlarsky et al. |
| 2008/0281510 A1 | 11/2008 | Shahine |
| 2008/0281582 A1 | 11/2008 | Hsu et al. |
| 2008/0288259 A1 | 11/2008 | Chambers et al. |
| 2008/0288460 A1 | 11/2008 | Poniatowski et al. |
| 2008/0292112 A1 | 11/2008 | Valenzuela et al. |
| 2008/0294418 A1 | 11/2008 | Cleary et al. |
| 2008/0294517 A1 | 11/2008 | Hill |
| 2008/0294651 A1 | 11/2008 | Masuyama et al. |
| 2008/0294981 A1 | 11/2008 | Balzano et al. |
| 2008/0298563 A1 | 12/2008 | Rondeau et al. |
| 2008/0298766 A1 | 12/2008 | Wen et al. |
| 2008/0299523 A1 | 12/2008 | Chai et al. |
| 2008/0300857 A1 | 12/2008 | Barbaiani et al. |
| 2008/0300871 A1 | 12/2008 | Gilbert |
| 2008/0300877 A1 | 12/2008 | Gilbert et al. |
| 2008/0300878 A1 | 12/2008 | Bennett |
| 2008/0300886 A1 | 12/2008 | Patch |
| 2008/0301567 A1 | 12/2008 | Martin et al. |
| 2008/0303645 A1 | 12/2008 | Seymour et al. |
| 2008/0306727 A1 | 12/2008 | Thurmair et al. |
| 2008/0312909 A1 | 12/2008 | Hermansen et al. |
| 2008/0312928 A1 | 12/2008 | Goebel et al. |
| 2008/0313335 A1 | 12/2008 | Jung et al. |
| 2008/0316183 A1 | 12/2008 | Westerman et al. |

(56) References Cited

U.S. PATENT DOCUMENTS

| | | |
|---|---|---|
| 2008/0319735 A1 | 12/2008 | Kambhatla et al. |
| 2008/0319738 A1 | 12/2008 | Liu et al. |
| 2008/0319753 A1 | 12/2008 | Hancock |
| 2008/0319763 A1 | 12/2008 | Di Fabbrizio et al. |
| 2008/0319783 A1 | 12/2008 | Yao et al. |
| 2009/0003115 A1 | 1/2009 | Lindahl et al. |
| 2009/0005012 A1 | 1/2009 | Van Heugten |
| 2009/0005891 A1 | 1/2009 | Batson et al. |
| 2009/0006096 A1 | 1/2009 | Li et al. |
| 2009/0006097 A1 | 1/2009 | Etezadi et al. |
| 2009/0006099 A1 | 1/2009 | Sharpe et al. |
| 2009/0006100 A1 | 1/2009 | Badger et al. |
| 2009/0006343 A1 | 1/2009 | Platt et al. |
| 2009/0006345 A1 | 1/2009 | Platt et al. |
| 2009/0006488 A1 | 1/2009 | Lindahl et al. |
| 2009/0006671 A1 | 1/2009 | Batson et al. |
| 2009/0007001 A1 | 1/2009 | Morin et al. |
| 2009/0011709 A1 | 1/2009 | Akasaka et al. |
| 2009/0012748 A1 | 1/2009 | Beish et al. |
| 2009/0012775 A1 | 1/2009 | El Hady et al. |
| 2009/0018828 A1 | 1/2009 | Nakadai et al. |
| 2009/0018829 A1 | 1/2009 | Kuperstein |
| 2009/0018834 A1 | 1/2009 | Cooper et al. |
| 2009/0018835 A1 | 1/2009 | Cooper et al. |
| 2009/0018839 A1 | 1/2009 | Cooper et al. |
| 2009/0018840 A1 | 1/2009 | Lutz et al. |
| 2009/0022329 A1 | 1/2009 | Mahowald |
| 2009/0024595 A1 | 1/2009 | Chen |
| 2009/0028435 A1 | 1/2009 | Wu et al. |
| 2009/0030685 A1 | 1/2009 | Cerra et al. |
| 2009/0030800 A1 | 1/2009 | Grois |
| 2009/0030978 A1 | 1/2009 | Johnson et al. |
| 2009/0043580 A1 | 2/2009 | Mozer et al. |
| 2009/0043583 A1 | 2/2009 | Agapi et al. |
| 2009/0043763 A1 | 2/2009 | Peng |
| 2009/0044094 A1 | 2/2009 | Rapp et al. |
| 2009/0048821 A1 | 2/2009 | Yam et al. |
| 2009/0048841 A1 | 2/2009 | Pollet et al. |
| 2009/0048845 A1 | 2/2009 | Burckart et al. |
| 2009/0049067 A1 | 2/2009 | Murray |
| 2009/0055168 A1 | 2/2009 | Wu et al. |
| 2009/0055175 A1 | 2/2009 | Terrell et al. |
| 2009/0055179 A1 | 2/2009 | Cho et al. |
| 2009/0055186 A1 | 2/2009 | Lance et al. |
| 2009/0055380 A1 | 2/2009 | Peng et al. |
| 2009/0055381 A1 | 2/2009 | Wu et al. |
| 2009/0055648 A1 | 2/2009 | Kim et al. |
| 2009/0058823 A1 | 3/2009 | Kocienda |
| 2009/0058860 A1 | 3/2009 | Fong et al. |
| 2009/0060351 A1 | 3/2009 | Li et al. |
| 2009/0060472 A1 | 3/2009 | Bull et al. |
| 2009/0063974 A1 | 3/2009 | Bull et al. |
| 2009/0064031 A1 | 3/2009 | Bull et al. |
| 2009/0070097 A1 | 3/2009 | Wu et al. |
| 2009/0070102 A1 | 3/2009 | Maegawa |
| 2009/0070109 A1 | 3/2009 | Didcock et al. |
| 2009/0070114 A1 | 3/2009 | Staszak |
| 2009/0074214 A1 | 3/2009 | Bradford et al. |
| 2009/0076792 A1 | 3/2009 | Lawson-Tancred |
| 2009/0076796 A1 | 3/2009 | Daraselia |
| 2009/0076798 A1 | 3/2009 | Oh et al. |
| 2009/0076819 A1 | 3/2009 | Wouters et al. |
| 2009/0076821 A1 | 3/2009 | Brenner et al. |
| 2009/0076825 A1 | 3/2009 | Bradford et al. |
| 2009/0077047 A1 | 3/2009 | Cooper et al. |
| 2009/0077165 A1 | 3/2009 | Rhodes et al. |
| 2009/0077464 A1 | 3/2009 | Goldsmith et al. |
| 2009/0079622 A1 | 3/2009 | Seshadri et al. |
| 2009/0083034 A1 | 3/2009 | Hernandez et al. |
| 2009/0083035 A1 | 3/2009 | Huang et al. |
| 2009/0083036 A1 | 3/2009 | Zhao et al. |
| 2009/0083037 A1 | 3/2009 | Gleason et al. |
| 2009/0083047 A1 | 3/2009 | Lindahl et al. |
| 2009/0089058 A1 | 4/2009 | Bellegarda |
| 2009/0091537 A1 | 4/2009 | Huang et al. |
| 2009/0092239 A1 | 4/2009 | Macwan et al. |
| 2009/0092260 A1 | 4/2009 | Powers |
| 2009/0092261 A1 | 4/2009 | Bard |
| 2009/0092262 A1 | 4/2009 | Costa et al. |
| 2009/0094029 A1 | 4/2009 | Koch et al. |
| 2009/0094033 A1 | 4/2009 | Mozer et al. |
| 2009/0097634 A1 | 4/2009 | Nambiar et al. |
| 2009/0097637 A1 | 4/2009 | Boscher et al. |
| 2009/0098903 A1 | 4/2009 | Donaldson et al. |
| 2009/0100049 A1 | 4/2009 | Cao |
| 2009/0100454 A1 | 4/2009 | Weber |
| 2009/0104898 A1 | 4/2009 | Harris |
| 2009/0106026 A1 | 4/2009 | Ferrieux |
| 2009/0106376 A1 | 4/2009 | Tom et al. |
| 2009/0106397 A1 | 4/2009 | O'Keefe |
| 2009/0112572 A1 | 4/2009 | Thorn |
| 2009/0112576 A1 | 4/2009 | Jackson et al. |
| 2009/0112592 A1 | 4/2009 | Candelore et al. |
| 2009/0112677 A1 | 4/2009 | Rhett |
| 2009/0112892 A1 | 4/2009 | Cardie et al. |
| 2009/0119587 A1 | 5/2009 | Allen et al. |
| 2009/0123021 A1 | 5/2009 | Jung et al. |
| 2009/0123071 A1 | 5/2009 | Iwasaki |
| 2009/0125477 A1 | 5/2009 | Lu et al. |
| 2009/0125602 A1 | 5/2009 | Bhatia et al. |
| 2009/0125947 A1 | 5/2009 | Ibaraki |
| 2009/0128505 A1 | 5/2009 | Partridge et al. |
| 2009/0132253 A1 | 5/2009 | Bellegarda |
| 2009/0132255 A1 | 5/2009 | Lu |
| 2009/0137286 A1 | 5/2009 | Luke et al. |
| 2009/0138263 A1 | 5/2009 | Shozakai et al. |
| 2009/0138430 A1 | 5/2009 | Nambiar et al. |
| 2009/0138736 A1 | 5/2009 | Chin |
| 2009/0138828 A1 | 5/2009 | Schultz et al. |
| 2009/0144036 A1 | 6/2009 | Jorgensen et al. |
| 2009/0144049 A1 | 6/2009 | Haddad et al. |
| 2009/0144428 A1 | 6/2009 | Bowater et al. |
| 2009/0144609 A1 | 6/2009 | Liang et al. |
| 2009/0146848 A1 | 6/2009 | Ghassabian |
| 2009/0150147 A1 | 6/2009 | Jacoby et al. |
| 2009/0150156 A1 | 6/2009 | Kennewick et al. |
| 2009/0152349 A1 | 6/2009 | Bonev et al. |
| 2009/0153288 A1 | 6/2009 | Hope et al. |
| 2009/0154669 A1 | 6/2009 | Wood et al. |
| 2009/0157382 A1 | 6/2009 | Bar |
| 2009/0157384 A1 | 6/2009 | Toutanova et al. |
| 2009/0157401 A1 | 6/2009 | Bennett |
| 2009/0158200 A1 | 6/2009 | Palahnuk et al. |
| 2009/0158323 A1 | 6/2009 | Bober et al. |
| 2009/0158423 A1 | 6/2009 | Orlassino et al. |
| 2009/0160803 A1 | 6/2009 | Hashimoto |
| 2009/0163243 A1 | 6/2009 | Barbera |
| 2009/0164301 A1 | 6/2009 | O'Sullivan et al. |
| 2009/0164441 A1 | 6/2009 | Cheyer |
| 2009/0164655 A1 | 6/2009 | Pettersson et al. |
| 2009/0164937 A1 | 6/2009 | Alviar et al. |
| 2009/0167508 A1 | 7/2009 | Fadell et al. |
| 2009/0167509 A1 | 7/2009 | Fadell et al. |
| 2009/0171578 A1 | 7/2009 | Kim et al. |
| 2009/0171662 A1 | 7/2009 | Huang et al. |
| 2009/0171664 A1 | 7/2009 | Kennewick et al. |
| 2009/0172108 A1 | 7/2009 | Singh |
| 2009/0172542 A1 | 7/2009 | Girish et al. |
| 2009/0174667 A1 | 7/2009 | Kocienda et al. |
| 2009/0174677 A1 | 7/2009 | Gehani et al. |
| 2009/0177300 A1 | 7/2009 | Lee |
| 2009/0177461 A1 | 7/2009 | Ehsani et al. |
| 2009/0177966 A1 | 7/2009 | Chaudhri |
| 2009/0182445 A1 | 7/2009 | Girish et al. |
| 2009/0182549 A1 | 7/2009 | Anisimovich et al. |
| 2009/0182702 A1 | 7/2009 | Miller |
| 2009/0183070 A1 | 7/2009 | Robbins |
| 2009/0187402 A1 | 7/2009 | Scholl |
| 2009/0187577 A1 | 7/2009 | Reznik et al. |
| 2009/0187950 A1 | 7/2009 | Nicas et al. |
| 2009/0190774 A1 | 7/2009 | Wang et al. |
| 2009/0191895 A1 | 7/2009 | Singh et al. |
| 2009/0192782 A1 | 7/2009 | Drewes |
| 2009/0192787 A1 | 7/2009 | Roon |

(56) References Cited

U.S. PATENT DOCUMENTS

| | | |
|---|---|---|
| 2009/0192798 A1 | 7/2009 | Basson et al. |
| 2009/0198497 A1 | 8/2009 | Kwon |
| 2009/0204402 A1 | 8/2009 | Marhawa et al. |
| 2009/0204409 A1 | 8/2009 | Mozer et al. |
| 2009/0204478 A1 | 8/2009 | Kaib et al. |
| 2009/0204596 A1 | 8/2009 | Brun et al. |
| 2009/0204601 A1 | 8/2009 | Grasset |
| 2009/0204620 A1 | 8/2009 | Thione et al. |
| 2009/0210230 A1 | 8/2009 | Schwarz et al. |
| 2009/0210232 A1 | 8/2009 | Sanchez et al. |
| 2009/0213134 A1 | 8/2009 | Stephanick et al. |
| 2009/0215466 A1 | 8/2009 | Ahl et al. |
| 2009/0215503 A1 | 8/2009 | Zhang et al. |
| 2009/0216396 A1 | 8/2009 | Yamagata |
| 2009/0216528 A1 | 8/2009 | Gemello et al. |
| 2009/0216540 A1 | 8/2009 | Tessel et al. |
| 2009/0216704 A1 | 8/2009 | Zheng et al. |
| 2009/0219166 A1 | 9/2009 | MacFarlane et al. |
| 2009/0221274 A1 | 9/2009 | Venkatakrishnan et al. |
| 2009/0222257 A1 | 9/2009 | Sumita et al. |
| 2009/0222270 A2 | 9/2009 | Likens et al. |
| 2009/0222488 A1 | 9/2009 | Boerries et al. |
| 2009/0228126 A1 | 9/2009 | Spielberg et al. |
| 2009/0228273 A1 | 9/2009 | Wang et al. |
| 2009/0228277 A1 | 9/2009 | Bonforte et al. |
| 2009/0228281 A1 | 9/2009 | Singleton et al. |
| 2009/0228439 A1 | 9/2009 | Manolescu et al. |
| 2009/0228792 A1 | 9/2009 | Van Os et al. |
| 2009/0228842 A1 | 9/2009 | Westerman et al. |
| 2009/0233264 A1 | 9/2009 | Rogers et al. |
| 2009/0234638 A1 | 9/2009 | Ranjan et al. |
| 2009/0234651 A1 | 9/2009 | Basir et al. |
| 2009/0234655 A1 | 9/2009 | Kwon |
| 2009/0235280 A1 | 9/2009 | Tannier et al. |
| 2009/0239202 A1 | 9/2009 | Stone |
| 2009/0239552 A1 | 9/2009 | Churchill et al. |
| 2009/0240485 A1 | 9/2009 | Dalal et al. |
| 2009/0241054 A1 | 9/2009 | Hendricks |
| 2009/0241760 A1 | 10/2009 | Georges |
| 2009/0247237 A1 | 10/2009 | Mittleman et al. |
| 2009/0248182 A1 | 10/2009 | Logan et al. |
| 2009/0248395 A1 | 10/2009 | Alewine et al. |
| 2009/0248402 A1 | 10/2009 | Ito et al. |
| 2009/0248420 A1 | 10/2009 | Basir et al. |
| 2009/0248422 A1 | 10/2009 | Li et al. |
| 2009/0248456 A1 | 10/2009 | Fahmy et al. |
| 2009/0249198 A1 | 10/2009 | Davis et al. |
| 2009/0249247 A1 | 10/2009 | Tseng et al. |
| 2009/0252350 A1 | 10/2009 | Seguin |
| 2009/0253457 A1 | 10/2009 | Seguin |
| 2009/0253463 A1 | 10/2009 | Shin et al. |
| 2009/0254339 A1 | 10/2009 | Seguin |
| 2009/0254345 A1 | 10/2009 | Fleizach et al. |
| 2009/0254819 A1 | 10/2009 | Song et al. |
| 2009/0254823 A1 | 10/2009 | Barrett |
| 2009/0259475 A1 | 10/2009 | Yamagami et al. |
| 2009/0259969 A1 | 10/2009 | Pallakoff |
| 2009/0265171 A1 | 10/2009 | Davis |
| 2009/0265368 A1 | 10/2009 | Crider et al. |
| 2009/0271109 A1 | 10/2009 | Lee et al. |
| 2009/0271175 A1 | 10/2009 | Bodin et al. |
| 2009/0271176 A1 | 10/2009 | Bodin et al. |
| 2009/0271178 A1 | 10/2009 | Bodin et al. |
| 2009/0271188 A1 | 10/2009 | Agapi et al. |
| 2009/0271189 A1 | 10/2009 | Agapi et al. |
| 2009/0274315 A1 | 11/2009 | Carnes et al. |
| 2009/0274376 A1 | 11/2009 | Selvaraj et al. |
| 2009/0278804 A1 | 11/2009 | Rubanovich et al. |
| 2009/0281789 A1 | 11/2009 | Waibel et al. |
| 2009/0284482 A1 | 11/2009 | Chin |
| 2009/0286514 A1 | 11/2009 | Lichorowic et al. |
| 2009/0287583 A1 | 11/2009 | Holmes |
| 2009/0290718 A1 | 11/2009 | Kahn et al. |
| 2009/0292987 A1 | 11/2009 | Sorenson |
| 2009/0296552 A1 | 12/2009 | Hicks et al. |
| 2009/0298474 A1 | 12/2009 | George |
| 2009/0298529 A1 | 12/2009 | Mahajan |
| 2009/0299745 A1 | 12/2009 | Kennewick et al. |
| 2009/0299849 A1 | 12/2009 | Cao et al. |
| 2009/0300391 A1 | 12/2009 | Jessup et al. |
| 2009/0300488 A1 | 12/2009 | Salamon et al. |
| 2009/0304198 A1 | 12/2009 | Herre et al. |
| 2009/0305203 A1 | 12/2009 | Okumura et al. |
| 2009/0306967 A1 | 12/2009 | Nicolov et al. |
| 2009/0306969 A1 | 12/2009 | Goud et al. |
| 2009/0306979 A1 | 12/2009 | Jaiswal et al. |
| 2009/0306980 A1 | 12/2009 | Shin |
| 2009/0306981 A1 | 12/2009 | Cromack et al. |
| 2009/0306985 A1 | 12/2009 | Roberts et al. |
| 2009/0306988 A1 | 12/2009 | Chen et al. |
| 2009/0306989 A1 | 12/2009 | Kaji |
| 2009/0307162 A1 | 12/2009 | Bui et al. |
| 2009/0307201 A1 | 12/2009 | Dunning et al. |
| 2009/0307584 A1 | 12/2009 | Davidson et al. |
| 2009/0307594 A1 | 12/2009 | Kosonen et al. |
| 2009/0309352 A1 | 12/2009 | Walker et al. |
| 2009/0313014 A1 | 12/2009 | Shin et al. |
| 2009/0313020 A1 | 12/2009 | Koivunen |
| 2009/0313023 A1 | 12/2009 | Jones |
| 2009/0313026 A1 | 12/2009 | Coffman et al. |
| 2009/0313544 A1 | 12/2009 | Wood et al. |
| 2009/0313564 A1 | 12/2009 | Rottler et al. |
| 2009/0316943 A1 | 12/2009 | Frigola Munoz et al. |
| 2009/0318119 A1 | 12/2009 | Basir et al. |
| 2009/0318198 A1 | 12/2009 | Carroll |
| 2009/0319257 A1 | 12/2009 | Blume et al. |
| 2009/0319266 A1 | 12/2009 | Brown et al. |
| 2009/0319342 A1 | 12/2009 | Shilman et al. |
| 2009/0326923 A1 | 12/2009 | Yan et al. |
| 2009/0326936 A1 | 12/2009 | Nagashima |
| 2009/0326938 A1 | 12/2009 | Marila et al. |
| 2009/0326949 A1 | 12/2009 | Douthitt et al. |
| 2009/0327977 A1 | 12/2009 | Bachfischer et al. |
| 2010/0004918 A1 | 1/2010 | Lee et al. |
| 2010/0004930 A1 | 1/2010 | Strope et al. |
| 2010/0004931 A1 | 1/2010 | Ma et al. |
| 2010/0005081 A1 | 1/2010 | Bennett |
| 2010/0010803 A1 | 1/2010 | Ishikawa et al. |
| 2010/0010814 A1 | 1/2010 | Patel |
| 2010/0010948 A1 | 1/2010 | Ito et al. |
| 2010/0013760 A1 | 1/2010 | Hirai et al. |
| 2010/0013796 A1 | 1/2010 | Abileah et al. |
| 2010/0017212 A1 | 1/2010 | Attwater et al. |
| 2010/0017382 A1 | 1/2010 | Katragadda et al. |
| 2010/0019834 A1 | 1/2010 | Zerbe et al. |
| 2010/0023318 A1 | 1/2010 | Lemoine |
| 2010/0023320 A1 | 1/2010 | Di Cristo et al. |
| 2010/0023331 A1 | 1/2010 | Duta et al. |
| 2010/0026526 A1 | 2/2010 | Yokota |
| 2010/0030549 A1 | 2/2010 | Lee et al. |
| 2010/0030928 A1 | 2/2010 | Conroy et al. |
| 2010/0031143 A1 | 2/2010 | Rao et al. |
| 2010/0036653 A1 | 2/2010 | Kim et al. |
| 2010/0036655 A1 | 2/2010 | Cecil et al. |
| 2010/0036660 A1 | 2/2010 | Bennett |
| 2010/0036928 A1 | 2/2010 | Granito et al. |
| 2010/0037183 A1 | 2/2010 | Miyashita et al. |
| 2010/0042400 A1 | 2/2010 | Block et al. |
| 2010/0042576 A1 | 2/2010 | Roettger et al. |
| 2010/0046842 A1 | 2/2010 | Conwell et al. |
| 2010/0049498 A1 | 2/2010 | Cao et al. |
| 2010/0049514 A1 | 2/2010 | Kennewick et al. |
| 2010/0050064 A1 | 2/2010 | Liu et al. |
| 2010/0054512 A1 | 3/2010 | Solum |
| 2010/0057435 A1 | 3/2010 | Kent et al. |
| 2010/0057443 A1 | 3/2010 | Di Cristo et al. |
| 2010/0057457 A1 | 3/2010 | Ogata et al. |
| 2010/0057461 A1 | 3/2010 | Neubacher et al. |
| 2010/0057643 A1 | 3/2010 | Yang |
| 2010/0058200 A1 | 3/2010 | Jablokov et al. |
| 2010/0060646 A1 | 3/2010 | Unsal et al. |
| 2010/0063804 A1 | 3/2010 | Sato et al. |
| 2010/0063825 A1 | 3/2010 | Williams et al. |
| 2010/0063961 A1 | 3/2010 | Guiheneuf et al. |

(56) References Cited

U.S. PATENT DOCUMENTS

| | | |
|---|---|---|
| 2010/0064113 A1 | 3/2010 | Lindahl et al. |
| 2010/0064218 A1 | 3/2010 | Bull et al. |
| 2010/0064226 A1 | 3/2010 | Stefaniak et al. |
| 2010/0066546 A1 | 3/2010 | Aaron |
| 2010/0066684 A1 | 3/2010 | Shahraray et al. |
| 2010/0067723 A1 | 3/2010 | Bergmann et al. |
| 2010/0067867 A1 | 3/2010 | Lin et al. |
| 2010/0070281 A1 | 3/2010 | Conkie et al. |
| 2010/0070517 A1 | 3/2010 | Ghosh et al. |
| 2010/0070521 A1 | 3/2010 | Clinchant et al. |
| 2010/0070899 A1 | 3/2010 | Hunt et al. |
| 2010/0071003 A1 | 3/2010 | Bychkov et al. |
| 2010/0076760 A1 | 3/2010 | Kraenzel et al. |
| 2010/0076993 A1 | 3/2010 | Klawitter et al. |
| 2010/0077350 A1 | 3/2010 | Lim et al. |
| 2010/0079501 A1 | 4/2010 | Ikeda et al. |
| 2010/0080398 A1 | 4/2010 | Waldmann |
| 2010/0080470 A1 | 4/2010 | Deluca et al. |
| 2010/0081456 A1 | 4/2010 | Singh et al. |
| 2010/0081487 A1 | 4/2010 | Chen et al. |
| 2010/0082286 A1 | 4/2010 | Leung |
| 2010/0082327 A1 | 4/2010 | Rogers et al. |
| 2010/0082328 A1 | 4/2010 | Rogers et al. |
| 2010/0082329 A1 | 4/2010 | Silverman et al. |
| 2010/0082333 A1 | 4/2010 | Al-Shammari |
| 2010/0082346 A1 | 4/2010 | Rogers et al. |
| 2010/0082347 A1 | 4/2010 | Rogers et al. |
| 2010/0082348 A1 | 4/2010 | Silverman et al. |
| 2010/0082349 A1 | 4/2010 | Bellegarda et al. |
| 2010/0082567 A1 | 4/2010 | Rosenblatt et al. |
| 2010/0082970 A1 | 4/2010 | Lindahl et al. |
| 2010/0086152 A1 | 4/2010 | Rank et al. |
| 2010/0086153 A1 | 4/2010 | Hagen et al. |
| 2010/0086156 A1 | 4/2010 | Rank et al. |
| 2010/0088020 A1 | 4/2010 | Sano et al. |
| 2010/0088093 A1 | 4/2010 | Lee et al. |
| 2010/0088100 A1 | 4/2010 | Lindahl |
| 2010/0094632 A1 | 4/2010 | Davis et al. |
| 2010/0098231 A1 | 4/2010 | Wohlert et al. |
| 2010/0100212 A1 | 4/2010 | Lindahl et al. |
| 2010/0100384 A1 | 4/2010 | Ju et al. |
| 2010/0100385 A1 | 4/2010 | Davis et al. |
| 2010/0100816 A1 | 4/2010 | Mccloskey et al. |
| 2010/0103776 A1 | 4/2010 | Chan |
| 2010/0106486 A1 | 4/2010 | Hua et al. |
| 2010/0106498 A1 | 4/2010 | Morrison et al. |
| 2010/0106500 A1 | 4/2010 | McKee et al. |
| 2010/0106503 A1 | 4/2010 | Farrell et al. |
| 2010/0114856 A1 | 5/2010 | Kuboyama |
| 2010/0114887 A1 | 5/2010 | Conway et al. |
| 2010/0121637 A1 | 5/2010 | Roy et al. |
| 2010/0125456 A1 | 5/2010 | Weng et al. |
| 2010/0125458 A1 | 5/2010 | Franco et al. |
| 2010/0125460 A1 | 5/2010 | Mellott et al. |
| 2010/0125811 A1 | 5/2010 | Moore et al. |
| 2010/0131269 A1 | 5/2010 | Park et al. |
| 2010/0131273 A1 | 5/2010 | Aley-Raz et al. |
| 2010/0131498 A1 | 5/2010 | Linthicum et al. |
| 2010/0131899 A1 | 5/2010 | Hubert |
| 2010/0138215 A1 | 6/2010 | Williams |
| 2010/0138224 A1 | 6/2010 | Bedingfield, Sr. |
| 2010/0138416 A1 | 6/2010 | Bellotti |
| 2010/0138680 A1 | 6/2010 | Brisebois et al. |
| 2010/0138759 A1 | 6/2010 | Roy |
| 2010/0138798 A1 | 6/2010 | Wilson et al. |
| 2010/0142740 A1 | 6/2010 | Roerup |
| 2010/0145694 A1 | 6/2010 | Ju et al. |
| 2010/0145700 A1 | 6/2010 | Kennewick et al. |
| 2010/0145707 A1 | 6/2010 | Ljolje et al. |
| 2010/0146442 A1 | 6/2010 | Nagasaka et al. |
| 2010/0150321 A1 | 6/2010 | Harris et al. |
| 2010/0153114 A1 | 6/2010 | Shih et al. |
| 2010/0153115 A1 | 6/2010 | Klee et al. |
| 2010/0153448 A1 | 6/2010 | Harpur et al. |
| 2010/0161311 A1 | 6/2010 | Massuh |
| 2010/0161313 A1 | 6/2010 | Karttunen |
| 2010/0161337 A1 | 6/2010 | Pulz et al. |
| 2010/0161554 A1 | 6/2010 | Datuashvili et al. |
| 2010/0164897 A1 | 7/2010 | Morin et al. |
| 2010/0169075 A1 | 7/2010 | Raffa et al. |
| 2010/0169093 A1 | 7/2010 | Washio |
| 2010/0169097 A1 | 7/2010 | Nachman et al. |
| 2010/0169098 A1 | 7/2010 | Patch |
| 2010/0171713 A1 | 7/2010 | Kwok et al. |
| 2010/0174544 A1 | 7/2010 | Heifets |
| 2010/0175066 A1 | 7/2010 | Paik |
| 2010/0179932 A1 | 7/2010 | Yoon et al. |
| 2010/0179991 A1 | 7/2010 | Lorch et al. |
| 2010/0180218 A1 | 7/2010 | Boston et al. |
| 2010/0185448 A1 | 7/2010 | Meisel |
| 2010/0185949 A1 | 7/2010 | Jaeger |
| 2010/0191520 A1 | 7/2010 | Gruhn et al. |
| 2010/0197359 A1 | 8/2010 | Harris |
| 2010/0199180 A1 | 8/2010 | Brichter et al. |
| 2010/0199215 A1 | 8/2010 | Seymour et al. |
| 2010/0204986 A1 | 8/2010 | Kennewick et al. |
| 2010/0211199 A1 | 8/2010 | Naik et al. |
| 2010/0211379 A1 | 8/2010 | Gorman et al. |
| 2010/0211644 A1 | 8/2010 | Lavoie et al. |
| 2010/0216509 A1 | 8/2010 | Riemer et al. |
| 2010/0217604 A1 | 8/2010 | Baldwin et al. |
| 2010/0222033 A1 | 9/2010 | Scott et al. |
| 2010/0222098 A1 | 9/2010 | Garg |
| 2010/0223055 A1 | 9/2010 | Mclean |
| 2010/0223056 A1 | 9/2010 | Kadirkamanathan et al. |
| 2010/0223131 A1 | 9/2010 | Scott et al. |
| 2010/0225599 A1 | 9/2010 | Danielsson et al. |
| 2010/0225809 A1 | 9/2010 | Connors et al. |
| 2010/0227642 A1 | 9/2010 | Kim et al. |
| 2010/0228540 A1 | 9/2010 | Bennett |
| 2010/0228549 A1 | 9/2010 | Herman et al. |
| 2010/0228691 A1 | 9/2010 | Yang et al. |
| 2010/0229082 A1 | 9/2010 | Karmarkar et al. |
| 2010/0229100 A1 | 9/2010 | Miller et al. |
| 2010/0231474 A1 | 9/2010 | Yamagajo et al. |
| 2010/0235167 A1 | 9/2010 | Bourdon |
| 2010/0235341 A1 | 9/2010 | Bennett |
| 2010/0235729 A1 | 9/2010 | Kocienda et al. |
| 2010/0235732 A1 | 9/2010 | Bergman |
| 2010/0235770 A1 | 9/2010 | Ording et al. |
| 2010/0235780 A1 | 9/2010 | Westerman et al. |
| 2010/0241418 A1 | 9/2010 | Maeda et al. |
| 2010/0250542 A1 | 9/2010 | Fujimaki |
| 2010/0250599 A1 | 9/2010 | Schmidt et al. |
| 2010/0255858 A1 | 10/2010 | Juhasz |
| 2010/0257160 A1 | 10/2010 | Cao |
| 2010/0257478 A1 | 10/2010 | Longe et al. |
| 2010/0262599 A1 | 10/2010 | Nitz |
| 2010/0268537 A1 | 10/2010 | Al-Telmissani |
| 2010/0268539 A1 | 10/2010 | Xu et al. |
| 2010/0269040 A1 | 10/2010 | Lee |
| 2010/0274753 A1 | 10/2010 | Liberty et al. |
| 2010/0277579 A1 | 11/2010 | Cho et al. |
| 2010/0278320 A1 | 11/2010 | Arsenault et al. |
| 2010/0278453 A1 | 11/2010 | King |
| 2010/0280983 A1 | 11/2010 | Cho et al. |
| 2010/0281034 A1 | 11/2010 | Petrou et al. |
| 2010/0286984 A1 | 11/2010 | Wandinger et al. |
| 2010/0286985 A1 | 11/2010 | Kennewick et al. |
| 2010/0287514 A1 | 11/2010 | Cragun et al. |
| 2010/0290632 A1* | 11/2010 | Lin ................... G01S 3/8006 381/56 |
| 2010/0293460 A1 | 11/2010 | Budelli |
| 2010/0295645 A1 | 11/2010 | Falldin et al. |
| 2010/0299133 A1 | 11/2010 | Kopparapu et al. |
| 2010/0299138 A1 | 11/2010 | Kim |
| 2010/0299142 A1 | 11/2010 | Freeman et al. |
| 2010/0302056 A1 | 12/2010 | Dutton et al. |
| 2010/0304342 A1 | 12/2010 | Zilber |
| 2010/0304705 A1 | 12/2010 | Hursey et al. |
| 2010/0305807 A1 | 12/2010 | Basir et al. |
| 2010/0305947 A1 | 12/2010 | Schwarz et al. |
| 2010/0312547 A1 | 12/2010 | Van Os et al. |
| 2010/0312566 A1 | 12/2010 | Odinak et al. |

(56) References Cited

U.S. PATENT DOCUMENTS

| | | |
|---|---|---|
| 2010/0318366 A1 | 12/2010 | Sullivan et al. |
| 2010/0318576 A1 | 12/2010 | Kim |
| 2010/0322438 A1 | 12/2010 | Siotis |
| 2010/0324709 A1 | 12/2010 | Starmen |
| 2010/0324895 A1 | 12/2010 | Kurzweil et al. |
| 2010/0324896 A1 | 12/2010 | Attwater et al. |
| 2010/0324905 A1 | 12/2010 | Kurzweil et al. |
| 2010/0325131 A1 | 12/2010 | Dumais et al. |
| 2010/0325158 A1 | 12/2010 | Oral et al. |
| 2010/0325573 A1 | 12/2010 | Estrada et al. |
| 2010/0325588 A1 | 12/2010 | Reddy et al. |
| 2010/0330908 A1 | 12/2010 | Maddern et al. |
| 2010/0332220 A1 | 12/2010 | Hursey et al. |
| 2010/0332224 A1 | 12/2010 | Mäkelä et al. |
| 2010/0332235 A1 | 12/2010 | David |
| 2010/0332236 A1 | 12/2010 | Tan |
| 2010/0332280 A1 | 12/2010 | Bradley et al. |
| 2010/0332348 A1 | 12/2010 | Cao |
| 2010/0332428 A1 | 12/2010 | Mchenry et al. |
| 2010/0332976 A1 | 12/2010 | Fux et al. |
| 2010/0333030 A1 | 12/2010 | Johns |
| 2010/0333163 A1 | 12/2010 | Daly |
| 2011/0002487 A1 | 1/2011 | Panther et al. |
| 2011/0004475 A1 | 1/2011 | Bellegarda |
| 2011/0006876 A1 | 1/2011 | Moberg et al. |
| 2011/0009107 A1 | 1/2011 | Guba et al. |
| 2011/0010178 A1 | 1/2011 | Lee et al. |
| 2011/0010644 A1 | 1/2011 | Merrill et al. |
| 2011/0015928 A1 | 1/2011 | Odell et al. |
| 2011/0016150 A1 | 1/2011 | Engstrom et al. |
| 2011/0016421 A1 | 1/2011 | Krupka et al. |
| 2011/0018695 A1 | 1/2011 | Bells et al. |
| 2011/0021211 A1 | 1/2011 | Ohki |
| 2011/0021213 A1 | 1/2011 | Carr |
| 2011/0022292 A1 | 1/2011 | Shen et al. |
| 2011/0022388 A1 | 1/2011 | Wu et al. |
| 2011/0022393 A1 | 1/2011 | Waller et al. |
| 2011/0022394 A1 | 1/2011 | Wide et al. |
| 2011/0022472 A1 | 1/2011 | Zon et al. |
| 2011/0022952 A1 | 1/2011 | Wu et al. |
| 2011/0029616 A1 | 2/2011 | Wang et al. |
| 2011/0030067 A1 | 2/2011 | Wilson |
| 2011/0033064 A1 | 2/2011 | Johnson et al. |
| 2011/0034183 A1 | 2/2011 | Haag et al. |
| 2011/0035144 A1 | 2/2011 | Okamoto et al. |
| 2011/0035434 A1 | 2/2011 | Lockwood |
| 2011/0038489 A1 | 2/2011 | Visser et al. |
| 2011/0040707 A1 | 2/2011 | Theisen et al. |
| 2011/0045841 A1 | 2/2011 | Kuhlke et al. |
| 2011/0047072 A1 | 2/2011 | Ciurea |
| 2011/0047149 A1 | 2/2011 | Vaananen |
| 2011/0047161 A1 | 2/2011 | Myaeng et al. |
| 2011/0047266 A1 | 2/2011 | Yu et al. |
| 2011/0047605 A1 | 2/2011 | Sontag et al. |
| 2011/0050591 A1 | 3/2011 | Kim et al. |
| 2011/0050592 A1 | 3/2011 | Kim et al. |
| 2011/0054647 A1 | 3/2011 | Chipchase |
| 2011/0054894 A1 | 3/2011 | Phillips et al. |
| 2011/0054901 A1 | 3/2011 | Qin et al. |
| 2011/0055256 A1 | 3/2011 | Phillips et al. |
| 2011/0060584 A1 | 3/2011 | Ferrucci et al. |
| 2011/0060587 A1 | 3/2011 | Phillips et al. |
| 2011/0060589 A1 | 3/2011 | Weinberg et al. |
| 2011/0060807 A1 | 3/2011 | Martin et al. |
| 2011/0064387 A1 | 3/2011 | Mendeloff et al. |
| 2011/0065456 A1 | 3/2011 | Brennan et al. |
| 2011/0066366 A1 | 3/2011 | Ellanti et al. |
| 2011/0066468 A1 | 3/2011 | Huang et al. |
| 2011/0066634 A1 | 3/2011 | Phillips et al. |
| 2011/0072033 A1 | 3/2011 | White et al. |
| 2011/0072492 A1 | 3/2011 | Mohler et al. |
| 2011/0076994 A1 | 3/2011 | Kim et al. |
| 2011/0077943 A1 | 3/2011 | Miki et al. |
| 2011/0080260 A1 | 4/2011 | Wang et al. |
| 2011/0081889 A1 | 4/2011 | Gao et al. |
| 2011/0082688 A1 | 4/2011 | Kim et al. |
| 2011/0083079 A1 | 4/2011 | Farrell et al. |
| 2011/0087491 A1 | 4/2011 | Wittenstein et al. |
| 2011/0087685 A1 | 4/2011 | Lin et al. |
| 2011/0090078 A1 | 4/2011 | Kim et al. |
| 2011/0092187 A1 | 4/2011 | Miller |
| 2011/0093261 A1 | 4/2011 | Angott |
| 2011/0093265 A1 | 4/2011 | Stent et al. |
| 2011/0093271 A1 | 4/2011 | Bernard et al. |
| 2011/0093272 A1 | 4/2011 | Isobe et al. |
| 2011/0099000 A1 | 4/2011 | Rai et al. |
| 2011/0103682 A1 | 5/2011 | Chidlovskii et al. |
| 2011/0105097 A1 | 5/2011 | Tadayon et al. |
| 2011/0106736 A1 | 5/2011 | Aharonson et al. |
| 2011/0106892 A1 | 5/2011 | Nelson et al. |
| 2011/0110502 A1 | 5/2011 | Daye et al. |
| 2011/0111724 A1 | 5/2011 | Baptiste |
| 2011/0112825 A1 | 5/2011 | Bellegarda |
| 2011/0112827 A1 | 5/2011 | Kennewick et al. |
| 2011/0112837 A1 | 5/2011 | Kurki-Suonio et al. |
| 2011/0112838 A1 | 5/2011 | Adibi |
| 2011/0112921 A1 | 5/2011 | Kennewick et al. |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0119623 A1 | 5/2011 | Kim |
| 2011/0119715 A1 | 5/2011 | Chang et al. |
| 2011/0123004 A1 | 5/2011 | Chang et al. |
| 2011/0125498 A1 | 5/2011 | Pickering et al. |
| 2011/0125540 A1 | 5/2011 | Jang et al. |
| 2011/0125701 A1 | 5/2011 | Nair et al. |
| 2011/0130958 A1 | 6/2011 | Stahl et al. |
| 2011/0131036 A1 | 6/2011 | DiCristo et al. |
| 2011/0131038 A1 | 6/2011 | Oyaizu et al. |
| 2011/0131045 A1 | 6/2011 | Cristo et al. |
| 2011/0137636 A1 | 6/2011 | Srihari et al. |
| 2011/0141141 A1 | 6/2011 | Kankainen |
| 2011/0143726 A1 | 6/2011 | de Silva |
| 2011/0143811 A1 | 6/2011 | Rodriguez |
| 2011/0144857 A1 | 6/2011 | Wingrove et al. |
| 2011/0144901 A1 | 6/2011 | Wang |
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151830 A1 | 6/2011 | Blanda et al. |
| 2011/0153209 A1 | 6/2011 | Geelen |
| 2011/0153322 A1 | 6/2011 | Kwak et al. |
| 2011/0153324 A1 | 6/2011 | Ballinger et al. |
| 2011/0153329 A1 | 6/2011 | Moorer |
| 2011/0153330 A1 | 6/2011 | Yazdani et al. |
| 2011/0153373 A1 | 6/2011 | Dantzig et al. |
| 2011/0154193 A1 | 6/2011 | Creutz et al. |
| 2011/0157029 A1 | 6/2011 | Tseng |
| 2011/0161072 A1 | 6/2011 | Terao et al. |
| 2011/0161076 A1 | 6/2011 | Davis et al. |
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0166851 A1 | 7/2011 | LeBeau et al. |
| 2011/0167350 A1 | 7/2011 | Hoellwarth |
| 2011/0175810 A1 | 7/2011 | Markovic et al. |
| 2011/0179002 A1 | 7/2011 | Dumitru et al. |
| 2011/0179372 A1 | 7/2011 | Moore et al. |
| 2011/0183650 A1 | 7/2011 | Mckee et al. |
| 2011/0184721 A1 | 7/2011 | Subramanian et al. |
| 2011/0184730 A1 | 7/2011 | LeBeau et al. |
| 2011/0184736 A1 | 7/2011 | Slotznick |
| 2011/0184737 A1 | 7/2011 | Nakano et al. |
| 2011/0184768 A1 | 7/2011 | Norton et al. |
| 2011/0185288 A1 | 7/2011 | Gupta et al. |
| 2011/0191108 A1 | 8/2011 | Friedlander |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0196670 A1 | 8/2011 | Dang et al. |
| 2011/0197128 A1 | 8/2011 | Assadollahi et al. |
| 2011/0199312 A1 | 8/2011 | Okuta |
| 2011/0201385 A1 | 8/2011 | Higginbotham et al. |
| 2011/0201387 A1 | 8/2011 | Peek et al. |

(56) References Cited

U.S. PATENT DOCUMENTS

| | | |
|---|---|---|
| 2011/0202526 A1 | 8/2011 | Lee et al. |
| 2011/0205149 A1 | 8/2011 | Tom et al. |
| 2011/0208511 A1 | 8/2011 | Sikstrom et al. |
| 2011/0208524 A1 | 8/2011 | Haughay |
| 2011/0209088 A1 | 8/2011 | Hinckley et al. |
| 2011/0212717 A1 | 9/2011 | Rhoads et al. |
| 2011/0216093 A1 | 9/2011 | Griffin |
| 2011/0218806 A1 | 9/2011 | Alewine et al. |
| 2011/0218855 A1 | 9/2011 | Cao et al. |
| 2011/0219018 A1 | 9/2011 | Bailey et al. |
| 2011/0223893 A1 | 9/2011 | Lau et al. |
| 2011/0224972 A1 | 9/2011 | Millett et al. |
| 2011/0228913 A1 | 9/2011 | Cochinwala et al. |
| 2011/0231182 A1 | 9/2011 | Weider et al. |
| 2011/0231184 A1 | 9/2011 | Kerr |
| 2011/0231188 A1 | 9/2011 | Kennewick et al. |
| 2011/0231432 A1 | 9/2011 | Sata et al. |
| 2011/0231474 A1 | 9/2011 | Locker et al. |
| 2011/0238191 A1 | 9/2011 | Kristjansson et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0239111 A1 | 9/2011 | Grover |
| 2011/0242007 A1 | 10/2011 | Gray et al. |
| 2011/0244888 A1 | 10/2011 | Ohki |
| 2011/0246471 A1 | 10/2011 | Rakib et al. |
| 2011/0249144 A1 | 10/2011 | Chang |
| 2011/0250570 A1 | 10/2011 | Mack et al. |
| 2011/0257966 A1 | 10/2011 | Rychlik |
| 2011/0258188 A1 | 10/2011 | Abdalmageed et al. |
| 2011/0260829 A1 | 10/2011 | Lee |
| 2011/0260861 A1 | 10/2011 | Singh et al. |
| 2011/0264643 A1 | 10/2011 | Cao |
| 2011/0264999 A1 | 10/2011 | Bells et al. |
| 2011/0274303 A1 | 11/2011 | Filson et al. |
| 2011/0276595 A1 | 11/2011 | Kirkland et al. |
| 2011/0276598 A1 | 11/2011 | Kozempel |
| 2011/0276944 A1 | 11/2011 | Bergman et al. |
| 2011/0279368 A1 | 11/2011 | Klein et al. |
| 2011/0282663 A1* | 11/2011 | Talwar .................... G10L 15/20 704/233 |
| 2011/0282888 A1 | 11/2011 | Koperski et al. |
| 2011/0282906 A1 | 11/2011 | Wong |
| 2011/0283189 A1 | 11/2011 | McCarty |
| 2011/0288852 A1 | 11/2011 | Dymetman et al. |
| 2011/0288855 A1 | 11/2011 | Roy |
| 2011/0288861 A1 | 11/2011 | Kurzweil et al. |
| 2011/0288863 A1 | 11/2011 | Rasmussen |
| 2011/0288866 A1 | 11/2011 | Rasmussen |
| 2011/0298585 A1 | 12/2011 | Barry |
| 2011/0301943 A1 | 12/2011 | Patch |
| 2011/0302162 A1 | 12/2011 | Xiao et al. |
| 2011/0306426 A1 | 12/2011 | Novak et al. |
| 2011/0307241 A1 | 12/2011 | Waibel et al. |
| 2011/0307491 A1 | 12/2011 | Fisk et al. |
| 2011/0307810 A1 | 12/2011 | Hilerio et al. |
| 2011/0313775 A1 | 12/2011 | Laligand et al. |
| 2011/0314003 A1 | 12/2011 | Ju et al. |
| 2011/0314032 A1 | 12/2011 | Bennett et al. |
| 2011/0314404 A1 | 12/2011 | Kotler et al. |
| 2011/0320187 A1 | 12/2011 | Motik et al. |
| 2012/0002820 A1 | 1/2012 | Leichter |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1 | 1/2012 | Gruber et al. |
| 2012/0019400 A1 | 1/2012 | Patel et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0035935 A1 | 2/2012 | Park et al. |
| 2012/0036556 A1 | 2/2012 | LeBeau et al. |
| 2012/0039539 A1 | 2/2012 | Boiman et al. |
| 2012/0041752 A1 | 2/2012 | Wang et al. |
| 2012/0042014 A1 | 2/2012 | Desai et al. |
| 2012/0042343 A1 | 2/2012 | Laligand et al. |
| 2012/0053815 A1 | 3/2012 | Montanan et al. |
| 2012/0053829 A1 | 3/2012 | Agarwal et al. |
| 2012/0053945 A1 | 3/2012 | Gupta et al. |
| 2012/0056815 A1 | 3/2012 | Mehra |
| 2012/0059655 A1 | 3/2012 | Cartales |
| 2012/0059813 A1 | 3/2012 | Sejnoha et al. |
| 2012/0062473 A1 | 3/2012 | Xiao et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0077479 A1 | 3/2012 | Sabotta et al. |
| 2012/0078611 A1 | 3/2012 | Soltani et al. |
| 2012/0078624 A1 | 3/2012 | Yook et al. |
| 2012/0078627 A1 | 3/2012 | Wagner |
| 2012/0078635 A1 | 3/2012 | Rothkopf et al. |
| 2012/0078747 A1 | 3/2012 | Chakrabarti et al. |
| 2012/0082317 A1 | 4/2012 | Pence et al. |
| 2012/0083286 A1 | 4/2012 | Kim et al. |
| 2012/0084086 A1 | 4/2012 | Gilbert et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0101823 A1 | 4/2012 | Weng et al. |
| 2012/0108166 A1 | 5/2012 | Hymel |
| 2012/0108221 A1 | 5/2012 | Thomas et al. |
| 2012/0116770 A1 | 5/2012 | Chen et al. |
| 2012/0117499 A1 | 5/2012 | Mori et al. |
| 2012/0124126 A1 | 5/2012 | Alcazar et al. |
| 2012/0128322 A1 | 5/2012 | Shaffer et al. |
| 2012/0130709 A1 | 5/2012 | Bocchieri et al. |
| 2012/0136572 A1 | 5/2012 | Norton |
| 2012/0136855 A1 | 5/2012 | Ni et al. |
| 2012/0136985 A1 | 5/2012 | Popescu et al. |
| 2012/0137367 A1 | 5/2012 | Dupont et al. |
| 2012/0149342 A1 | 6/2012 | Cohen et al. |
| 2012/0149394 A1 | 6/2012 | Singh et al. |
| 2012/0150544 A1 | 6/2012 | McLoughlin et al. |
| 2012/0150580 A1 | 6/2012 | Norton |
| 2012/0158293 A1 | 6/2012 | Burnham |
| 2012/0158399 A1 | 6/2012 | Tremblay et al. |
| 2012/0158422 A1 | 6/2012 | Burnham et al. |
| 2012/0159380 A1 | 6/2012 | Kocienda et al. |
| 2012/0163710 A1 | 6/2012 | Skaff et al. |
| 2012/0166196 A1 | 6/2012 | Ju et al. |
| 2012/0173222 A1 | 7/2012 | Wang et al. |
| 2012/0173244 A1 | 7/2012 | Kwak et al. |
| 2012/0173464 A1 | 7/2012 | Tur et al. |
| 2012/0174121 A1 | 7/2012 | Treat et al. |
| 2012/0179457 A1 | 7/2012 | Newman et al. |
| 2012/0179467 A1 | 7/2012 | Williams |
| 2012/0185237 A1 | 7/2012 | Gajic et al. |
| 2012/0185480 A1 | 7/2012 | Ni et al. |
| 2012/0185781 A1 | 7/2012 | Guzman et al. |

(56) References Cited

U.S. PATENT DOCUMENTS

| | | |
|---|---|---|
| 2012/0191461 A1 | 7/2012 | Lin et al. |
| 2012/0192096 A1 | 7/2012 | Bowman et al. |
| 2012/0197743 A1 | 8/2012 | Grigg et al. |
| 2012/0197995 A1 | 8/2012 | Caruso |
| 2012/0197998 A1 | 8/2012 | Kessel et al. |
| 2012/0201362 A1 | 8/2012 | Crossan et al. |
| 2012/0209853 A1 | 8/2012 | Desai et al. |
| 2012/0209874 A1 | 8/2012 | Wong et al. |
| 2012/0210266 A1 | 8/2012 | Jiang et al. |
| 2012/0214141 A1 | 8/2012 | Raya et al. |
| 2012/0214517 A1 | 8/2012 | Singh et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl et al. |
| 2012/0233266 A1 | 9/2012 | Hassan et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245939 A1 | 9/2012 | Braho et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0259615 A1 | 10/2012 | Morin et al. |
| 2012/0265528 A1 | 10/2012 | Gruber et al. |
| 2012/0265535 A1 | 10/2012 | Bryant-Rich et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0275377 A1 | 11/2012 | Lehane et al. |
| 2012/0284015 A1 | 11/2012 | Drewes |
| 2012/0284027 A1 | 11/2012 | Mallett et al. |
| 2012/0290291 A1 | 11/2012 | Shelley et al. |
| 2012/0290300 A1 | 11/2012 | Lee et al. |
| 2012/0295708 A1 | 11/2012 | Hernandez-Abrego et al. |
| 2012/0296638 A1 | 11/2012 | Patwa |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O'Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316862 A1 | 12/2012 | Sultan et al. |
| 2012/0316875 A1 | 12/2012 | Nyquist et al. |
| 2012/0316878 A1 | 12/2012 | Singleton et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0324391 A1 | 12/2012 | Tocci et al. |
| 2012/0327009 A1 | 12/2012 | Fleizach |
| 2012/0329529 A1 | 12/2012 | van der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007648 A1 | 1/2013 | Gamon et al. |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0018659 A1 | 1/2013 | Chi |
| 2013/0024576 A1 | 1/2013 | Dishneau et al. |
| 2013/0027875 A1 | 1/2013 | Zhu et al. |
| 2013/0030787 A1 | 1/2013 | Cancedda et al. |
| 2013/0030789 A1 | 1/2013 | Dalce |
| 2013/0030804 A1 | 1/2013 | Zavaliagko et al. |
| 2013/0030815 A1 | 1/2013 | Madhvanath et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041968 A1 | 2/2013 | Cohen et al. |
| 2013/0046544 A1 | 2/2013 | Kay et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054675 A1 | 2/2013 | Jenkins et al. |
| 2013/0054706 A1 | 2/2013 | Graham et al. |
| 2013/0055099 A1 | 2/2013 | Yao et al. |
| 2013/0055147 A1 | 2/2013 | Vasudev et al. |
| 2013/0063611 A1 | 3/2013 | Papakipos et al. |
| 2013/0066832 A1 | 3/2013 | Sheehan et al. |
| 2013/0067307 A1 | 3/2013 | Tian et al. |
| 2013/0073286 A1 | 3/2013 | Bastea-Forte et al. |
| 2013/0073346 A1 | 3/2013 | Chun et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080251 A1 | 3/2013 | Dempski |
| 2013/0082967 A1 | 4/2013 | Hillis et al. |
| 2013/0085755 A1 | 4/2013 | Bringert et al. |
| 2013/0085761 A1 | 4/2013 | Bringert et al. |
| 2013/0090921 A1 | 4/2013 | Liu et al. |
| 2013/0091090 A1 | 4/2013 | Spivack et al. |
| 2013/0095805 A1 | 4/2013 | Lebeau et al. |
| 2013/0096909 A1 | 4/2013 | Brun et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100268 A1 | 4/2013 | Mihailidis et al. |
| 2013/0103391 A1 | 4/2013 | Millmore et al. |
| 2013/0103405 A1 | 4/2013 | Namba et al. |
| 2013/0106742 A1 | 5/2013 | Lee et al. |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen et al. |

(56) References Cited

U.S. PATENT DOCUMENTS

| | | |
|---|---|---|
| 2013/0124189 A1 | 5/2013 | Baldwin et al. |
| 2013/0132084 A1 | 5/2013 | Stonehocker et al. |
| 2013/0132089 A1 | 5/2013 | Fanty et al. |
| 2013/0132871 A1 | 5/2013 | Zeng et al. |
| 2013/0141551 A1 | 6/2013 | Kim |
| 2013/0142317 A1 | 6/2013 | Reynolds |
| 2013/0142345 A1* | 6/2013 | Waldmann .............. H04R 25/70 381/56 |
| 2013/0144594 A1 | 6/2013 | Bangalore et al. |
| 2013/0144616 A1 | 6/2013 | Bangalore et al. |
| 2013/0151339 A1 | 6/2013 | Kim et al. |
| 2013/0152092 A1 | 6/2013 | Yadgar et al. |
| 2013/0154811 A1 | 6/2013 | Ferren et al. |
| 2013/0157629 A1 | 6/2013 | Lee et al. |
| 2013/0158977 A1 | 6/2013 | Senior |
| 2013/0165232 A1 | 6/2013 | Nelson et al. |
| 2013/0166303 A1 | 6/2013 | Chang et al. |
| 2013/0166442 A1 | 6/2013 | Nakajima et al. |
| 2013/0170738 A1 | 7/2013 | Capuozzo et al. |
| 2013/0172022 A1 | 7/2013 | Seymour et al. |
| 2013/0176244 A1 | 7/2013 | Yamamoto et al. |
| 2013/0176592 A1 | 7/2013 | Sasaki |
| 2013/0179440 A1 | 7/2013 | Gordon |
| 2013/0183944 A1 | 7/2013 | Mozer et al. |
| 2013/0185059 A1 | 7/2013 | Riccardi et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0191117 A1 | 7/2013 | Atti et al. |
| 2013/0197911 A1 | 8/2013 | Wei et al. |
| 2013/0204813 A1 | 8/2013 | Master et al. |
| 2013/0204897 A1 | 8/2013 | McDougall |
| 2013/0207898 A1 | 8/2013 | Sullivan et al. |
| 2013/0218553 A1 | 8/2013 | Fujii et al. |
| 2013/0218560 A1 | 8/2013 | Hsiao et al. |
| 2013/0219333 A1 | 8/2013 | Palwe et al. |
| 2013/0222249 A1 | 8/2013 | Pasquero et al. |
| 2013/0225128 A1 | 8/2013 | Gomar |
| 2013/0226935 A1 | 8/2013 | Bai et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar et al. |
| 2013/0238647 A1 | 9/2013 | Thompson |
| 2013/0244615 A1 | 9/2013 | Miller et al. |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0253911 A1 | 9/2013 | Petri et al. |
| 2013/0253912 A1 | 9/2013 | Medlock et al. |
| 2013/0275117 A1 | 10/2013 | Winer |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0282709 A1 | 10/2013 | Zhu et al. |
| 2013/0283168 A1 | 10/2013 | Brown et al. |
| 2013/0289991 A1 | 10/2013 | Eshwar et al. |
| 2013/0289993 A1 | 10/2013 | Rao et al. |
| 2013/0289994 A1 | 10/2013 | Newman et al. |
| 2013/0291015 A1 | 10/2013 | Pan |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311184 A1 | 11/2013 | Badavne et al. |
| 2013/0311997 A1 | 11/2013 | Gruber et al. |
| 2013/0316746 A1 | 11/2013 | Miller et al. |
| 2013/0322634 A1 | 12/2013 | Bennett et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325481 A1 | 12/2013 | Van Os et al. |
| 2013/0325484 A1 | 12/2013 | Chakladar et al. |
| 2013/0325967 A1 | 12/2013 | Parks et al. |
| 2013/0325979 A1 | 12/2013 | Mansfield et al. |
| 2013/0329023 A1 | 12/2013 | Suplee, III et al. |
| 2013/0331127 A1 | 12/2013 | Sabatelli et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332400 A1 | 12/2013 | González |
| 2013/0339256 A1 | 12/2013 | Shroff |
| 2013/0346068 A1 | 12/2013 | Solem et al. |
| 2013/0346347 A1 | 12/2013 | Patterson et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006030 A1 | 1/2014 | Fleizach et al. |
| 2014/0006153 A1 | 1/2014 | Thangam et al. |
| 2014/0012574 A1 | 1/2014 | Pasupalak et al. |
| 2014/0012580 A1 | 1/2014 | Ganong et al. |
| 2014/0012586 A1* | 1/2014 | Rubin .................... G10L 25/51 704/273 |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0028735 A1 | 1/2014 | Williams et al. |
| 2014/0032453 A1 | 1/2014 | Eustice et al. |
| 2014/0033071 A1 | 1/2014 | Gruber et al. |
| 2014/0035823 A1 | 2/2014 | Khoe et al. |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040801 A1 | 2/2014 | Patel et al. |
| 2014/0040918 A1 | 2/2014 | Li et al. |
| 2014/0046934 A1 | 2/2014 | Zhou et al. |
| 2014/0047001 A1 | 2/2014 | Phillips et al. |
| 2014/0052680 A1 | 2/2014 | Nitz et al. |
| 2014/0052791 A1 | 2/2014 | Chakra et al. |
| 2014/0053082 A1 | 2/2014 | Park et al. |
| 2014/0053210 A1 | 2/2014 | Cheong et al. |
| 2014/0057610 A1 | 2/2014 | Olincy et al. |
| 2014/0059030 A1 | 2/2014 | Hakkani-Tur et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0068751 A1 | 3/2014 | Last et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074483 A1 | 3/2014 | Van Os |
| 2014/0074815 A1 | 3/2014 | Plimton |
| 2014/0078065 A1 | 3/2014 | Akkok et al. |
| 2014/0079195 A1 | 3/2014 | Srivastava et al. |
| 2014/0080428 A1 | 3/2014 | Rhoads et al. |
| 2014/0081633 A1 | 3/2014 | Badaskar et al. |
| 2014/0082501 A1 | 3/2014 | Bae et al. |
| 2014/0086458 A1 | 3/2014 | Rogers et al. |
| 2014/0087711 A1 | 3/2014 | Geyer et al. |
| 2014/0088961 A1 | 3/2014 | Woodward et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0096209 A1 | 4/2014 | Saraf et al. |
| 2014/0098247 A1 | 4/2014 | Rao et al. |
| 2014/0108017 A1 | 4/2014 | Mason et al. |
| 2014/0114554 A1 | 4/2014 | Lagassey |
| 2014/0118155 A1 | 5/2014 | Bowers et al. |
| 2014/0122059 A1 | 5/2014 | Patel et al. |
| 2014/0122086 A1 | 5/2014 | Kapur et al. |

(56) References Cited

U.S. PATENT DOCUMENTS

| | | |
|---|---|---|
| 2014/0122136 A1 | 5/2014 | Jayanthi |
| 2014/0122153 A1 | 5/2014 | Truitt |
| 2014/0134983 A1 | 5/2014 | Jung et al. |
| 2014/0135036 A1 | 5/2014 | Bonanni et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0142922 A1 | 5/2014 | Liang et al. |
| 2014/0142923 A1 | 5/2014 | Jones et al. |
| 2014/0142935 A1 | 5/2014 | Lindahl et al. |
| 2014/0143550 A1 | 5/2014 | Ganong, III et al. |
| 2014/0143721 A1 | 5/2014 | Suzuki et al. |
| 2014/0146200 A1 | 5/2014 | Scott et al. |
| 2014/0152577 A1 | 6/2014 | Yuen et al. |
| 2014/0155031 A1 | 6/2014 | Lee et al. |
| 2014/0157422 A1 | 6/2014 | Livshits et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163977 A1 | 6/2014 | Hoffmeister et al. |
| 2014/0163981 A1 | 6/2014 | Cook et al. |
| 2014/0163995 A1 | 6/2014 | Burns et al. |
| 2014/0164476 A1 | 6/2014 | Thomson |
| 2014/0164532 A1 | 6/2014 | Lynch et al. |
| 2014/0164533 A1 | 6/2014 | Lynch et al. |
| 2014/0169795 A1 | 6/2014 | Clough |
| 2014/0172878 A1 | 6/2014 | Clark et al. |
| 2014/0173460 A1 | 6/2014 | Kim |
| 2014/0180499 A1 | 6/2014 | Cooper et al. |
| 2014/0180689 A1 | 6/2014 | Kim et al. |
| 2014/0180697 A1 | 6/2014 | Torok et al. |
| 2014/0181865 A1 | 6/2014 | Koganei |
| 2014/0188477 A1 | 7/2014 | Zhang |
| 2014/0195226 A1 | 7/2014 | Yun et al. |
| 2014/0195230 A1 | 7/2014 | Han et al. |
| 2014/0195233 A1 | 7/2014 | Bapat |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207468 A1 | 7/2014 | Bartnik |
| 2014/0207582 A1 | 7/2014 | Flinn et al. |
| 2014/0214429 A1 | 7/2014 | Pantel |
| 2014/0214537 A1 | 7/2014 | Yoo et al. |
| 2014/0218372 A1 | 8/2014 | Missig et al. |
| 2014/0222436 A1 | 8/2014 | Binder et al. |
| 2014/0222678 A1 | 8/2014 | Sheets et al. |
| 2014/0223377 A1 | 8/2014 | Shaw et al. |
| 2014/0223481 A1 | 8/2014 | Fundament |
| 2014/0230055 A1 | 8/2014 | Boehl |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244268 A1 | 8/2014 | Abdelsamie et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249817 A1 | 9/2014 | Hart et al. |
| 2014/0249821 A1 | 9/2014 | Kennewick et al. |
| 2014/0250046 A1 | 9/2014 | Winn et al. |
| 2014/0257809 A1 | 9/2014 | Goel et al. |
| 2014/0257815 A1 | 9/2014 | Zhao et al. |
| 2014/0258857 A1 | 9/2014 | Dykstra-Erickson et al. |
| 2014/0267022 A1 | 9/2014 | Kim |
| 2014/0267599 A1 | 9/2014 | Drouin et al. |
| 2014/0272821 A1 | 9/2014 | Pitschel et al. |
| 2014/0274005 A1 | 9/2014 | Luna et al. |
| 2014/0274203 A1 | 9/2014 | Ganong et al. |
| 2014/0274211 A1 | 9/2014 | Sejnoha et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278429 A1 | 9/2014 | Ganong, III |
| 2014/0278435 A1 | 9/2014 | Ganong et al. |
| 2014/0278443 A1 | 9/2014 | Gunn et al. |
| 2014/0278513 A1 | 9/2014 | Prakash et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0281983 A1 | 9/2014 | Xian et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282201 A1 | 9/2014 | Pasquero et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0304605 A1 | 10/2014 | Ohmura et al. |
| 2014/0310001 A1 | 10/2014 | Kalns et al. |
| 2014/0310002 A1 | 10/2014 | Nitz et al. |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324884 A1 | 10/2014 | Lindahl et al. |
| 2014/0337048 A1 | 11/2014 | Brown et al. |
| 2014/0337266 A1 | 11/2014 | Wolverton et al. |
| 2014/0337371 A1 | 11/2014 | Li |
| 2014/0337438 A1 | 11/2014 | Govande et al. |
| 2014/0337751 A1 | 11/2014 | Lim et al. |
| 2014/0337814 A1 | 11/2014 | Kalns et al. |
| 2014/0342762 A1 | 11/2014 | Hajdu et al. |
| 2014/0344627 A1 | 11/2014 | Schaub et al. |
| 2014/0344687 A1 | 11/2014 | Durham et al. |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358523 A1 | 12/2014 | Sheth et al. |
| 2014/0361973 A1 | 12/2014 | Raux et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365880 A1 | 12/2014 | Bellegarda |
| 2014/0365885 A1 | 12/2014 | Carson et al. |
| 2014/0365895 A1 | 12/2014 | Paulson et al. |
| 2014/0365922 A1 | 12/2014 | Yang |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372931 A1 | 12/2014 | Zhai et al. |
| 2014/0379334 A1 | 12/2014 | Fry |
| 2015/0003797 A1 | 1/2015 | Schmidt |
| 2015/0006148 A1 | 1/2015 | Goldszmit et al. |
| 2015/0006157 A1 | 1/2015 | Andrade Silva et al. |

(56) References Cited

U.S. PATENT DOCUMENTS

| | | |
|---|---|---|
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0019219 A1 | 1/2015 | Tzirkel-hancock et al. |
| 2015/0019221 A1 | 1/2015 | Lee et al. |
| 2015/0031416 A1 | 1/2015 | Wells et al. |
| 2015/0033219 A1 | 1/2015 | Breiner et al. |
| 2015/0039292 A1 | 2/2015 | Suleman et al. |
| 2015/0039299 A1 | 2/2015 | Weinstein et al. |
| 2015/0039305 A1 | 2/2015 | Huang |
| 2015/0040012 A1 | 2/2015 | Faaborg et al. |
| 2015/0045003 A1 | 2/2015 | Vora et al. |
| 2015/0045068 A1 | 2/2015 | Soffer et al. |
| 2015/0046537 A1 | 2/2015 | Rakib |
| 2015/0050633 A1 | 2/2015 | Christmas et al. |
| 2015/0058013 A1 | 2/2015 | Pakhomov et al. |
| 2015/0058018 A1 | 2/2015 | Georges et al. |
| 2015/0058785 A1 | 2/2015 | Ookawara |
| 2015/0065200 A1 | 3/2015 | Namgung et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0067485 A1 | 3/2015 | Kim et al. |
| 2015/0067822 A1 | 3/2015 | Randall |
| 2015/0073788 A1 | 3/2015 | Allauzen et al. |
| 2015/0073804 A1 | 3/2015 | Senior et al. |
| 2015/0074524 A1 | 3/2015 | Nicholson et al. |
| 2015/0082229 A1 | 3/2015 | Ouyang et al. |
| 2015/0088511 A1 | 3/2015 | Bharadwaj et al. |
| 2015/0088514 A1 | 3/2015 | Typrin |
| 2015/0088522 A1 | 3/2015 | Hendrickson et al. |
| 2015/0088523 A1 | 3/2015 | Schuster |
| 2015/0095031 A1 | 4/2015 | Conkie et al. |
| 2015/0095278 A1 | 4/2015 | Flinn et al. |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106093 A1 | 4/2015 | Weeks et al. |
| 2015/0113407 A1 | 4/2015 | Hoffert et al. |
| 2015/0120723 A1 | 4/2015 | Deshmukh et al. |
| 2015/0121216 A1 | 4/2015 | Brown et al. |
| 2015/0127350 A1 | 5/2015 | Agiomyrgiannakis |
| 2015/0133109 A1 | 5/2015 | Freeman et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0142420 A1 | 5/2015 | Sarikaya et al. |
| 2015/0142438 A1 | 5/2015 | Dai et al. |
| 2015/0142447 A1 | 5/2015 | Kennewick et al. |
| 2015/0142851 A1 | 5/2015 | Gupta et al. |
| 2015/0148013 A1 | 5/2015 | Baldwin et al. |
| 2015/0149177 A1 | 5/2015 | Kalns et al. |
| 2015/0149182 A1 | 5/2015 | Kalns et al. |
| 2015/0149354 A1 | 5/2015 | Mccoy |
| 2015/0149469 A1 | 5/2015 | Xu et al. |
| 2015/0154185 A1 | 6/2015 | Waibel |
| 2015/0161370 A1 | 6/2015 | North et al. |
| 2015/0161989 A1 | 6/2015 | Hsu et al. |
| 2015/0162001 A1 | 6/2015 | Kar et al. |
| 2015/0163558 A1 | 6/2015 | Wheatley |
| 2015/0169284 A1 | 6/2015 | Quast et al. |
| 2015/0169336 A1 | 6/2015 | Harper et al. |
| 2015/0170664 A1 | 6/2015 | Doherty et al. |
| 2015/0172463 A1 | 6/2015 | Quast et al. |
| 2015/0178388 A1 | 6/2015 | Winnemoeller et al. |
| 2015/0179176 A1 | 6/2015 | Ryu et al. |
| 2015/0185964 A1 | 7/2015 | Stout |
| 2015/0186012 A1 | 7/2015 | Coleman et al. |
| 2015/0186110 A1 | 7/2015 | Kannan |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |
| 2015/0199965 A1 | 7/2015 | Leak et al. |
| 2015/0199967 A1 | 7/2015 | Reddy et al. |
| 2015/0201064 A1 | 7/2015 | Bells et al. |
| 2015/0205858 A1 | 7/2015 | Xie et al. |
| 2015/0208226 A1 | 7/2015 | Kuusilinna et al. |
| 2015/0212791 A1 | 7/2015 | Kumar et al. |
| 2015/0213796 A1 | 7/2015 | Waltermann et al. |
| 2015/0220507 A1 | 8/2015 | Mohajer et al. |
| 2015/0221304 A1 | 8/2015 | Stewart |
| 2015/0221307 A1 | 8/2015 | Shah et al. |
| 2015/0227505 A1 | 8/2015 | Morimoto |
| 2015/0227633 A1 | 8/2015 | Shapira |
| 2015/0228281 A1 | 8/2015 | Raniere |
| 2015/0234636 A1 | 8/2015 | Barnes, Jr. |
| 2015/0234800 A1 | 8/2015 | Patrick et al. |
| 2015/0242091 A1 | 8/2015 | Lu et al. |
| 2015/0243278 A1 | 8/2015 | Kibre et al. |
| 2015/0243283 A1 | 8/2015 | Halash et al. |
| 2015/0245154 A1 | 8/2015 | Dadu et al. |
| 2015/0248651 A1 | 9/2015 | Akutagawa et al. |
| 2015/0248886 A1 | 9/2015 | Sarikaya et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0255071 A1 | 9/2015 | Chiba |
| 2015/0256873 A1 | 9/2015 | Klein et al. |
| 2015/0261496 A1 | 9/2015 | Faaborg et al. |
| 2015/0269139 A1 | 9/2015 | McAteer et al. |
| 2015/0277574 A1 | 10/2015 | Jain et al. |
| 2015/0278370 A1 | 10/2015 | Stratvert et al. |
| 2015/0279358 A1 | 10/2015 | Kingsbury et al. |
| 2015/0279360 A1 | 10/2015 | Mengibar et al. |
| 2015/0281380 A1 | 10/2015 | Wang et al. |
| 2015/0286627 A1 | 10/2015 | Chang et al. |
| 2015/0287401 A1 | 10/2015 | Lee et al. |
| 2015/0287409 A1 | 10/2015 | Jang |
| 2015/0288629 A1 | 10/2015 | Choi et al. |
| 2015/0294086 A1 | 10/2015 | Kare et al. |
| 2015/0294516 A1 | 10/2015 | Chiang |
| 2015/0295915 A1 | 10/2015 | Xiu |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0309997 A1 | 10/2015 | Lee et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0312182 A1 | 10/2015 | Langholz |
| 2015/0317069 A1 | 11/2015 | Clements et al. |
| 2015/0317310 A1 | 11/2015 | Eiche et al. |
| 2015/0324041 A1 | 11/2015 | Varley et al. |
| 2015/0324334 A1 | 11/2015 | Lee et al. |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0339049 A1 | 11/2015 | Kasemset et al. |
| 2015/0339391 A1 | 11/2015 | Kang et al. |
| 2015/0340040 A1 | 11/2015 | Mun et al. |
| 2015/0340042 A1 | 11/2015 | Sejnoha et al. |
| 2015/0341717 A1 | 11/2015 | Song et al. |
| 2015/0347086 A1 | 12/2015 | Liedholm et al. |
| 2015/0347381 A1 | 12/2015 | Bellegarda |
| 2015/0347382 A1 | 12/2015 | Dolfing et al. |
| 2015/0347385 A1 | 12/2015 | Flor et al. |
| 2015/0347393 A1 | 12/2015 | Futrell et al. |
| 2015/0347733 A1 | 12/2015 | Tsou et al. |
| 2015/0347985 A1 | 12/2015 | Gross et al. |
| 2015/0348547 A1 | 12/2015 | Paulik et al. |

(56) References Cited

U.S. PATENT DOCUMENTS

| | | |
|---|---|---|
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0350031 A1 | 12/2015 | Burks et al. |
| 2015/0352999 A1 | 12/2015 | Bando et al. |
| 2015/0355879 A1 | 12/2015 | Beckhardt et al. |
| 2015/0364140 A1 | 12/2015 | Thorn |
| 2015/0370531 A1 | 12/2015 | Faaborg |
| 2015/0370780 A1 | 12/2015 | Wang et al. |
| 2015/0371639 A1 | 12/2015 | Foerster et al. |
| 2015/0371665 A1 | 12/2015 | Naik et al. |
| 2015/0373183 A1 | 12/2015 | Woolsey et al. |
| 2015/0382047 A1 | 12/2015 | Napolitano et al. |
| 2015/0382079 A1 | 12/2015 | Lister et al. |
| 2016/0004690 A1 | 1/2016 | Bangalore et al. |
| 2016/0014476 A1 | 1/2016 | Caliendo, Jr. et al. |
| 2016/0019886 A1 | 1/2016 | Hong |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0029316 A1 | 1/2016 | Mohan et al. |
| 2016/0034811 A1 | 2/2016 | Paulik et al. |
| 2016/0042735 A1 | 2/2016 | Vibbert et al. |
| 2016/0042748 A1 | 2/2016 | Jain et al. |
| 2016/0048666 A1 | 2/2016 | Dey et al. |
| 2016/0055422 A1 | 2/2016 | Li |
| 2016/0062605 A1 | 3/2016 | Agarwal et al. |
| 2016/0063998 A1 | 3/2016 | Krishnamoorthy et al. |
| 2016/0070581 A1 | 3/2016 | Soon-Shiong |
| 2016/0071516 A1 | 3/2016 | Lee et al. |
| 2016/0071521 A1 | 3/2016 | Haughay |
| 2016/0077794 A1 | 3/2016 | Kim et al. |
| 2016/0078860 A1 | 3/2016 | Paulik et al. |
| 2016/0080165 A1 | 3/2016 | Ehsani et al. |
| 2016/0086116 A1 | 3/2016 | Rao et al. |
| 2016/0091967 A1 | 3/2016 | Prokofieva et al. |
| 2016/0092447 A1 | 3/2016 | Venkataraman et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094979 A1 | 3/2016 | Naik et al. |
| 2016/0098991 A1 | 4/2016 | Luo et al. |
| 2016/0111091 A1 | 4/2016 | Bakish |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0147725 A1 | 5/2016 | Patten et al. |
| 2016/0148610 A1 | 5/2016 | Kennewick, Jr. et al. |
| 2016/0155442 A1 | 6/2016 | Kannan et al. |
| 2016/0155443 A1 | 6/2016 | Khan et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0170966 A1 | 6/2016 | Kolo |
| 2016/0173578 A1 | 6/2016 | Sharma et al. |
| 2016/0173960 A1 | 6/2016 | Snibbe et al. |
| 2016/0179462 A1 | 6/2016 | Bjorkengren |
| 2016/0180844 A1 | 6/2016 | Vanblon et al. |
| 2016/0182410 A1 | 6/2016 | Janakiraman et al. |
| 2016/0188181 A1 | 6/2016 | Smith |
| 2016/0188738 A1 | 6/2016 | Gruber et al. |
| 2016/0189717 A1 | 6/2016 | Kannan et al. |
| 2016/0210981 A1 | 7/2016 | Lee |
| 2016/0212488 A1 | 7/2016 | Os et al. |
| 2016/0217784 A1 | 7/2016 | Gelfenbeyn et al. |
| 2016/0224540 A1 | 8/2016 | Stewart et al. |
| 2016/0224774 A1 | 8/2016 | Pender |
| 2016/0225372 A1 | 8/2016 | Cheung et al. |
| 2016/0240187 A1 | 8/2016 | Fleizach et al. |
| 2016/0247061 A1 | 8/2016 | Trask et al. |
| 2016/0253312 A1 | 9/2016 | Rhodes |
| 2016/0259623 A1 | 9/2016 | Sumner et al. |
| 2016/0259656 A1 | 9/2016 | Sumner et al. |
| 2016/0259779 A1 | 9/2016 | Labsk et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0266871 A1 | 9/2016 | Schmid et al. |
| 2016/0267904 A1 | 9/2016 | Biadsy et al. |
| 2016/0275941 A1 | 9/2016 | Bellegarda et al. |
| 2016/0275947 A1 | 9/2016 | Li et al. |
| 2016/0282956 A1 | 9/2016 | Ouyang et al. |
| 2016/0284005 A1 | 9/2016 | Daniel et al. |
| 2016/0284199 A1 | 9/2016 | Dotan-Cohen et al. |
| 2016/0286045 A1 | 9/2016 | Shaltiel et al. |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0307566 A1 | 10/2016 | Bellegarda |
| 2016/0314788 A1 | 10/2016 | Jitkoff et al. |
| 2016/0314792 A1 | 10/2016 | Alvarez et al. |
| 2016/0321261 A1 | 11/2016 | Spasojevic et al. |
| 2016/0322045 A1 | 11/2016 | Hatfeild et al. |
| 2016/0322050 A1 | 11/2016 | Wang et al. |
| 2016/0328893 A1 | 11/2016 | Cordova et al. |
| 2016/0336007 A1 | 11/2016 | Hanazawa |
| 2016/0336010 A1 | 11/2016 | Lindahl |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342685 A1 | 11/2016 | Basu et al. |
| 2016/0351190 A1 | 12/2016 | Binder et al. |
| 2016/0357304 A1 | 12/2016 | Hatori et al. |
| 2016/0357728 A1 | 12/2016 | Bellegarda et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0364378 A1 | 12/2016 | Futrell et al. |
| 2016/0371250 A1 | 12/2016 | Rhodes |
| 2016/0378747 A1 | 12/2016 | Orr et al. |
| 2016/0379091 A1 | 12/2016 | Lin et al. |
| 2016/0379626 A1 | 12/2016 | Deisher et al. |
| 2016/0379641 A1 | 12/2016 | Liu et al. |
| 2017/0004824 A1 | 1/2017 | Yoo et al. |
| 2017/0011303 A1 | 1/2017 | Annapureddy et al. |
| 2017/0011742 A1 | 1/2017 | Jing et al. |
| 2017/0018271 A1 | 1/2017 | Khan et al. |
| 2017/0019987 A1 | 1/2017 | Dragone et al. |
| 2017/0031576 A1 | 2/2017 | Saoji et al. |
| 2017/0040002 A1 | 2/2017 | Basson et al. |
| 2017/0055895 A1 | 3/2017 | Des Jardins et al. |
| 2017/0060853 A1 | 3/2017 | Lee et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0083179 A1 | 3/2017 | Gruber et al. |
| 2017/0083285 A1 | 3/2017 | Meyers et al. |
| 2017/0091168 A1 | 3/2017 | Bellegarda et al. |
| 2017/0092270 A1 | 3/2017 | Newendorp et al. |
| 2017/0092278 A1 | 3/2017 | Evermann et al. |
| 2017/0102915 A1 | 4/2017 | Kuscher et al. |
| 2017/0103749 A1 | 4/2017 | Zhao et al. |
| 2017/0105190 A1 | 4/2017 | Logan et al. |
| 2017/0116989 A1 | 4/2017 | Yadgar et al. |
| 2017/0124190 A1 | 5/2017 | Wang et al. |
| 2017/0125016 A1 | 5/2017 | Wang |
| 2017/0127124 A9 | 5/2017 | Wilson et al. |
| 2017/0132199 A1 | 5/2017 | Vescovi et al. |
| 2017/0140644 A1 | 5/2017 | Hwang et al. |

(56) References Cited

U.S. PATENT DOCUMENTS

| | | |
|---|---|---|
| 2017/0154033 A1 | 6/2017 | Lee |
| 2017/0154055 A1 | 6/2017 | Dimson et al. |
| 2017/0161018 A1 | 6/2017 | Lemay et al. |
| 2017/0169819 A1 | 6/2017 | Mese et al. |
| 2017/0178619 A1 | 6/2017 | Naik et al. |
| 2017/0178626 A1 | 6/2017 | Gruber et al. |
| 2017/0180499 A1 | 6/2017 | Gelfenbeyn et al. |
| 2017/0185581 A1 | 6/2017 | Bojja et al. |
| 2017/0186429 A1 | 6/2017 | Giuli et al. |
| 2017/0193083 A1 | 7/2017 | Bhatt et al. |
| 2017/0199874 A1 | 7/2017 | Patel et al. |
| 2017/0200066 A1 | 7/2017 | Wang et al. |
| 2017/0221486 A1 | 8/2017 | Kurata et al. |
| 2017/0227935 A1 | 8/2017 | Su et al. |
| 2017/0228382 A1 | 8/2017 | Haviv et al. |
| 2017/0230709 A1 | 8/2017 | Van Os et al. |
| 2017/0242653 A1 | 8/2017 | Lang et al. |
| 2017/0243468 A1 | 8/2017 | Dotan-Cohen et al. |
| 2017/0256256 A1 | 9/2017 | Wang et al. |
| 2017/0263248 A1 | 9/2017 | Gruber et al. |
| 2017/0263249 A1 | 9/2017 | Akbacak et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0316775 A1 | 11/2017 | Le et al. |
| 2017/0316782 A1 | 11/2017 | Haughay et al. |
| 2017/0323637 A1 | 11/2017 | Naik |
| 2017/0345411 A1 | 11/2017 | Raitio et al. |
| 2017/0346949 A1 | 11/2017 | Sanghavi et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2018/0007060 A1 | 1/2018 | Leblang et al. |
| 2018/0007538 A1 | 1/2018 | Naik et al. |
| 2018/0012596 A1 | 1/2018 | Piernot et al. |
| 2018/0033431 A1 | 2/2018 | Newendorp et al. |
| 2018/0054505 A1 | 2/2018 | Hart et al. |
| 2018/0060312 A1 | 3/2018 | Won |
| 2018/0067914 A1 | 3/2018 | Chen et al. |
| 2018/0090143 A1 | 3/2018 | Saddler et al. |
| 2018/0107945 A1 | 4/2018 | Gao et al. |
| 2018/0108346 A1 | 4/2018 | Paulik et al. |
| 2018/0137857 A1 | 5/2018 | Zhou et al. |

FOREIGN PATENT DOCUMENTS

| | | |
|---|---|---|
| CA | 2792412 A1 | 7/2011 |
| CA | 2666438 C | 6/2013 |
| CN | 101162153 A | 4/2008 |
| CN | 101174366 A | 5/2008 |
| CN | 101179754 A | 5/2008 |
| CN | 101183525 A | 5/2008 |
| CN | 101188644 A | 5/2008 |
| CN | 101228503 A | 7/2008 |
| CN | 101233741 A | 7/2008 |
| CN | 101246020 A | 8/2008 |
| CN | 101271689 A | 9/2008 |
| CN | 101277501 A | 10/2008 |
| CN | 101281745 A | 10/2008 |
| CN | 101292282 A | 10/2008 |
| CN | 101297541 A | 10/2008 |
| CN | 101325756 A | 12/2008 |
| CN | 101416471 A | 4/2009 |
| CN | 101427244 A | 5/2009 |
| CN | 101448340 A | 6/2009 |
| CN | 101453498 A | 6/2009 |
| CN | 101499156 A | 8/2009 |
| CN | 101500041 A | 8/2009 |
| CN | 101535983 A | 9/2009 |
| CN | 101547396 A | 9/2009 |
| CN | 101557432 A | 10/2009 |
| CN | 101604521 A | 12/2009 |
| CN | 101632316 A | 1/2010 |
| CN | 101636736 A | 1/2010 |
| CN | 101673544 A | 3/2010 |
| CN | 101751387 A | 6/2010 |
| CN | 101847405 A | 9/2010 |
| CN | 101894547 A | 11/2010 |
| CN | 101939740 A | 1/2011 |
| CN | 101951553 A | 1/2011 |
| CN | 102137193 A | 7/2011 |
| CN | 102160043 A | 8/2011 |
| CN | 102246136 A | 11/2011 |
| CN | 202035047 U | 11/2011 |
| CN | 102282609 A | 12/2011 |
| CN | 202092650 U | 12/2011 |
| CN | 102368256 A | 3/2012 |
| CN | 102405463 A | 4/2012 |
| CN | 102498457 A | 6/2012 |
| CN | 102629246 A | 8/2012 |
| CN | 102682771 A | 9/2012 |
| CN | 102685295 A | 9/2012 |
| CN | 102693725 A | 9/2012 |
| CN | 102792320 A | 11/2012 |
| CN | 102870065 A | 1/2013 |
| CN | 102917004 A | 2/2013 |
| CN | 103035240 A | 4/2013 |
| CN | 103038728 A | 4/2013 |
| CN | 103093334 A | 5/2013 |
| CN | 104038621 A | 9/2014 |
| CN | 104284257 A | 1/2015 |
| CN | 104423625 A | 3/2015 |
| CN | 104463552 A | 3/2015 |
| CN | 104516522 A | 4/2015 |
| CN | 104854583 A | 8/2015 |
| CN | 104951077 A | 9/2015 |
| CN | 105247511 A | 1/2016 |
| CN | 105471705 A | 4/2016 |
| CN | 107919123 A | 4/2018 |
| DE | 102008024258 A1 | 11/2009 |
| EP | 1892700 A1 | 2/2008 |
| EP | 1912205 A2 | 4/2008 |
| EP | 1939860 A1 | 7/2008 |
| EP | 1944997 A2 | 7/2008 |
| EP | 651543 B1 | 9/2008 |
| EP | 1909263 B1 | 1/2009 |
| EP | 1335620 B1 | 3/2009 |
| EP | 2069895 A1 | 6/2009 |
| EP | 2081185 A1 | 7/2009 |
| EP | 2094032 A1 | 8/2009 |
| EP | 2096840 A1 | 9/2009 |
| EP | 2107553 A1 | 10/2009 |
| EP | 2109295 A1 | 10/2009 |
| EP | 1720375 B1 | 7/2010 |
| EP | 2205010 A1 | 7/2010 |
| EP | 2309491 A1 | 4/2011 |
| EP | 2329348 | 6/2011 |
| EP | 2400373 A1 | 12/2011 |
| EP | 2431842 A2 | 3/2012 |
| EP | 2523188 A1 | 11/2012 |
| EP | 2551784 A1 | 1/2013 |
| EP | 2555536 A1 | 2/2013 |
| EP | 2575128 A2 | 4/2013 |
| EP | 2733598 A2 | 5/2014 |
| EP | 2801890 A1 | 11/2014 |
| EP | 2801972 A1 | 11/2014 |
| EP | 2930715 A1 | 10/2015 |
| EP | 2938022 A1 | 10/2015 |
| EP | 2940556 A1 | 11/2015 |
| EP | 3246916 A1 | 11/2017 |
| FR | 2911201 A1 | 7/2008 |
| GB | 2445436 A | 7/2008 |
| GB | 2445667 A | 7/2008 |
| JP | 2008-009120 A | 1/2008 |

(56) References Cited

FOREIGN PATENT DOCUMENTS

| | | |
|---|---|---|
| JP | 2008-21002 A | 1/2008 |
| JP | 2008-26381 A | 2/2008 |
| JP | 2008-39928 A | 2/2008 |
| JP | 2008-58813 A | 3/2008 |
| JP | 2008-064687 A | 3/2008 |
| JP | 2008-90545 A | 4/2008 |
| JP | 2008-97003 A | 4/2008 |
| JP | 2008-134949 A | 6/2008 |
| JP | 2008-158510 A | 7/2008 |
| JP | 2008-526101 A | 7/2008 |
| JP | 2008-185693 A | 8/2008 |
| JP | 2008-198022 A | 8/2008 |
| JP | 2008-217468 A | 9/2008 |
| JP | 2008-228129 A | 9/2008 |
| JP | 2008-233678 A | 10/2008 |
| JP | 2008-236448 A | 10/2008 |
| JP | 2008-252161 A | 10/2008 |
| JP | 2008-268684 A | 11/2008 |
| JP | 2008-269480 A | 11/2008 |
| JP | 2008-271481 A | 11/2008 |
| JP | 2008-275731 A | 11/2008 |
| JP | 2008-299221 A | 12/2008 |
| JP | 2009-2850 A | 1/2009 |
| JP | 2009-503623 A | 1/2009 |
| JP | 2009-36999 A | 2/2009 |
| JP | 2009-505142 A | 2/2009 |
| JP | 2009-47920 A | 3/2009 |
| JP | 2009-069062 A | 4/2009 |
| JP | 2009-98490 A | 5/2009 |
| JP | 2009-110300 A | 5/2009 |
| JP | 2009-134409 A | 6/2009 |
| JP | 2009-140444 A | 6/2009 |
| JP | 2009-186989 A | 8/2009 |
| JP | 2009-193448 A | 8/2009 |
| JP | 2009-193457 A | 8/2009 |
| JP | 2009-193532 A | 8/2009 |
| JP | 2009-205367 A | 9/2009 |
| JP | 2009-223840 A | 10/2009 |
| JP | 2009-294913 A | 12/2009 |
| JP | 2009-294946 A | 12/2009 |
| JP | 2009-543166 A | 12/2009 |
| JP | 2010-66519 A | 3/2010 |
| JP | 2010-78979 A | 4/2010 |
| JP | 2010-108378 A | 5/2010 |
| JP | 2010-518475 A | 5/2010 |
| JP | 2010-518526 A | 5/2010 |
| JP | 2010-157207 A | 7/2010 |
| JP | 2010-224236 A | 10/2010 |
| JP | 4563106 B2 | 10/2010 |
| JP | 2010-535377 A | 11/2010 |
| JP | 2010-287063 A | 12/2010 |
| JP | 2011-33874 A | 2/2011 |
| JP | 2011-41026 A | 2/2011 |
| JP | 2011-45005 A | 3/2011 |
| JP | 2011-59659 A | 3/2011 |
| JP | 2011-81541 A | 4/2011 |
| JP | 2011-525045 A | 9/2011 |
| JP | 2011-238022 A | 11/2011 |
| JP | 2011-250027 A | 12/2011 |
| JP | 2012-014394 A | 1/2012 |
| JP | 2012-508530 A | 4/2012 |
| JP | 2012-089020 A | 5/2012 |
| JP | 2012-116442 A | 6/2012 |
| JP | 2012-142744 A | 7/2012 |
| JP | 2012-147063 A | 8/2012 |
| JP | 2012-518847 A | 8/2012 |
| JP | 2013-37688 A | 2/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-080476 A | 5/2013 |
| JP | 2013-517566 A | 5/2013 |
| JP | 2013-134430 A | 7/2013 |
| JP | 2013-527947 A | 7/2013 |
| JP | 2013-528012 A | 7/2013 |
| JP | 2013-156349 A | 8/2013 |
| JP | 2013-200423 A | 10/2013 |
| JP | 2013-205999 A | 10/2013 |
| JP | 2013-238936 A | 11/2013 |
| JP | 2014-10688 A | 1/2014 |
| JP | 2014-026629 A | 2/2014 |
| JP | 2014-60600 A | 4/2014 |
| JP | 2014-72586 A | 4/2014 |
| JP | 2014-077969 A | 5/2014 |
| JP | 2014-124332 A | 7/2014 |
| JP | 2014-145842 A | 8/2014 |
| JP | 2014-150323 A | 8/2014 |
| JP | 2014-222514 A | 11/2014 |
| JP | 2015-8001 A | 1/2015 |
| JP | 2015-501022 A | 1/2015 |
| JP | 2015-41845 A | 3/2015 |
| JP | 2015-94848 A | 5/2015 |
| JP | 2015-519675 A | 7/2015 |
| JP | 2015-524974 A | 8/2015 |
| JP | 2015-526776 A | 9/2015 |
| JP | 2015-528140 A | 9/2015 |
| JP | 2015-528918 A | 10/2015 |
| JP | 2016-119615 A | 6/2016 |
| KR | 10-0801227 B1 | 2/2008 |
| KR | 10-0810500 B1 | 3/2008 |
| KR | 10-2008-0033070 A | 4/2008 |
| KR | 10-0819928 B1 | 4/2008 |
| KR | 10-2008-0049647 A | 6/2008 |
| KR | 10-2008-0059332 A | 6/2008 |
| KR | 10-2008-0109322 A | 12/2008 |
| KR | 10-2009-0001716 A | 1/2009 |
| KR | 10-2009-0028464 A | 3/2009 |
| KR | 10-2009-0030117 A | 3/2009 |
| KR | 10-2009-0086805 A | 8/2009 |
| KR | 10-0920267 B1 | 10/2009 |
| KR | 10-2009-0122944 A | 12/2009 |
| KR | 10-2009-0127961 A | 12/2009 |
| KR | 10-2009-0129192 A | 12/2009 |
| KR | 10-2010-0015958 A | 2/2010 |
| KR | 10-2010-0048571 A | 5/2010 |
| KR | 10-2010-0053149 A | 5/2010 |
| KR | 10-2010-0119519 A | 11/2010 |
| KR | 10-2011-0043644 A | 4/2011 |
| KR | 10-1032792 B1 | 5/2011 |
| KR | 10-2011-0068490 A | 6/2011 |
| KR | 10-2011-0072847 A | 6/2011 |
| KR | 10-2011-0086492 A | 7/2011 |
| KR | 10-2011-0100620 A | 9/2011 |
| KR | 10-2011-0113414 A | 10/2011 |
| KR | 10-2011-0115134 A | 10/2011 |
| KR | 10-2012-0020164 A | 3/2012 |
| KR | 10-2012-0031722 A | 4/2012 |
| KR | 10-1178310 B1 | 8/2012 |
| KR | 10-2012-0120316 A | 11/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| KR | 10-2013-0035983 A | 4/2013 |
| KR | 10-1334342 B1 | 11/2013 |
| KR | 10-2013-0131252 A | 12/2013 |
| KR | 10-2013-0133629 A | 12/2013 |
| KR | 10-2014-0147557 A | 12/2014 |
| KR | 10-2015-0043512 A | 4/2015 |
| KR | 10-2016-0010523 A | 1/2016 |
| RU | 2349970 C2 | 3/2009 |
| RU | 2353068 C2 | 4/2009 |
| RU | 2364917 C2 | 8/2009 |
| TW | 200801988 A | 1/2008 |
| TW | I301373 B | 9/2008 |
| TW | M348993 U | 1/2009 |
| TW | 200943903 A | 10/2009 |
| TW | 201018258 A | 5/2010 |
| TW | 201027515 A1 | 7/2010 |
| TW | 201028996 A1 | 8/2010 |
| TW | 201110108 A1 | 3/2011 |
| TW | 2011-42823 A1 | 12/2011 |

(56) References Cited

FOREIGN PATENT DOCUMENTS

| | | |
|---|---|---|
| TW | 201227715 A1 | 7/2012 |
| TW | 201245989 A1 | 11/2012 |
| TW | 201312548 A1 | 3/2013 |
| WO | 2008/030970 A2 | 3/2008 |
| WO | 2008/071231 A1 | 6/2008 |
| WO | 2008/085742 A2 | 7/2008 |
| WO | 2008/098900 A2 | 8/2008 |
| WO | 2008/109835 A2 | 8/2008 |
| WO | 2008/120036 A1 | 10/2008 |
| WO | 2008/130095 A1 | 10/2008 |
| WO | 2008/140236 A1 | 11/2008 |
| WO | 2008/142472 A1 | 11/2008 |
| WO | 2008/153639 A1 | 12/2008 |
| WO | 2009/009240 A2 | 1/2009 |
| WO | 2009/016631 A2 | 2/2009 |
| WO | 2009/017280 A1 | 2/2009 |
| WO | 2009/075912 A1 | 6/2009 |
| WO | 2009/104126 A1 | 8/2009 |
| WO | 2009/156438 A1 | 12/2009 |
| WO | 2009/156978 A1 | 12/2009 |
| WO | 2010/054373 A2 | 5/2010 |
| WO | 2010/075623 A1 | 7/2010 |
| WO | 2010/100937 A1 | 9/2010 |
| WO | 2010/141802 A1 | 12/2010 |
| WO | 2011/057346 A1 | 5/2011 |
| WO | 2011/060106 A1 | 5/2011 |
| WO | 2011/088053 A2 | 7/2011 |
| WO | 2011/093025 A1 | 8/2011 |
| WO | 2011/116309 A1 | 9/2011 |
| WO | 2011/133543 A1 | 10/2011 |
| WO | 2011/150730 A1 | 12/2011 |
| WO | 2011/163350 A1 | 12/2011 |
| WO | 2011/088053 A3 | 1/2012 |
| WO | 2012/019637 A1 | 2/2012 |
| WO | 2012/129231 A1 | 9/2012 |
| WO | 2012/135157 A2 | 10/2012 |
| WO | 2012/154317 A1 | 11/2012 |
| WO | 2012/155079 A2 | 11/2012 |
| WO | 2012/167168 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/163113 A1 | 10/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/021967 A1 | 2/2014 |
| WO | 2014/022148 A1 | 2/2014 |
| WO | 2014/028797 A1 | 2/2014 |
| WO | 2014/031505 A1 | 2/2014 |
| WO | 2014/066352 A1 | 5/2014 |
| WO | 2014/078965 A1 | 5/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144579 A1 | 9/2014 |
| WO | 2014/159581 A1 | 10/2014 |
| WO | 2014/197336 A1 | 12/2014 |
| WO | 2014/200728 A1 | 12/2014 |
| WO | 2014/204659 A2 | 12/2014 |
| WO | 2015/018440 A1 | 2/2015 |
| WO | 2015/030796 A1 | 3/2015 |
| WO | 2015/041892 A1 | 3/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/099939 A1 | 7/2015 |
| WO | 2015/116151 A1 | 8/2015 |
| WO | 2015/151133 A1 | 10/2015 |
| WO | 2015/157013 A1 | 10/2015 |
| WO | 2015/183401 A1 | 12/2015 |
| WO | 2015/183699 A1 | 12/2015 |
| WO | 2015/184186 A1 | 12/2015 |
| WO | 2015/200207 A1 | 12/2015 |
| WO | 2016/028946 A1 | 2/2016 |
| WO | 2016/033257 A1 | 3/2016 |
| WO | 2016/057268 A1 | 4/2016 |
| WO | 2016/075081 A1 | 5/2016 |
| WO | 2016/085775 A2 | 6/2016 |
| WO | 2016/100139 A1 | 6/2016 |
| WO | 2016/144982 A1 | 9/2016 |
| WO | 2016/209444 A1 | 12/2016 |
| WO | 2017/044260 A1 | 3/2017 |
| WO | 2017/044629 A1 | 3/2017 |
| WO | 2017/053311 A1 | 3/2017 |

OTHER PUBLICATIONS

"Ask Alexa—Things That Are Smart Wiki", Available online at <URL:http://thingsthataresmart.wiki/index.php?title=Ask_Alexa&oldid=4283>, [retrieved from internet on Aug. 2, 2017], Jun. 8, 2016, pp. 1-31.
"DIRECTV™ Voice", Now Part of the DIRECTTV Mobile App for Phones, Sep. 18, 2013, 5 pages.
Hear voice from Google translate, Available on URL:https://www.youtube.com/watch?v=18AvMhFqD28, Jan. 28, 2011, 1 page.
Notice of Allowance received for Taiwanese Patent Application No. 104128527.0, dated Feb. 17, 2017, 3 pages (Official Copy Only) (See Communication under 37 CFR § 1.98(a) (3)).
Office Action received for Taiwanese Patent Application No. 104128527.0, dated Jul. 25, 2016, 15 pages (6 pages of English Translation and 9 pages of Official Copy).
"SmartThings +Amazon Echo", Smartthings Samsung [online], Available online at <https://web.archive.org/web/20160509231428/https://blog.smartthings.com/featured/alexa-turn-on-my-smartthings/>, Aug. 21, 2015, 3 pages.
"The world of Virtual Assistants—more SemTech . . . ", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.
Anania, Peter, "Amazon Echo with Home Automation (Smartthings)", Available online at https://www.youtube.com/watch?v=LMW6aXmsWNE, Dec. 20, 2015, 1 page.
Asakura et al., "What LG thinks; How the TV should be in the Living Room", HiVi, vol. 31, No. 7 (Jul. 2013), Stereo Sound Publishing, Inc., Jun. 17, 2013, pp. 68-71 (Official Copy Only). (See Communication under 37 CFR § 1.98(a) (3)).
Cambria et al., "Jumping NLP Curves: A Review of Natural Language Processing Research", IEEE Computational Intelligence Magazine, 2014, vol. 9, May 2014, pp. 48-57.
Caraballo et al., "Language Identification Based on a Discriminative Text Categorization Technique", Iberspeech 2012—Vii Jomadas En Tecnologia Del Habla and Iii Iberiansl Tech Workshop, Nov. 21, 2012, pp. 1-10.
Castleos, "Whole House Voice Control Demonstration", available online at : https://www.youtube.com/watch?v=9SRCoxrZ_W4, Jun. 2, 2012, 26 pages.
Deedeevuu, "Amazon Echo Alarm Feature", Available online at https://www.youtube.com/watch?v=fdjU8eRLk7c, Feb. 16, 2015, 1 page.
Filipowicz, Luke, "How to use the Quick Type Keyboard in iOS 8", available online at <https://www.imore.com/comment/568232>, Oct. 11, 2014, pp. 1-17.
Finkel et al., "Joint Parsing and Named Entity Recognition", Human Language Technologies: The 2009 Annual Conference of the North American Chapter of the ACL, Jun. 2009, pp. 326-334.
Gomez et al., "Mouth Gesture and Voice Command Based Robot Command Interface", IEEE International Conference on Robotics and Automation, May 12-17, 2009, pp. 333-338.

(56) References Cited

OTHER PUBLICATIONS

Hashimoto, Yoshiyuki, "Simple Guide for iPhone Siri, Which Can Be Operated with Your Voice", Shuwa System Co. Ltd., vol. 1, Jul. 5, 2012, pp. 8, 130, 131.
Jonsson et al, "Proximity-based Reminders Using Bluetooth", 2014 IEEE International Conference on Pervasive Computing and Communications Demonstrations, 2014, pp. 151-153.
Karn, Ujjwal, "An Intuitive Explanation of Convolutional Neural Networks", The Data Science Blog, Aug. 11, 2016, 23 pages.
Liou et al., "Autoencoder for Words", Neurocomputing, vol. 139, Sep. 2014, pp. 84-96.
Majerus, Wesley, "Cell Phone Accessibility for your Blind Child", Retrieved from the Internet <URL:https://web.archive.org/web/20100210001100/https://nfb.org/images/nfb/publications/fr/fr28/3/fr280314.htm>, 2010, pp. 1-5.
Manning et al., "Introduction to Information Retrieval", New York, Cambridge University Press, 2008, 504 pages.
Mhatre et al., "Donna Interactive Chat-bot acting as a Personal Assistant", International Journal of Computer Applications (0975-8887), vol. 140, No. 10, Apr. 2016, 6 pages.
Mikolov et al., "Linguistic Regularities in Continuous Space Word Representations", Proceedings of NAACL-HLT, Jun. 9-14, 2013, pp. 746-751.
Morrison, Jonathan, "iPhone 5 Siri Demo", Online Available at <https://www.youtube.com/watch?v=_wHWwG5lhWc>, Sep. 21, 2012, 3 pages.
Nakazawa et al., "Detection and Labeling of Significant Scenes from TV program based on Twitter Analysis", Proceedings of the 3rd Forum on Data Engineering and Information Management (DEIM 2011 proceedings), IEICE Data Engineering Technical Group. Available online at: http://db-event.jpn.org/deim2011/proceedings/pdf/f5-6.pdf, Feb. 28, 2011, 10 pages (Official Copy Only). (See Communication under 37 CFR § 1.98(a) (3)).
Nozawa, Naoki et al., "iPhone 4S Perfect Manual", vol. 1, First Edition, Nov. 11, 2011, 5 pages.
Okuno et al., "System for Japanese Input Method based on the Internet", Technical Report of Information Processing Society of Japan, Natural Language Processing, Japan, Information Processing Society of Japan, vol. 2009, No. 36, Mar. 18, 2009, 8 pages (Official Copy Only) (See Communication under 37 CFR § 1.98(a) (3)).
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Pennington et al., "GloVe: Global Vectors for Word Representation", Proceedings of the Conference on Empirical Methods Natural Language Processing (EMNLP), Oct. 25-29, 2014, pp. 1532-1543.
Powell, Josh, "Now You See Me . . . Show/Hide Performance", available at http://www.learningjquery.com/2010/05/now-you-see-me-showhide-performance, May 4, 2010, 3 pages.
Routines, "SmartThings Support", Available online at <https://web.archive.org/web/20151207165701/https://support.smartthings.com/hc/en-us/articles/205380034-Routines>, 2015, 2 pages.
Selfrifge et al., "Interact: Tightly-coupling Multimodal Dialog with an Interactive Virtual Assistant", International Conference on Multimodal Interaction, ACM, Nov. 9, 2015, pp. 381-382.
Spivack, Nova, "Sneak Preview of Siri—Part Two—Technical Foundations—Interview with Tom Gruber, CTO of Siri", Online Available at <https://web.archive.org/web/20100114234454/http://www.twine.com/item/12vhy39k4-22m/interview-with-tom-gruber-of-siri>, Jan. 14, 2010, 5 pages.
Sundermeyer et al., "From Feedforward to Recurrent LSTM Neural Networks for Language Modeling", IEEE Transactions to Audio, Speech, and Language Processing, 2015, vol. 23, Mar. 2015, pp. 517-529.

Sundermeyer et al., "LSTM Neural Networks for Language Modeling", Interspeech 2012, ISCA's 13 Annual Conference, Sep. 9-13, 2012, pp. 194-197.
Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy only) (See Communication under 37 CFR § 1.98(a) (3)).
Vodafone Deutschland, "Samsung Galaxy S3 Tastatur Spracheingabe", Available online at—"https://www.youtube.com/watch?v=6kOd6Gr8uFE", Aug. 22, 2012, 1 page.
X.AI, "How it Works", May 2016, 6 pages.
Xu, Yuhong, "Policy optimization of dialogue management in spoken dialogue system for out-of-domain utterances", 2016 International Conference on Asian Language Processing (IALP), IEEE, Nov. 21, 2016, pp. 10-13.
Yan et al., "A Scalable Approach to Using DNN-Derived Features in GMM-HMM Based Acoustic Modeling for LVCSR", InInterspeech, 2013, pp. 104-108.
Young et al., "The Hidden Information State model: A practical framework for POMDP-based spoken dialogue management", Computer Speech & Language, vol. 24, Issue 2, 2010, pp. 150-174.
Zangerle et al., "Recommending #-Tag in Twitter", Proceedings of the Workshop on Semantic Adaptive Socail Web, 2011, pp. 1-12.
Adium, "AboutAdium—Adium X—Trac", available at <http://web.archive.org/web/20070819113247/http://trac.adiumx.com/wiki/AboutAdium>, retrieved on Nov. 25, 2011, 2 pages.
Alfred App, "Alfred", available at <http://www.alfredapp.com/>, retrieved on Feb. 8, 2012, 5 pages.
API.AI, "Android App Review—Speaktoit Assistant", Available at <https://www.youtube.com/watch?v=myE498nyfGw>, Mar. 30, 2011, 3 pages.
Apple Computer, "Knowledge Navigator", published by Apple Computer no later than 2008, as depicted in Exemplary Screenshots from video entitled 'Knowledge Navigator', 2008, 7 pages.
Apple, "VoiceOver", available at <http://www.apple.com/accessibility/voiceover/>, May 19, 2014, 3 pages.
Berry et al., "PTIME: Personalized Assistance for Calendaring", ACM Transactions on Intelligent Systems and Technology, vol. 2, No. 4, Article 40, Jul. 2011, pp. 1-22.
Bertulucci, Jeff, "Google Adds Voice Search to Chrome Browser", PC World, Jun. 14, 2011, 5 pages.
Bocchieri et al., "Use of Geographical Meta-Data in ASR Language and Acoustic Models", IEEE International Conference on Acoustics Speech and Signal Processing, 2010, pp. 5118-5121.
Butcher, Mike, "EVI Arrives in Town to go Toe-to-Toe with Siri", TechCrunch, Jan. 23, 2012, 2 pages.
Chamberlain, Kim, "Quick Start Guide Natural Reader", available online at <http://atrc.colostate.edu/files/quickstarts/Natural_Reader_Quick_Start_Guide.>, Apr. 2008, 5 pages.
Chen, Yi, "Multimedia Siri Finds and Plays Whatever You Ask for", PSFK Report, Feb. 9, 2012, 9 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Colt, Sam, "Here's One Way Apple's Smartwatch Could Be Better Than Anything Else", Business Insider, Aug. 21, 2014, pp. 1-4.
Elliott et al., "Annotation Suggestion and Search for Personal Multimedia Objects on the Web", CIVR, Jul. 7-9, 2008, pp. 75-84.
Erol et al., "Multimedia Clip Generation From Documents for Browsing on Mobile Devices", IEEE Transactions on Multimedia, vol. 10, No. 5, Aug. 2008, 13 pages.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Final Office Action received for U.S. Appl. No. 14/834,239, dated Sep. 1, 2017, 48 pages.

(56) References Cited

OTHER PUBLICATIONS

Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Gannes, Liz, "Alfred App Gives Personalized Restaurant Recommendations", AllThingsD, Jul. 18, 2011, pp. 1-3.
Gruber, Thomas R., et al., U.S. Appl. No. 61/186,414, filed Jun. 12, 2009 titled "System and Method for Semantic Auto-Completion" 13 pages (Copy Not Attached).
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "Siri, A Virtual Personal Assistant—Bringing Intelligence to the Interface", Semantic Technologies Conference, Jun. 16, 2009, 21 pages.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guim, Mark, "How to Set a Person-Based Reminder with Cortana", available at <http://www.wpcentral.com/how-to-person-based-reminder-cortana>, Apr. 26, 2014, 15 pages.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Headset Button Controller v7.3 APK Full APP Download for Android, Blackberry, iPhone, Jan. 27, 2014, 11 pages.
id3.org, "id3v2.4.0—Frames", available at <http://id3.org/id3v2.4.0-frames?action=print>, retrieved on Jan. 22, 2015, 41 pages.
Interactive Voice, available at <http://www.helloivee.com/company/>, retrieved on Feb. 10, 2014, 2 pages.
International Preliminary Report on Patentability received for PCT Patent Application No. PCT/US2015/047553, dated Apr. 13, 2017, 7 pages.
International Search Report and Written Opinion received for PCT Patent Application No. PCT/US2015/047553, dated Jan. 5, 2016, 10 pages.
IOWEGIAN International, "FIR Filter Properties, DSPGuru, Digital Signal Processing Central", available at <http://www.dspguru.com/dsp/faq/fir/properties> retrieved on Jul. 28, 2010, 6 pages.
Jawaid et al., "Machine Translation with Significant Word Reordering and Rich Target-Side Morphology", WDS'11 Proceedings of Contributed Papers, Part I, 2011, pp. 161-166.
Jiang et al., "A Syllable-based Name Transliteration System", Proc. of the 2009 Named Entities Workshop, Aug. 7, 2009, pp. 96-99.
Jouvet et al., "Evaluating Grapheme-to-phoneme Converters in Automatic Speech Recognition Context", IEEE,, 2012,, pp. 4821-4824.
Kane et al., "Slide Rule: Making Mobile Touch Screens Accessible to Blind People Using Multi-Touch Interaction Techniques", ASSETS, Oct. 13-15, 2008, pp. 73-80.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
KNOWNAV, "Knowledge Navigator", YouTube Video available at <http://www.youtube.com/watch?v=QRH8eimU_20>, Apr. 29, 2008, 1 page.

Lewis, Cameron, "Task Ave for iPhone Review", Mac Life, Available at <http://www.maclife.com/article/reviews/task_ave_iphone_review>, Mar. 3, 2011, 5 pages.
MACTECH, "KeyStrokes 3.5 for Mac OS X Boosts Word Prediction", available at <http://www.mactech.com/news/?p=1007129>, retrieved on Jan. 7, 2008, 3 pages.
Martins et al., "Extracting and Exploring the Geo-Temporal Semantics of Textual Resources", Semantic Computing, IEEE International Conference, 2008, pp. 1-9.
Meet Ivee, Your Wi-Fi Voice Activated Assistant, available at <http://www.helloivee.com/>, retrieved on Feb. 10, 2014, 8 pages.
Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Microsoft, "Turn on and Use Magnifier", available at <http://www.microsoft.com/windowsxp/using/accessibility/magnifierturnon.mspx>, retrieved on Jun. 6, 2009.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.
Morton, Philip, "Checking if an Element is Hidden", StackOverflow, Available at <http://stackoverflow.com/questions/178325/checking-if-an-element-is-hidden>, Oct. 7, 2008, 12 pages.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Naone, Erica, "TR10: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 69 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Ng, Simon, "Google's Task List Now Comes to Iphone", SimonBlog, Available at <http://www.simonblog.com/2009/02/04/googles-task-list-now-comes-to-iphone/>, Feb. 4, 2009, 3 pages.
Non Final Office Action received for U.S. Appl. No. 14/834,239, dated Jan. 20, 2017, 25 pages.
Non Final Office Action received for U.S. Appl. No. 14/834,239, dated Jul. 27, 2016, 13 pages.
Non Final Office Action received for U.S. Appl. No. 14/834,239, dated Mar. 8, 2018, 8 pages.
Notice of Allowance received for U.S. Appl. No. 14/834,239, dated May 3, 2018, 5 pages.
OSXDAILY, "Get a List of Siri Commands Directly from Siri", Available at <http://osxdaily.com/2013/02/05/list-siri-commands/>, Feb. 5, 2013, 15 pages.
Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010, pp. 1821-1826.
Phoenix Solutions, Inc., "Declaration of Christopher Schmandt Regarding the MIT Galaxy System", West Interactive Corp., A Delaware Corporation, Document 40, Jul. 2, 2010, 162 pages.
Reddi, "The Parser".
Sarawagi, Sunita, "CRF Package Page", available at <http://crf.sourceforge.net/>, retrieved on Apr. 6, 2011, 2 pages.
Simonite, Tom, "One Easy Way to Make Siri Smarter", Technology Review, Oct. 18, 2011, 2 pages.
Speaker Recognition, Wikipedia, The Free Enclyclopedia, Nov. 2, 2010, 4 pages.

(56) References Cited

OTHER PUBLICATIONS

SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.

Stent et al., "Geo-Centric Language Models for Local Business Voice Search", AT&T Labs—Research, 2009, pp. 389-396.

Sullivan, Danny, "How Google Instant's Autocomplete Suggestions Work", available at <http://searchengineland.com/how-google-instant-autocomplete-suggestions-work-62592>, Apr. 6, 2011, 12 pages.

Sundaram et al., "Latent Perceptual Mapping with Data-Driven Variable-Length Acoustic Units for Template-Based Speech Recognition", ICASSP 2012, Mar. 2012, pp. 4125-4128.

Textndrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.

Tofel, Kevin C., "SpeakToIt: A Personal Assistant for Older iPhones, iPads", Apple News, Tips and Reviews, Feb. 9, 2012, 7 pages.

Tucker, Joshua, "Too Lazy to Grab Your TV Remote? Use Siri Instead", Engadget, Nov. 30, 2011, 8 pages.

Tur et al., "The CALO Meeting Assistant System", IEEE Transactions on Audio, Speech and Language Processing, vol. 18, No. 6, Aug. 2010, pp. 1601-1611.

Tur et al., "The CALO Meeting Speech Recognition and Understanding System", Proc. IEEE Spoken Language Technology Workshop, 2008, 4 pages.

Vlingo InCar, "Distracted Driving Solution with Vlingo InCar", YouTube Video, Available online at <http://www.youtube.com/watch?v=Vqs8XfXxgz4>, Oct. 2010, 2 pages.

Vlingo, "Vlingo Launches Voice Enablement Application on Apple App Store", Press Release, Dec. 3, 2008, 2 pages.

Voiceassist, "Send Text, Listen to and Send E-Mail by Voice", YouTube Video, Available online at <http://www.youtube.com/watch?v=0tEU61nHHA4>, Jul. 30, 2009, 1 page.

Voiceonthego, "Voice on the Go (BlackBerry)", YouTube Video, available online at <http://www.youtube.com/watch?v=pJqpWgQS98w>, Jul. 27, 2009, 1 page.

Wikipedia, "Acoustic Model", available at <http://en.wikipedia.org/wiki/AcousticModel>, retrieved on Sep. 14, 2011, 2 pages.

Wikipedia, "Language Model", available at <http://en.wikipedia.org/wiki/Language_model>, retrieved on Sep. 14, 2011, 4 pages.

Wikipedia, "Speech Recognition", available at <http://en.wikipedia.org/wiki/Speech_recognition>, retrieved on Sep. 14, 2011, 12 pages.

Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 12 pages.

Xiang et al., "Correcting Phoneme Recognition Errors in Learning Word Pronunciation through Speech Interaction", Speech Communication, vol. 55, No. 1, Jan. 1, 2013, pp. 190-203.

Xu et al., "Speech-Based Interactive Games for Language Learning: Reading, Translation, and Question-Answering", Computational Linguistics and Chinese Language Processing, vol. 14, No. 2, Jun. 2009, pp. 133-160.

Youtube, "New bar search for Facebook", available at "https://www.youtube.com/watch?v=vwgN1WbvCas", 2 pages.

Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.

Zhang et al., "Research of Text Classification Model Based on Latent Semantic Analysis and Improved HS-SVM", Intelligent Systems and Applications (ISA), 2010 2nd International Workshop, May 22-23, 2010, 5 pages.

Zhong et al., "JustSpeak: Enabling Universal Voice Control on Android", W4A'14, Proceedings of the 11th Web for All Conference, No. 36, Apr. 7-9, 2014, 8 pages.

\* cited by examiner

PROVIDING AN INDICATION OF THE SUITABILITY OF SPEECH RECOGNITION

CROSS-REFERENCE TO RELATED APPLICATION

This application is a continuation of U.S. patent application Ser. No. 14/834,239, filed on Aug. 24, 2015, entitled "PROVIDING AN INDICATION OF THE SUITABILITY OF SPEECH RECOGNITION," which claims priority from U.S. Provisional Ser. No. 62/057,979, filed on Sep. 30, 2014, entitled "PROVIDING AN INDICATION OF THE SUITABILITY OF SPEECH RECOGNITION," each of which are hereby incorporated by reference in their entirety for all purposes.

FIELD

This relates generally to natural language processing and, more specifically, to determining the suitability of an acoustic environment for performing speech recognition.

BACKGROUND

Intelligent automated assistants (or virtual assistants) provide an intuitive interface between users and electronic devices. These assistants can allow users to interact with devices or systems using natural language in spoken and/or text forms. For example, a user can access the services of an electronic device by providing a spoken user input in natural language form to a virtual assistant associated with the electronic device. The virtual assistant can perform natural language processing on the spoken user input to infer the user's intent and operationalize the user's intent into tasks. The tasks can then be performed by executing one or more functions of the electronic device, and a relevant output can be returned to the user in natural language form.

The acoustic environment in which the virtual assistant operates can affect the virtual assistant's ability to interpret a user's spoken input. For example, background noise, such as music, conversations of other individuals, traffic noises, or the like, can obscure the user's spoken input contained in the audio received by the virtual assistant. This can result in words being interpreted incorrectly or not at all. Thus, it can be desirable to operate a virtual assistant in an acoustic environment that is conducive to performing speech recognition.

SUMMARY

Systems and processes for providing an indication of the suitability of an acoustic environment for performing speech recognition are disclosed. One process can include receiving an audio input and determining a speech recognition suitability based on the audio input. The speech recognition suitability can include a numerical, textual, graphical, or other representation of the suitability of an acoustic environment for performing speech recognition. The process can further include displaying a visual representation of the speech recognition suitability to indicate the likelihood that a spoken user input will be interpreted correctly. This allows a user to determine whether to proceed with the performance of a speech recognition process, or to move to a different location having a better acoustic environment before performing the speech recognition process. In some examples, the user device can disable operation of a speech recognition process in response to determining that the speech recognition suitability is below a threshold suitability.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to providing an indication of the suitability of an acoustic environment for performing speech recognition. One process can include receiving an audio input and determining a speech recognition suitability based on the audio input. The speech recognition suitability can include a numerical, textual, graphical, or other representation of the suitability of an acoustic environment for performing speech recognition. The process can further include displaying a visual representation of the speech recognition suitability to indicate the likelihood that a spoken user input will be interpreted correctly. This allows a user to determine whether to proceed with the performance of a speech recognition process, or to move to a different location having a better acoustic environment before performing the speech recognition process. In some examples, the user device can disable operation of a speech recognition process in response to determining that the speech recognition suitability is below a threshold suitability.

System Overview

Figure 1:
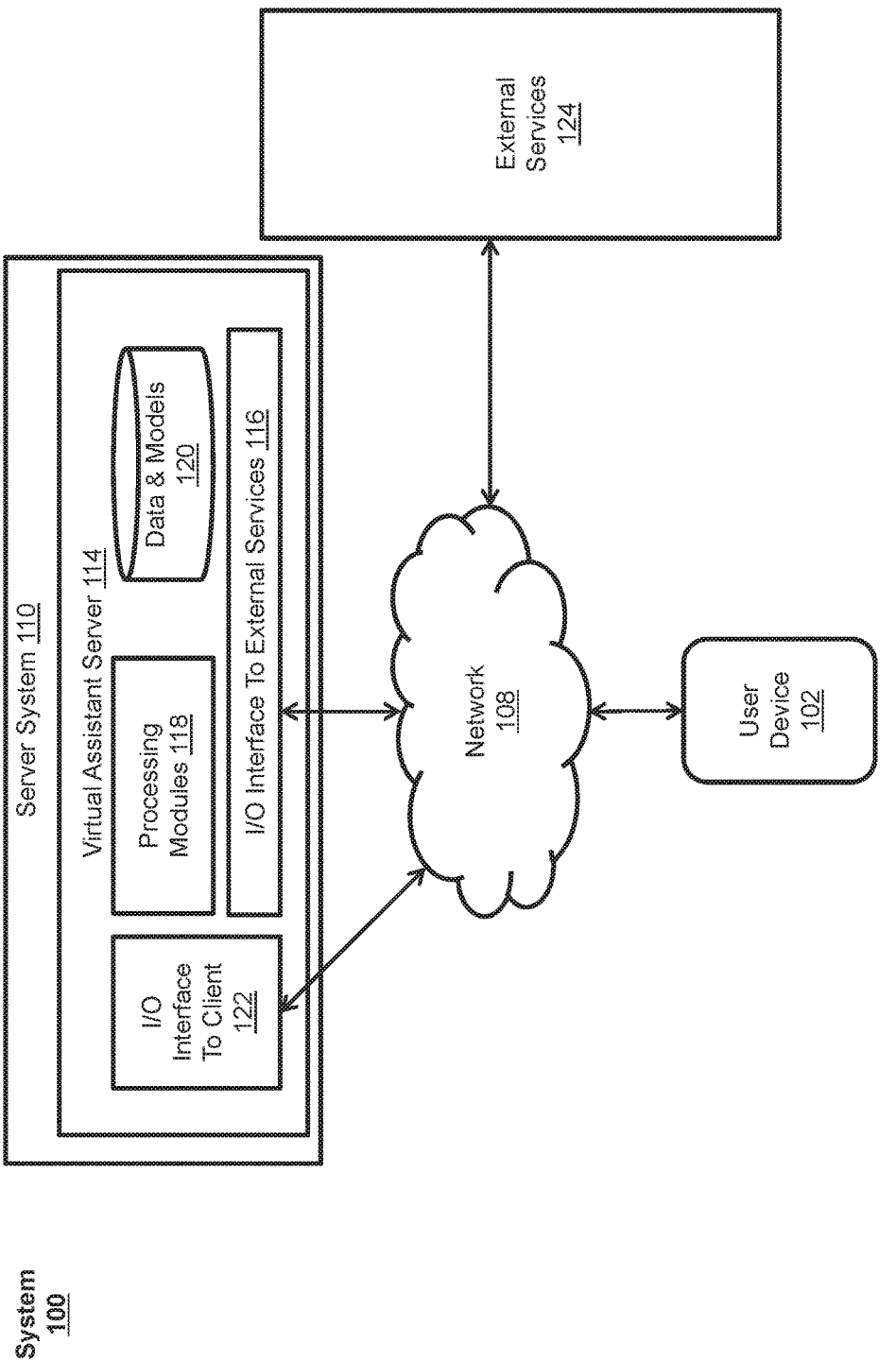
FIG. 1 illustrates an exemplary environment in which a virtual assistant can operate according to various examples.

FIG. 1 illustrates exemplary system 100 for implementing a virtual assistant according to various examples. The terms "virtual assistant," "digital assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent; inputting specific requirements from the inferred user intent into the task flow; executing the task flow by invoking programs, methods, services, APIs, or the like; and generating output responses to the user in an audible (e.g., speech) and/or visual form.

A virtual assistant can be capable of accepting a user request at least partially in the form of a natural language command, request, statement, narrative, and/or inquiry. Typically, the user request seeks either an informational answer or performance of a task by the virtual assistant. A satisfactory response to the user request can include provision of the requested informational answer, performance of the requested task, or a combination of the two. For example, a user can ask the virtual assistant a question, such as "Where am I right now?" Based on the user's current location, the virtual assistant can answer, "You are in Central Park." The user can also request the performance of a task, for example, "Please remind me to call Mom at 4 p.m. today." In response, the virtual assistant can acknowledge the request and then create an appropriate reminder item in the user's electronic schedule. During the performance of a requested task, the virtual assistant can sometimes interact with the user in a continuous dialogue involving multiple exchanges of information over an extended period of time. There are numerous other ways of interacting with a virtual assistant to request information or performance of various tasks. In addition to providing verbal responses and taking programmed actions, the virtual assistant can also provide responses in other visual or audio forms (e.g., as text, alerts, music, videos, animations, etc.).

An example of a virtual assistant is described in Applicants' U.S. Utility application Ser. No. 12/987,982 for "Intelligent Automated Assistant," filed Jan. 10, 2011, the entire disclosure of which is incorporated herein by reference.

As shown in FIG. 1, in some examples, a virtual assistant can be implemented according to a client-server model. The virtual assistant can include a client-side portion executed on a user device 102, and a server-side portion executed on a server system 110. User device 102 can include any electronic device, such as a mobile phone, tablet computer, portable media player, desktop computer, laptop computer, PDA, television, television set-top box, wearable electronic device, or the like, and can communicate with server system 110 through one or more networks 108, which can include the Internet, an intranet, or any other wired or wireless public or private network. The client-side portion executed on user device 102 can provide client-side functionalities, such as user-facing input and output processing and communications with server system 110. Server system 110 can provide server-side functionalities for any number of clients residing on a respective user device 102.

Server system 110 can include one or more virtual assistant servers 114 that can include a client-facing I/O interface 122, one or more processing modules 118, data and model storage 120, and an I/O interface to external services 116. The client-facing I/O interface 122 can facilitate the client-facing input and output processing for virtual assistant server 114. The one or more processing modules 118 can utilize data and model storage 120 to determine the user's intent based on natural language input, and perform task execution based on inferred user intent. In some examples, virtual assistant server 114 can communicate with external services 124, such as telephony services, calendar services, information services, messaging services, navigation services, and the like, through network(s) 108 for task completion or information acquisition. The I/O interface to external services 116 can facilitate such communications.

Server system 110 can be implemented on one or more standalone data processing devices or a distributed network of computers. In some examples, server system 110 can employ various virtual devices and/or services of third party service providers (e.g., third-party cloud service providers) to provide the underlying computing resources and/or infrastructure resources of server system 110.

Although the functionality of the virtual assistant is shown in FIG. 1 as including both a client-side portion and a server-side portion, in some examples, the functions of the assistant can be implemented as a standalone application installed on a user device. In addition, the division of functionalities between the client and server portions of the virtual assistant can vary in different examples. For instance, in some examples, the client executed on user device 102 can be a thin-client that provides only user-facing input and output processing functions, and delegates all other functionalities of the virtual assistant to a backend server.

User Device

Figure 2:
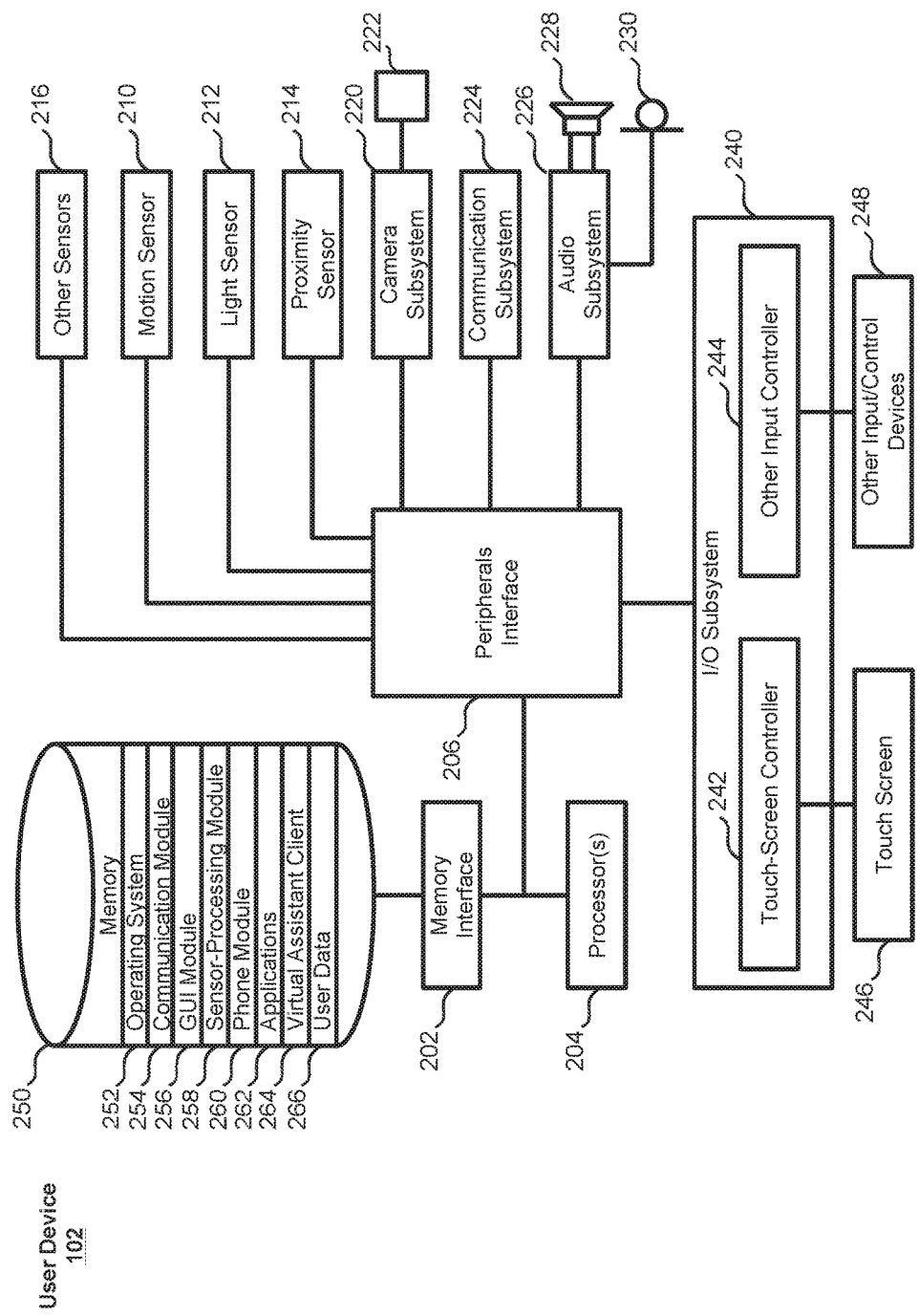
FIG. 2 illustrates an exemplary user device according to various examples.

FIG. 2 is a block diagram of a user-device 102 according to various examples. As shown, user device 102 can include a memory interface 202, one or more processors 204, and a peripherals interface 206. The various components in user device 102 can be coupled together by one or more communication buses or signal lines. User device 102 can further include various sensors, subsystems, and peripheral devices that are coupled to the peripherals interface 206. The sensors, subsystems, and peripheral devices gather information and/or facilitate various functionalities of user device 102.

For example, user device 102 can include a motion sensor 210, a light sensor 212, and a proximity sensor 214 coupled to peripherals interface 206 to facilitate orientation, light, and proximity sensing functions. One or more other sensors 216, such as a positioning system (e.g., a GPS receiver), a temperature sensor, a biometric sensor, a gyroscope, a compass, an accelerometer, and the like, are also connected to peripherals interface 206, to facilitate related functionalities.

In some examples, a camera subsystem 220 and an optical sensor 222 can be utilized to facilitate camera functions, such as taking photographs and recording video clips. Communication functions can be facilitated through one or more wired and/or wireless communication subsystems 224, which can include various communication ports, radio frequency receivers and transmitters, and/or optical (e.g., infrared) receivers and transmitters. An audio subsystem 226 can be coupled to speakers 228 and a microphone 230 to facilitate voice-enabled functions, such as voice recognition, voice replication, digital recording, and telephony functions.

In some examples, user device 102 can further include an I/O subsystem 240 coupled to peripherals interface 206. I/O subsystem 240 can include a touch screen controller 242 and/or other input controller(s) 244. Touch-screen controller 242 can be coupled to a touch screen 246. Touch screen 246 and the touch screen controller 242 can, for example, detect contact and movement or break thereof using any of a plurality of touch sensitivity technologies, such as capacitive, resistive, infrared, and surface acoustic wave technologies, proximity sensor arrays, and the like. Other input controller(s) 244 can be coupled to other input/control devices 248, such as one or more buttons, rocker switches, a thumb-wheel, an infrared port, a USB port, and/or a pointer device such as a stylus.

In some examples, user device 102 can further include a memory interface 202 coupled to memory 250. Memory 250 can include any electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as CD, CD-R, CD-RW, DVD, DVD-R, or DVD-RW, or flash memory such as compact flash cards, secured digital cards, USB memory devices, memory sticks, and the like. In some examples, a non-transitory computer-readable storage medium of memory 250 can be used to store instructions (e.g., for performing some or all of process 300 or 800, described below) for use by or in connection with an instruction execution system, apparatus, or device, such as a computer-based system, processor-containing system, or other system that can fetch the instructions from the instruction execution system, apparatus, or device, and execute the instructions. In other examples, the instructions (e.g., for performing process 300 or 800, described below) can be stored on a non-transitory computer-readable storage medium of server system 110, or can be divided between the non-transitory computer-readable storage medium of memory 250 and the non-transitory computer-readable storage medium of server system 110. In the context of this document, a "non-transitory computer readable storage medium" can be any medium that can contain or store the program for use by or in connection with the instruction execution system, apparatus, or device.

In some examples, the memory 250 can store an operating system 252, a communication module 254, a graphical user interface module 256, a sensor processing module 258, a phone module 260, and applications 262. Operating system 252 can include instructions for handling basic system services and for performing hardware dependent tasks. Communication module 254 can facilitate communicating with one or more additional devices, one or more computers, and/or one or more servers. Graphical user interface module 256 can facilitate graphic user interface processing. Sensor processing module 258 can facilitate sensor related processing and functions. Phone module 260 can facilitate phone-related processes and functions. Application module 262 can facilitate various functionalities of user applications, such as electronic-messaging, web browsing, media processing, navigation, imaging, and/or other processes and functions.

As described herein, memory 250 can also store client-side virtual assistant instructions (e.g., in a virtual assistant client module 264) and various user data 266 (e.g., user-specific vocabulary data, preference data, and/or other data, such as the user's electronic address book, to-do lists, shopping lists, etc.) to provide the client-side functionalities of the virtual assistant.

In various examples, virtual assistant client module 264 can be capable of accepting voice input (e.g., speech input), text input, touch input, and/or gestural input through various user interfaces (e.g., I/O subsystem 240, audio subsystem 226, or the like) of user device 102. Virtual assistant client module 264 can also be capable of providing output in audio (e.g., speech output), visual, and/or tactile forms. For example, output can be provided as voice, sound, alerts, text messages, menus, graphics, videos, animations, vibrations, and/or combinations of two or more of the above. During operation, virtual assistant client module 264 can communicate with the virtual assistant server using communication subsystem 224.

In some examples, virtual assistant client module 264 can utilize the various sensors, subsystems, and peripheral devices to gather additional information from the surrounding environment of user device 102 to establish a context associated with a user, the current user interaction, and/or the current user input. In some examples, virtual assistant client module 264 can provide the contextual information or a subset thereof with the user input to the virtual assistant server to help infer the user's intent. The virtual assistant can also use the contextual information to determine how to prepare and deliver outputs to the user.

In some examples, the contextual information that accompanies the user input can include sensor information, such as lighting, ambient noise, ambient temperature, images or videos of the surrounding environment, distance to another object, and the like. The contextual information can further include information associated with the physical state of user device 102 (e.g., device orientation, device location, device temperature, power level, speed, acceleration, motion patterns, cellular signal strength, etc.) or the software state of user device 102 (e.g., running processes, installed programs, past and present network activities, background services, error logs, resources usage, etc.). Any of these types of contextual information can be provided to the virtual assistant server 114 as contextual information associated with a user input.

In some examples, virtual assistant client module 264 can selectively provide information (e.g., user data 266) stored on user device 102 in response to requests from the virtual assistant server 114. Virtual assistant client module 264 can also elicit additional input from the user via a natural language dialogue or other user interfaces upon request by virtual assistant server 114. Virtual assistant client module 264 can pass the additional input to virtual assistant server 114 to help virtual assistant server 114 in intent inference and/or fulfillment of the user's intent expressed in the user request.

In various examples, memory 250 can include additional instructions or fewer instructions. Furthermore, various functions of user device 102 can be implemented in hardware and/or in firmware, including in one or more signal processing and/or application specific integrated circuits.

Determining Acoustic Environment Suitability

Figure 3:
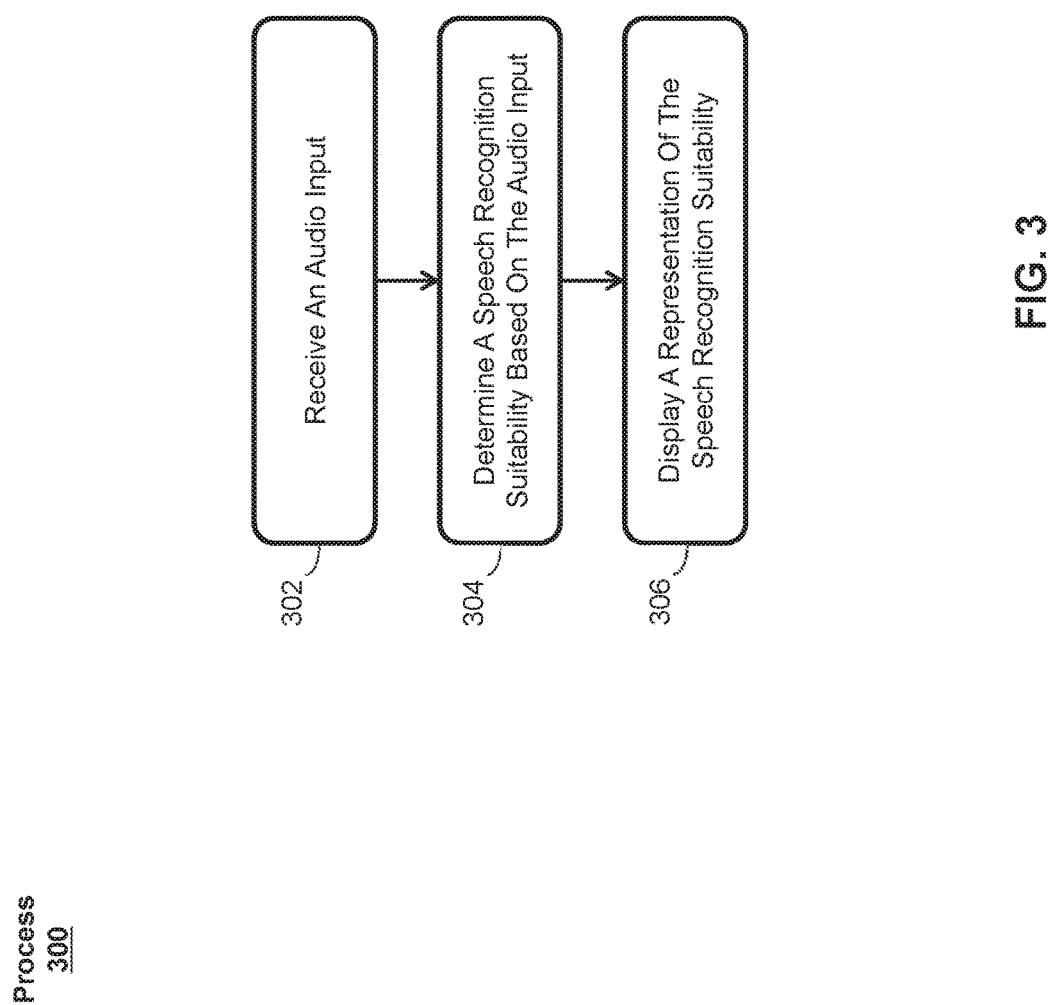
FIG. 3 illustrates an exemplary process for providing a visual representation of the suitability of an acoustic environment for performing speech recognition according to various examples.

As mentioned above, the acoustic environment in which a virtual assistant operates can affect the virtual assistant's ability to interpret a user's spoken input. For example, background noise, such as music, conversations of other individuals, traffic noises, or the like, can obscure the user's spoken input contained in the audio received by the virtual assistant. Thus, it can be desirable to operate a virtual assistant in an acoustic environment that is conducive to performing speech recognition. FIG. 3 illustrates an exemplary process for determining a suitability of an acoustic environment for performing speech recognition and providing a visual representation of the same according to various examples.

At block 302, an audio input can be received at a user device. In some examples, a user device (e.g., user device 102) can receive the audio input via a microphone (e.g., microphone 230). The microphone can convert the audio input into an analog or digital representation, and provide audio data representing the audio input to one or more processors (e.g., processor(s) 204) of the user device. In some examples, the audio input can include user speech. In other examples, the audio input may not include user speech.

At block 304, a speech recognition suitability can be determined based on the audio input received at block 302. The speech recognition suitability can include a numerical (e.g., a score from 1-5, 1-100, etc.), textual or categorical (e.g., "poor," "fair," "good," "excellent," "acceptable," "unacceptable," etc.), graphical (e.g., a color image), or other representation of the suitability or conduciveness of an acoustic environment in which the user device is located for performing speech recognition. In other words, the speech recognition suitability can generally indicate whether a speech recognition process performed in a particular acoustic environment is likely to produce accurate or inaccurate results.

In some examples, determining the speech recognition suitability can generally include determining one or more characteristics of the acoustic environment in which the user device is located and determining the speech recognition suitability based on those one or more characteristics. The characteristics of the acoustic environment can include any desired characteristic, such as a signal-to-noise ratio (SNR), an SNR in one or more frequency bands, an intensity (e.g., volume) and/or type of noise detected (e.g., music, speech, pink noise, transient noise, etc.), an intensity and/or type of noise detected in one or more frequency bands, a number of occurrences and intensity of a particular type of noise detected during a previous length of time, or the like. While specific characteristics of an acoustic environment are provided above, it should be appreciated that any other characteristic of an acoustic environment that is indicative of the likelihood that the acoustic environment will negatively affect the performance of a speech recognition process can be used at block 304 to determine the speech recognition suitability.

In some examples, when using the SNR or the SNR of one or more frequency bands as one of the characteristics to determine the speech recognition suitability of the acoustic environment, block 304 can include determining an average noise level and an average signal level over any desired length of time based on the audio input received at block 302. This can be performed over all frequencies or can be performed for multiple discrete frequency bands. These values can then be used to compute an SNR over all frequencies or for the multiple discrete frequency bands for the acoustic environment. In general, a higher SNR can be indicative of an acoustic environment that is more suitable or conducive to performing speech recognition and can cause the speech recognition suitability determined at block 304 to be a value that indicates a more suitable acoustic environment. In contrast, a lower SNR can be indicative of an acoustic environment that is less suitable or conducive to performing speech recognition and can cause the speech recognition suitability determined at block 304 to be a value that indicates a less suitable acoustic environment. Examples of how the SNR can be used to calculate the speech recognition suitability are discussed in greater detail below.

In some examples, when using the type of noise detected or the type of noise detected in one or more frequency bands as one of the characteristics to determine the speech recognition suitability of the acoustic environment, block 304 can include inputting the audio received at block 302 into one or more audio classifiers to determine a type of a detected noise. For example, audio classifiers can be used to identify music, speech, transient noises (e.g., sounds that last for short duration, such as a honk of a car's horn, the beating of a drum, the sound of an object falling to the ground, etc.), pink noise, or the like. This can be performed over all frequencies or can be performed for multiple discrete frequency bands. The type(s) of identified noises can then be used to compute a speech recognition suitability. In general, the influence of the identified type of noise on the speech recognition suitability can be related to the difficulty of filtering the type of noise or the likelihood that the type of noise will negatively affect the performance of a speech recognition process. For example, non-transient noises that are slow-varying in time (e.g., wind, sound of a car driving on the road, etc.) can often be filtered from the audio input, causing a minimal impact on a speech recognition process. As a result, these types of noises can result in less of a negative impact on the determined speech recognition suitability. However, transient noises can be more difficult to filter from an audio input, causing a greater impact on a speech recognition process. As a result, these types of noises can result in a greater negative impact on the determined speech recognition suitability. In some examples, the identified type of noise can be combined with a detected intensity of the noise. For example, noises with higher intensities can more greatly impact the performance of a speech recognition process, while noises with lower intensities can have less of an impact. Examples of how the intensity and/or type of noise can be used to calculate the speech recognition suitability are discussed in greater detail below.

In some examples, when using the number of occurrences and intensity of a particular type of noise detected during a previous length of time as one of the characteristics to determine the speech recognition suitability of the acoustic environment, block 304 can include maintaining a buffer that at least includes the last X minutes of audio input received at block 302 and analyzing the buffer to determine the number of occurrences and volume of a particular type of noise detected within the last X minutes of time. For example, block 304 can include determining the number of occurrences and volume of transient type noises within last X minutes. This value can be indicative of the likelihood that a similar type of noise will occur in the future. In general, a higher intensity and larger number of detected occurrences of the particular type of noise can be indicative of an acoustic environment that is less suitable or conducive to performing speech recognition and can cause the speech recognition suitability determined at block 304 to be a value that indicates a less suitable acoustic environment. In contrast, a lower intensity and smaller number of detected occurrences of the particular type of noise can be indicative of an acoustic environment that is more suitable or conducive to performing speech recognition and can cause the speech recognition suitability determined at block 304 to be a value that indicates a more suitable acoustic environment. Examples of how the number of occurrences and intensity of a particular type of noise detected during a previous length of time can be used to calculate the speech recognition suitability are discussed in greater detail below.

The speech recognition suitability can be determined using one or more characteristics of the acoustic environment, such as those described above, in various ways. For instance, in some examples, each characteristic of the acoustic environment can be assigned a speech recognition contribution value that is representative of a likelihood that an acoustic environment having that characteristic is to negatively affect the performance of a speech recognition process. In general, a characteristic that is indicative of an acoustic environment that is suitable or conducive to performing speech recognition can be assigned a low speech recognition contribution value (or a negative value), while a characteristic that is indicative of an acoustic environment that is not suitable or conducive to performing speech recognition can be assigned a large, positive speech recognition contribution value. The speech recognition contribution values can be combined with the speech recognition contribution values associated with other characteristics of the acoustic environment to calculate an overall speech recognition suitability score. For example, the speech recognition contribution values associated with each characteristic of the acoustic environment can be combined by calculating the sum of the values, calculating a weighted sum of the values, or combining the values in any other desired manner to generate an overall speech recognition suitability score. In this example, a large overall speech recognition suitability score can be indicative of an acoustic environment that is not suitable or conducive to performing speech recognition, while a small (or negative) overall speech recognition suitability score can be indicative of an acoustic environment that is suitable or conducive to performing speech recognition. It should be appreciated that, in other examples, different numbering conventions can be used such that a small (or negative) overall speech recognition suitability score can be indicative of an acoustic environment that is not suitable or conducive to performing speech recognition, while a large, positive overall speech recognition suitability score can be indicative of an acoustic environment that is suitable or conducive to performing speech recognition.

To illustrate, the speech recognition contribution value assigned to an SNR characteristic can be the inverse of the SNR value, can be the inverse of the SNR value multiplied by a scaling factor, or can be a different value assigned using a different convention that generally relates the assigned value to the likelihood that an acoustic environment having the SNR value is suitable or conducive to performing speech recognition. For example, the speech recognition contribution value can vary monotonically (linearly or non-linearly) with respect to the inverse of the SNR value such that smaller SNR values can be assigned larger speech recognition contribution values.

Similarly, the speech recognition contribution value assigned to a noise-type characteristic can be a value that is assigned to each of the different types of detectable noises. For example, pink noises, which can be easy to filter and can have a low impact on the performance of a speech recognition process, can be assigned lower speech recognition contribution values, while transient noises, which can have significant negative effects on a speech recognition process, can be assigned larger speech recognition contribution values. Other types of noises can similarly be assigned speech recognition contribution values based on the likelihood that those types of noises will negatively impact the performance of a speech recognition process. In some examples, the intensity (e.g., volume) of the noise can also be used to adjust the speech recognition contribution value assigned to the type of detected noise. For example, a noise having a lower intensity can be used to reduce the negative impact of the noise on the determined speech recognition suitability (e.g., by multiplying the intensity by the value assigned to the type of noise), while a noise having a higher intensity can be used to increase the negative impact of the noise on the determined speech recognition suitability (e.g., by multiplying the intensity by the value assigned to the type of noise).

Additionally, the speech recognition contribution value assigned to the characteristic indicating the number of occurrences and intensity of a particular type of noise detected during a previous length of time can depend on the number of occurrences and intensity of the detected noises. For example, a larger number of occurrences can be associated with a larger speech recognition contribution value, while a lower number of occurrences can be associated with a smaller speech recognition contribution value. In some examples, the intensity (e.g., volume) of the noise can also be used to adjust the speech recognition contribution value assigned to the number of detected noises. For example, a noise having a lower intensity can be used to reduce the negative impact of the noise on the determined speech recognition suitability (e.g., by multiplying the intensity by the number of occurrences of the type of noise), while a noise having a higher intensity can be used to increase the negative impact of the noise on the determined speech recognition suitability (e.g., by multiplying the intensity by the value assigned to the type of noise).

The speech recognition contribution values for the various characteristics of the acoustic environment can then be combined as mentioned above (e.g., by calculating the sum of the values, calculating a weighted sum of the values, or combining the values in any other desired manner) to generate an overall speech recognition suitability score.

In other examples, the speech recognition suitability can be determined by determining a speech recognition suitability category based on the characteristics of the acoustic environment. In some examples, conditional logic based on one or more characteristics of the acoustic environment can be used to select one of multiple speech recognition suitability categories (e.g., "poor," "fair," "good," "excellent," "acceptable," "unacceptable," etc.) for a particular environment. For example, conditions can be established that state if the SNR value is within a first range of values, then the speech recognition suitability can be assigned a first category, that state that if the SNR value is within a second range of values, then the speech recognition suitability can be assigned a second category, and so on. Similarly, conditions can be established that state if the type of detected noise is a first type of noise (e.g., pink noise), then the speech recognition suitability can be assigned a first category (e.g., "fair"), that state if the type of detected noise is a second type of noise (e.g., transient noise), then the speech recognition suitability can be assigned a second category (e.g., "poor"), and so on. Similarly, conditions can be established that state if the number of occurrences of a particular type of noise (and, optionally, combined with the intensity of the noise) is within a first range of values, then the speech recognition suitability can be assigned a first category, that state that if the number of occurrences of a particular type of noise (and, optionally, combined with the intensity of the noise) is within a second range of values, then the speech recognition suitability can be assigned a second category, and so on. In other examples, conditions can be established that depend on any two or more characteristics of the acoustic environment. For example, one condition can be that if the SNR value is below a lower threshold value and if the number of transient noises detected in the last X minutes is greater than an upper threshold value, then the speech recognition suitability can be assigned a category of "poor." It should be appreciated that any number of conditions that depend on any number of characteristics can similarly be used to determine the speech recognition suitability.

In yet other examples, the speech recognition suitability can be generated through the use of a neural network. In these examples, a speech recognition suitability vector can be determined based on the audio input received at block 302. The speech recognition suitability vector can be expressed as: vector=[S1, S2, . . . SN], where each element S represents a different characteristic of the acoustic environment as determined from the audio input received at block 302. For example, a first element S1 can represent an SNR for a first frequency band, a second element S2 can represent an SNR for a second frequency band, a third element S3 can represent a type of noise detected (e.g., over all frequencies or for a particular frequency), a fourth element S4 can represent an intensity of the detected noise, a fifth element S5 can include a number of occurrences of particular type of noise (e.g., transient noises) detected over the last X minutes, a sixth element S6 can represent an intensity of one or more of the occurrences of the particular type of noise, and so on. The vector can include any number of elements and the values assigned to the elements can be assigned using any desired convention, such as the speech recognition contribution values assigned using the first method of determining speech recognition suitability discussed above.

The speech recognition suitability vector can be input into the neural network, which can then determine an overall speech recognition suitability based on the values of the elements contained in the speech recognition suitability vector. The result can be a numerical representation (e.g., a score from 1-5, 1-100, etc.), a textual or categorical representation (e.g., "poor," "fair," "good," "excellent," "acceptable," "unacceptable," etc.), a graphical representation (e.g., a color), or any other desired representation of the suitability or conduciveness of the acoustic environment for performing speech recognition. In these examples, the neural network can be trained using vectors of acoustic environments that have been determined to be suitable or unsuitable for performing speech recognition to cause the neural network to provide a desired speech recognition suitability for any combination of characteristic values of the acoustic environment.

In some examples, the characteristics of the acoustic environment can be determined by hardware within the user device (e.g., processors or other circuitry configured to perform the task of determining the characteristics). For example, the hardware can include classifiers to determine a type of noise, circuitry to measure an intensity of noise, and counters to track the number of occurrences of a particular type of noise over time. The hardware can periodically, intermittently, or at any other desired interval of time output tagged values that can be processed using software on the user device to determine the speech recognition suitability. This hardware implementation advantageously reduces that amount of power required to determine the speech recognition suitability over extended periods of time. For example, if the user device is configured to continuously (or intermittently over an extended period of time) monitor an acoustic environment by continuing to receive and monitor an audio input (e.g., at block 302), determining the characteristics of the acoustic environment using hardware specifically designed to perform that function can result in increased power efficiency.

Figure 4:
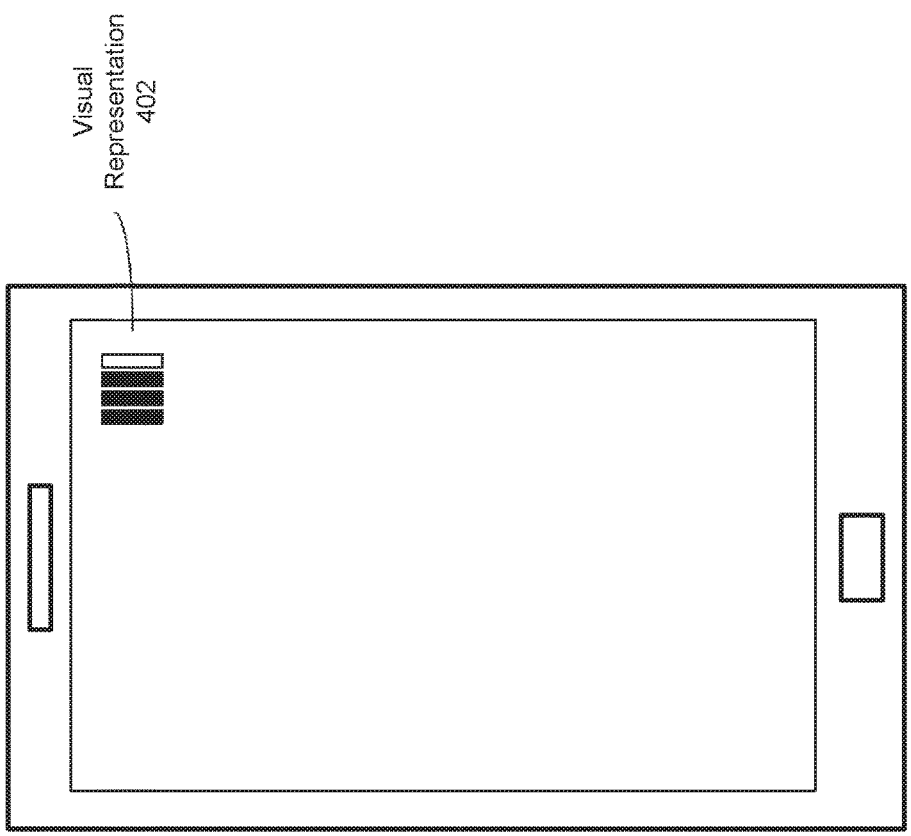
FIGS. 4-7 illustrate exemplary visual representations of the suitability of an acoustic environment for performing speech recognition according to various examples.

At block 306, the user device can display a visual representation of the speech recognition suitability. The visual representation can include any desired representation. For example, FIG. 4 illustrates an example interface 400 that can be displayed at block 306 of process 300. As shown, interface 400 includes visual representation 402 that includes multiple vertical bars, where the value of the speech recognition suitability is represented by a number of the one or more bars that are filled-in. For instance, in this example, the speech recognition suitability can be mapped to one of five (or any other desired number) discrete values (e.g., 0, 1, 2, 3, or 4) corresponding to the number of possible bars that can be filled-in. For example, if the speech recognition suitability values range from 1-10, the speech recognition suitability can be mapped linearly to the five discrete values (e.g., a speech recognition of 1-2 corresponds to 4 bars, a speech recognition of 3-4 corresponds to 3 bars, a speech recognition of 5-6 corresponds to 2 bars, a speech recognition of 7-8 corresponds to 1 bar, and a speech recognition of 9-10 corresponds to 0 bars). In other examples, the speech recognition suitability can be mapped non-linearly to the discrete number of bars.

Figure 5:
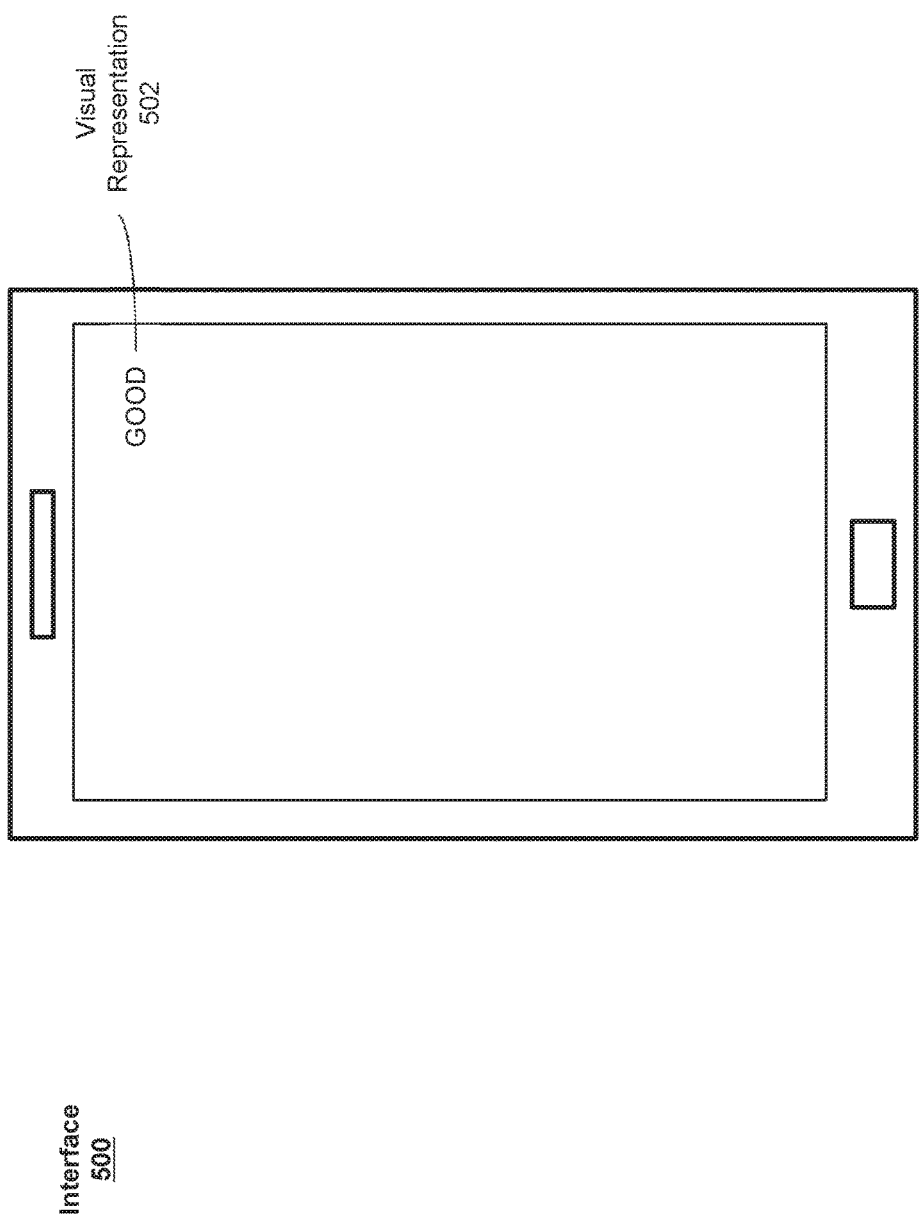

In other examples, the visual representation can include text representing the value of the speech recognition suitability. For example, FIG. 5 illustrates interface 500 that can be displayed at block 306 of process 300. As shown, interface 500 includes visual representation 502 in the form of the text "GOOD" that represents the value of the speech recognition suitability. In this example, the speech recognition suitability can be mapped to one of four (or any other desired number) different descriptions (e.g., "poor," "fair," "good," "excellent,"). For example, if the speech recognition suitability values range from 1-20, the speech recognition suitability can be mapped linearly to the four discrete descriptions (e.g., a speech recognition of 1-5 corresponds to "EXCELLENT," a speech recognition of 6-10 corresponds to "GOOD," a speech recognition of 11-15 corresponds to "FAIR," and a speech recognition of 16-20 corresponds to "POOR"). In other examples, the speech recognition suitability can be mapped non-linearly to the different descriptions.

Figure 6:
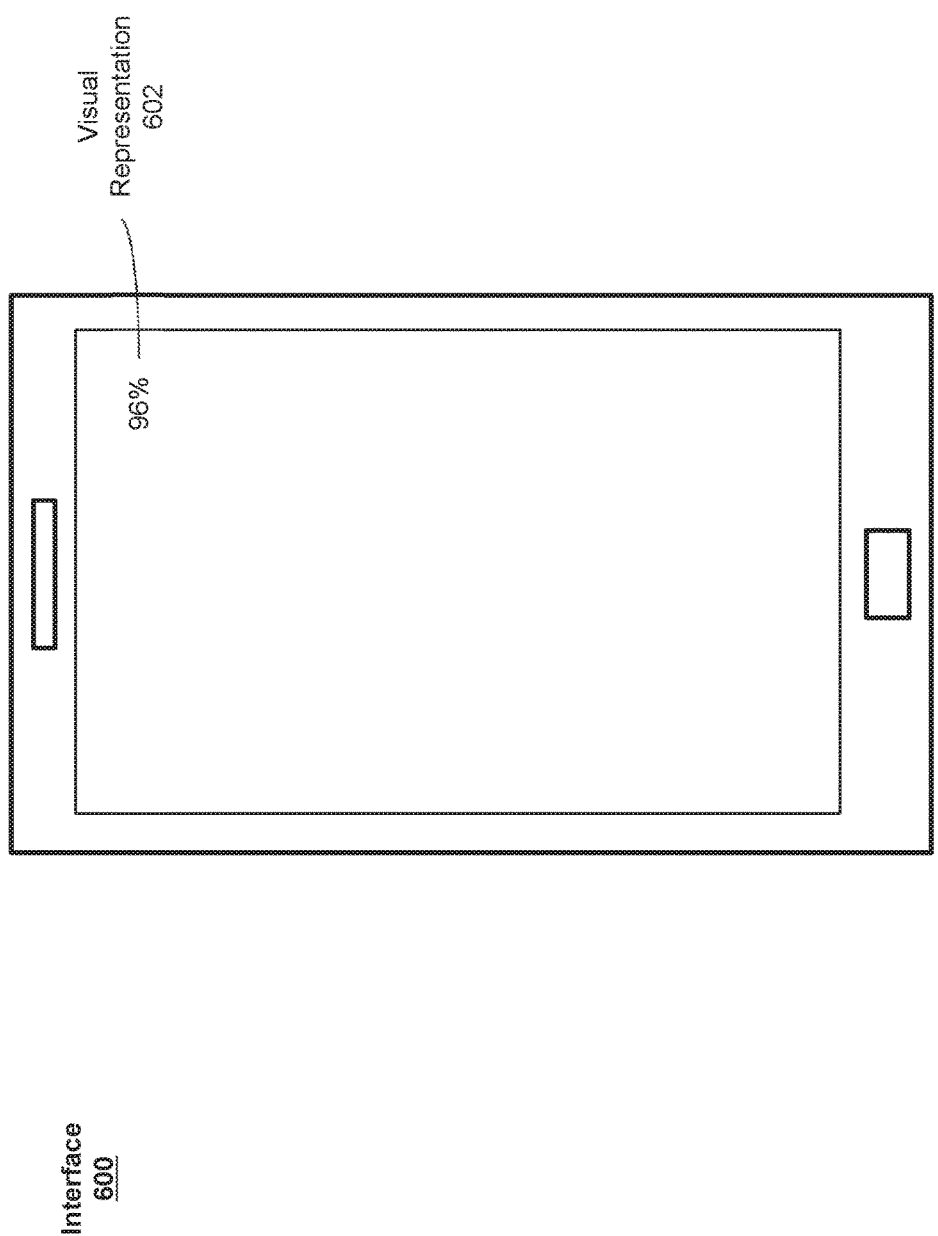

In other examples, the visual representation can include a numerical value representing the value of the speech recognition suitability. For example, FIG. 6 illustrates interface 600 that can be displayed at block 306 of process 300. As shown, interface 600 includes visual representation 602 in the form of the numerical value "96%." In this example, visual representation 602 can include the numerical value of the speech recognition suitability or can include a normalized value of the speech recognition suitability (e.g., by normalizing the value to a percentage based on the speech recognition suitability value and the maximum possible speech recognition suitability value). For instance, if the speech recognition suitability values range from 0-25, a speech recognition suitability value of 1 can be linearly normalized to 96%. In other examples, the speech recognition suitability can be non-linearly normalized to different values.

Figure 7:
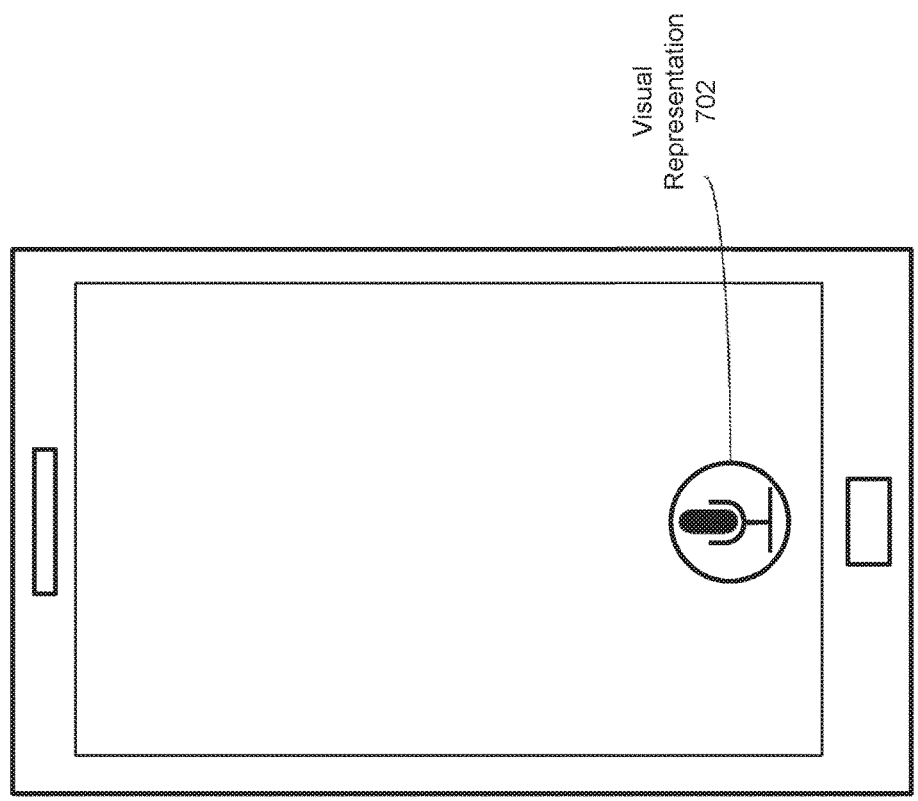

In yet other examples, the visual representation can include an icon, and the value of the speech recognition suitability can be represented by a color of the icon. For example, FIG. 7 illustrates interface 700 that can be displayed at block 306 of process 300. As shown, interface 700 includes visual representation 702 in the form of an icon having a microphone, where the value of the speech recognition suitability is represented by a color of the icon. In this example, the speech recognition suitability can be mapped to one of four (or any other desired number) different colors (e.g., grey, red, yellow, green) in which visual representation 702 can be displayed, with green representing the most suitable acoustic environment for performing speech recognition, yellow representing the second most suitable acoustic environment for performing speech recognition, grey representing the least suitable acoustic environment for performing speech recognition, and red representing the second least suitable acoustic environment for performing speech recognition. For example, if the speech recognition suitability values range from 1-20, the speech recognition suitability can be mapped linearly to the four discrete colors (e.g., a speech recognition of 1-5 corresponds to green, a speech recognition of 6-10 corresponds to yellow, a speech recognition of 11-15 corresponds to red, and a speech recognition of 16-20 corresponds to grey). In other examples, the speech recognition suitability can be mapped non-linearly to the different colors.

In some examples, the visual representation of the speech recognition suitability displayed at block 306 can be adjusted based on determined characteristics of the user. For example, the threshold values for determining the number of bars to display in interface 400, determining the text description to display in interface 500, determining the numerical value to display in interface 600, or determining the color to display in interface 700 can be adjusted based on the expected difficulty of performing speech recognition on speech produced by a user having certain characteristics. For example, user's that are female, that have an accent, and that are non-native speakers, can typically be more difficult for speech recognition programs to interpret. Thus, if the user has any of these characteristics, the user device can adjust the threshold values for determining the appropriate visual representation to require a better speech recognition suitability (indicating a more suitable acoustic environment) to display a particular visual representation. For example, a speech recognition suitability of 9 can result in four bars being filled-in in visual representation 402 for a male speaker, while a speech recognition suitability of 9 can result in only three bars being filled-in in visual representation 402 for a female speaker.

Process 300 can be repeated any number of times at any interval of time to provide update to date information regarding the suitability of an acoustic environment for performing speech recognition. For example, block 302 can be repeatedly performed to provide the user device with current audio input. Block 304 can then be performed to update the speech recognition suitability and block 306 can be performed to update the visual representation of the determined speech recognition suitability values.

It should be appreciated that process 300 can be performed in response to user input, such as a user selecting visual representation 702, the user uttering a trigger phrase, or any other desired input, or can be performed during any other duration of time. For example, process 300 can be performed while user device 300 is turned on, while user device 300 is plugged in to a power source, while an option for determining suitability is selected, or the like. In these examples, process 300 can be repeatedly performed to display a visual representation of speech recognition suitability before, during, or after the user interacts with the user device in natural language.

It should further be appreciated that the blocks of process 300 can be performed on user device 102, server system 110, or a combination of user device 102 and server system 110. For instance, in some examples, all blocks of process 300 can be performed on user device 102. In other examples, some blocks of process 300 can be performed at user device 102, while other blocks of process 300 can be performed at server system 110. For example, blocks 302 can be performed at user device 102. User device 102 can then transmit the audio input to server system 110, which can then determine the speech recognition suitability based on the audio input at block 304. Server system 110 can transmit the determined speech recognition suitability to user device 110, which can then display the visual representation of the speech recognition suitability at block 306.

Using process 300, a user device can advantageously provide an indication of the suitability of an acoustic environment for performing speech recognition. This allows a user to determine whether to proceed with the performance of a speech recognition process, or to move to a different location having a better acoustic environment before performing the speech recognition process. Additionally, this can provide a user with useful information about an acoustic environment when performing speech recognition that would otherwise be unavailable. For example, if executed while performing speech recognition, process 300 can provide a user with an explanation for why the speech recognition process is producing erroneous results.

Figure 8:
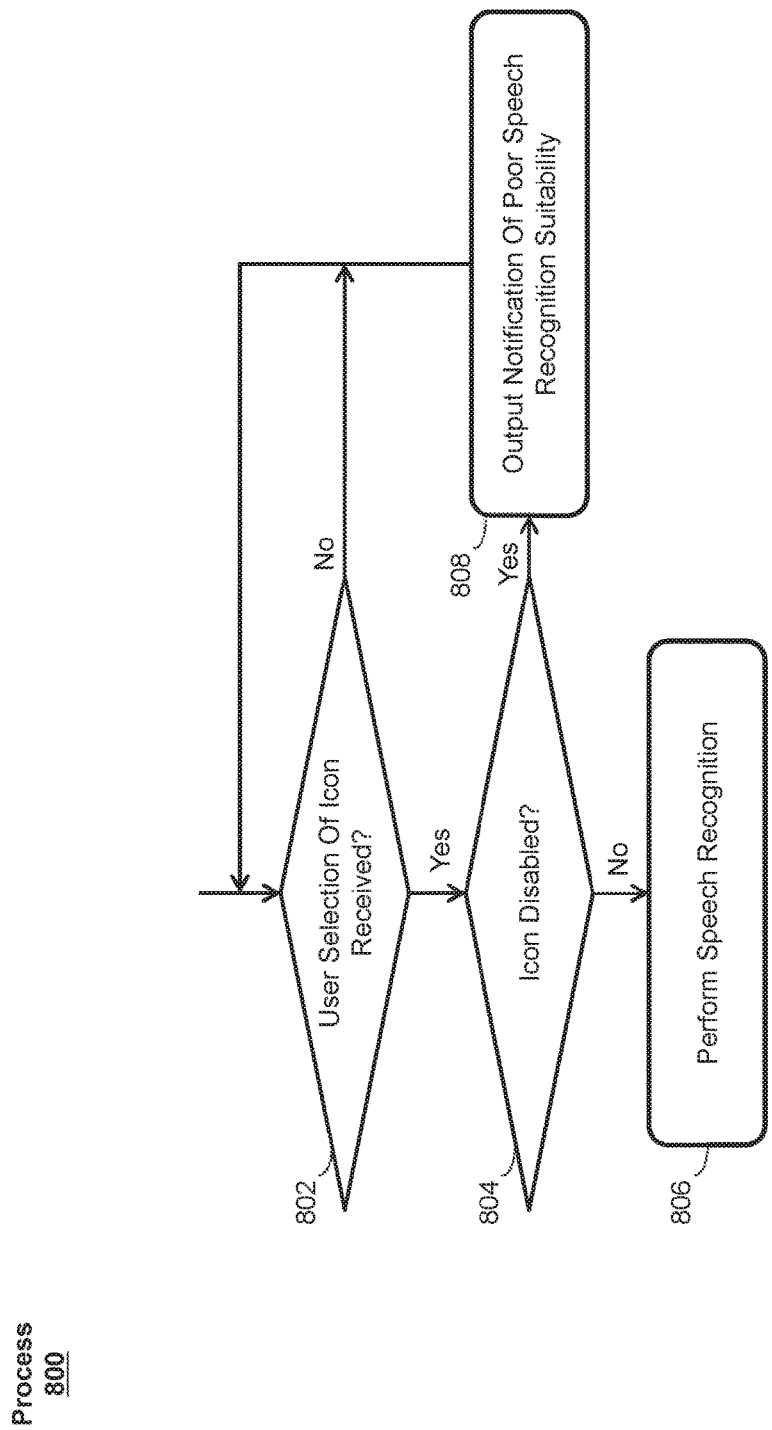
FIG. 8 illustrates an exemplary process for operating a virtual assistant based on a determined suitability of an acoustic environment for performing speech recognition according to various examples.

In some examples, visual representation 702 shown in FIG. 7 can be selectable by a user for the purpose of triggering a virtual assistant executed by the user device. For example, a user selection of visual representation 702 can be interpreted by the user device as a start-point of user speech, causing the user device to monitor subsequently received audio input for user speech and performing speech recognition on any such identified speech. In some of these examples, the user device can disable the functionality of visual representation 702 in response to the speech recognition suitability determined at block 304 being below (alternatively, above, depending on the scoring convention used for the speech recognition suitability) a threshold value, indicating a poor acoustic environment for performing speech recognition. FIG. 8 illustrates an exemplary process 800 for operating a virtual assistant according to various examples. In some examples, process 800 can be performed after the visual representation of the speech recognition suitability has been displayed at block 306 of process 300. At block 802, it can be determined whether a selection of the visual representation (e.g., the icon of visual representation 702) has been received. In some examples, this can include determining whether a tap on a touch sensitive display of the user device has been received at a location corresponding to the visual representation. In other examples, other forms of user input can be monitored to determine if a selection of the visual representation has been received. If it is determined that no selection of the visual representation has been received, process 800 can repeat block 802 until a selection is received. Alternatively, if it is instead determined at block 802 that a selection of the visual representation has been received, process 800 can proceed to block 804

At block 804, it can be determined whether the visual representation has been disabled due to a poor speech recognition suitability being determined for the acoustic environment at block 304 of process 300. In some examples, this can include determining whether the icon of visual representation 702 is displayed in a grey color or greyed out state. In other examples, the operation of the virtual assistant can be disabled in response to the speech recognition suitability being below a value that is different than the value used to delineate between display colors of the visual representation 702. In these examples, block 804 can include determining whether another condition is satisfied, such as determining whether the speech recognition suitability is less than a threshold value. If it is determined at block 804 that the visual representation is not disabled, process 800 can proceed to block 806 where a speech recognition process can be performed on audio input that is subsequently received by the user device. Alternatively, if it is instead determined at block 804 that the visual representation is disabled, process 800 can proceed to block 808.

At block 808, rather than perform speech recognition on audio input subsequently received by the user device, the user device can output a notification to the user that indicates the detection of an acoustic environment that is not suitable for performing speech recognition. This notification can include any desired audio, visual, or haptic output. For example, the notification can include a text message displayed on a display of the user device instructing the user to move to a new location to perform the speech recognition process.

Using process 800, a user device can advantageously disable functionality of a speech recognition process in response to determining that the speech recognition suitability of the present acoustic environment is below a threshold suitability. This can prevent frustration by a user attempting to use the speech recognition process in environments where it is highly unlikely for the speech recognition to function properly.

Electronic Device

Figure 9:
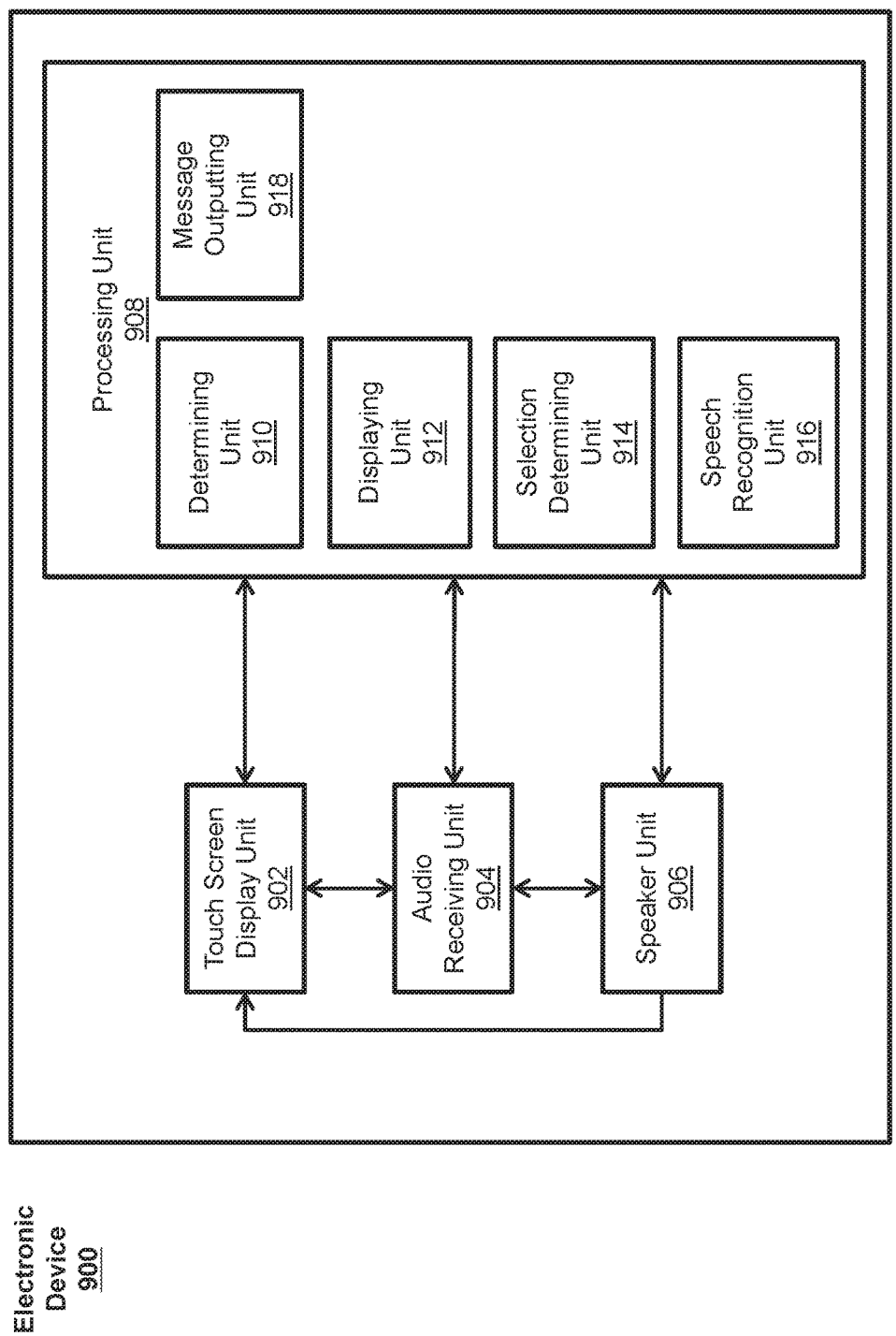
FIG. 9 illustrates a functional block diagram of an electronic device configured to determine a suitability of an acoustic environment for performing speech recognition and for providing a visual representation of the same according to various examples.

In accordance with some examples, FIG. 9 shows a functional block diagram of an electronic device 900 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 9 can be combined or separated into sub-blocks to implement the principles of the various described examples. Therefore, the description herein optionally supports any possible combination or separation or further definition of the functional blocks described herein.

As shown in FIG. 9, electronic device 900 can include a touch screen display unit 902 configured to display a user interface and to receive touch input, and a sound receiving unit 904 configured to receive sound input. In some examples, electronic device 900 can include a speaker unit 906 configured to generate sound. Electronic device 900 can further include a processing unit 908 coupled to touch screen display unit 902 and sound receiving unit 904 (and, optionally, coupled to speaker unit 906). In some examples, processing unit 908 can include determining unit 910, displaying unit 912, selection determining unit 914, speech recognition unit 916, and message outputting unit 918.

Processing unit 908 can be configured to receive an audio input (e.g., from audio receiving unit 904). Determining unit 910 can be configured to determine a speech recognition suitability based on the audio input, wherein the speech recognition suitability represents a suitability of an acoustic environment of the electronic device for speech recognition. Displaying unit 912 can be configured to display, in accordance with a determination of the speech recognition suitability, a visual representation of the speech recognition suitability.

In some examples, determining the speech recognition suitability based on the audio input includes: determining one or more characteristics of the acoustic environment based on the audio input; and determining the speech recognition suitability based on the one or more characteristics of the acoustic environment.

In some examples, the one or more characteristics of the acoustic environment includes a signal to noise ratio for a first frequency band of the acoustic environment. In some examples, the one or more characteristics of the acoustic environment includes a type of noise detected in the first frequency band.

In some examples, the one or more characteristics of the acoustic environment includes a signal to noise ratio for a second frequency band of the acoustic environment. In some examples, the one or more characteristics of the acoustic environment includes a type of noise detected in the second frequency band.

In some examples, the one or more characteristics of the acoustic environment includes a number of transient noises detected in a buffer comprising previously recorded audio of the acoustic environment.

In some examples, determining the speech recognition suitability based on the audio input includes: determining a speech recognition suitability vector based on the audio input, wherein the speech recognition suitability vector comprises one or more elements that represent the one or more characteristics of the acoustic environment; and using a neural network to determine the speech recognition suitability based on the speech recognition suitability vector.

In some examples, the visual representation includes one or more bars, and wherein a value of the speech recognition suitability is represented by a number of the one or more bars.

In some examples, the visual representation includes an icon, and wherein a value of the speech recognition suitability is represented by a color of the icon. In some examples, the icon includes an image of a microphone. In some examples, displaying the visual representation of the speech recognition suitability includes: determining whether a value of the speech recognition suitability is less than a threshold value; in accordance with a determination that the value of the speech recognition suitability is less than the threshold value, displaying the icon in a grayed out state; and in accordance with a determination that the value of the speech recognition suitability is not less than the threshold value, displaying the icon in a non-grayed out state.

In some examples, selection determining unit 914 can be configured to determine whether a user selection of the icon is received. Speech recognition unit 916 can be configured to perform, in accordance with a determination that the user selection of the icon is received while the icon is displayed in the non-grayed out state, speech recognition on an audio input received subsequent to receiving the user selection of the icon. Speech recognition unit 916 can be further configured to forgo, in accordance with a determination that the user selection of the icon is received while the icon is displayed in the grayed out state, the performance of speech recognition on the audio input received subsequent to receiving the user selection of the icon.

In some examples, message outputting unit 918 can be configured to output, in accordance with a determination that the value of the speech recognition suitability is less than the threshold value, a message indicating a low suitability of the acoustic environment of the electronic device for speech recognition.

In some examples, the visual representation includes a textual representation of the speech recognition suitability.

In some examples, determining the speech recognition suitability based on the audio input includes periodically determining the speech recognition suitability based on the audio input, and displaying the visual representation of the speech recognition suitability includes updating the display of the visual representation of the speech recognition suitability in accordance with the periodically determined speech recognition suitability.

In some examples, the speech recognition suitability comprises a numerical value.

As described above, one aspect of the present technology is the gathering and use of data available from various sources to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A non-transitory computer-readable storage medium storing one or more programs, the one or more programs comprising instructions, which when executed by one or more processors of an electronic device, cause the electronic device to:
   receive speech input from a user;
   determine whether the speech input includes a spoken trigger;
   in response to determining that the speech input includes a spoken trigger, obtain audio input from an acoustic environment;
   while producing speech recognition results by performing speech recognition on the audio input, determine a speech recognition suitability value based on the audio input; and
   in accordance with a determination that the speech recognition suitability value does not satisfy a predetermined criterion, provide an output to indicate that the acoustic environment is not suitable for performing speech recognition.

2. The storage medium of claim 1, wherein the output includes a haptic output.

3. The storage medium of claim 1, wherein the output includes an audio output indicating that the acoustic environment is not suitable for performing speech recognition.

4. The storage medium of claim 1, wherein the instructions further cause the electronic device to:
   determine whether an option for determining speech recognition suitability is selected; and
   in accordance with a determination that the option for determining speech recognition suitability is selected, determine the speech recognition suitability value based on the audio input.

5. The storage medium of claim 1, wherein determining the speech recognition suitability value based on the audio input comprises:
   determining one or more characteristics of the acoustic environment based on the audio input; and
   determining the speech recognition suitability value based on the one or more characteristics of the acoustic environment.

6. The storage medium of claim 5, wherein the one or more characteristics of the acoustic environment comprise a signal to noise ratio for a first frequency band of the acoustic environment.

7. The storage medium of claim 6, wherein the one or more characteristics of the acoustic environment comprise a type of noise detected in the first frequency band.

8. The storage medium of claim 6, wherein the one or more characteristics of the acoustic environment comprise a signal to noise ratio for a second frequency band of the acoustic environment.

9. The storage medium of claim 8, wherein the one or more characteristics of the acoustic environment comprise a type of noise detected in the second frequency band.

10. The storage medium of claim 5, wherein the one or more characteristics of the acoustic environment comprise a number of transient noises detected in a buffer comprising previously recorded audio of the acoustic environment.

11. The storage medium of claim 5, wherein determining the speech recognition suitability value comprises:
   determining a speech recognition suitability vector based on the audio input, wherein the speech recognition suitability vector comprises one or more elements that represent the one or more characteristics of the acoustic environment; and using a neural network to determine the speech recognition suitability value based on the speech recognition suitability vector.

12. The storage medium of claim 1, wherein the instructions further cause the electronic device to:
    display an icon associated with speech recognition;
    receive a user selection of the icon associated with speech recognition;
    in accordance with a determination that the speech recognition suitability value is not less than a threshold value, perform speech recognition on an audio input received subsequent to receiving the user selection; and
    in accordance with a determination that the speech recognition suitability value is less than the threshold value, forgo the performance of speech recognition on the audio input received subsequent to receiving the user selection.

13. The storage medium of claim 1, wherein the output includes a visual representation of the speech recognition suitability value.

14. The storage medium of claim 13, wherein the visual representation comprises one or more bars, and wherein a value of the speech recognition suitability value is represented by a number of the one or more bars.

15. The storage medium of claim 13, wherein the visual representation comprises an icon, and wherein the speech recognition suitability value is represented by a color of the icon.

16. The storage medium of claim 15, wherein the instructions further cause the electronic device to:
    determine whether the speech recognition suitability value is less than a threshold value;
    in accordance with a determination that the speech recognition suitability value is less than the threshold value, display the icon in a grayed out state; and
    in accordance with a determination that the speech recognition suitability value is not less than the threshold value, display the icon in a non-grayed out state.

17. The storage medium of claim 1, wherein the visual representation comprises a textual representation of the speech recognition suitability value.

18. The storage medium of claim 1, wherein the instructions further cause the electronic device to:
    determine whether the speech recognition suitability value is less than a threshold value; and
    in accordance with a determination that the speech recognition suitability value is less than the threshold value, output a message indicating a low suitability of the acoustic environment for speech recognition.

19. An electronic device, comprising:
    one or more processors;
    a memory; and
    one or more programs, wherein the one or more programs are stored in the memory and configured to be executed by the one or more processors, the one or more programs including instructions for:
    receiving speech input from a user;
    determining whether the speech input includes a spoken trigger;
    in response to determining that the speech input includes a spoken trigger, obtaining audio input from an acoustic environment;
    while producing speech recognition results by performing speech recognition on the audio input, determining a speech recognition suitability value based on the audio input; and
    in accordance with a determination that the speech recognition suitability value does not satisfy a predetermined criterion, providing an output to indicate that the acoustic environment is not suitable for performing speech recognition.

20. A method, comprising:
    at an electronic device with one or more processors and memory:
    receiving speech input from a user;
    determining whether the speech input includes a spoken trigger;
    in response to determining that the speech input includes a spoken trigger, obtaining audio input from an acoustic environment;
    while producing speech recognition results by performing speech recognition on the audio input, determining a speech recognition suitability value based on the audio input; and
    in accordance with a determination that the speech recognition suitability value does not satisfy a predetermined criterion, providing an output to indicate that the acoustic environment is not suitable for performing speech recognition.

21. The electronic device of claim 19, wherein the output includes a haptic output.

22. The electronic device of claim 19, wherein the output includes an audio output indicating that the acoustic environment is not suitable for performing speech recognition.

23. The electronic device of claim 19, wherein the programs further include instructions for:
    determining whether an option for determining speech recognition suitability is selected; and
    in accordance with a determination that the option for determining speech recognition suitability is selected, determining the speech recognition suitability value based on the audio input.

24. The electronic device of claim 19, wherein determining the speech recognition suitability value based on the audio input comprises:
    determining one or more characteristics of the acoustic environment based on the audio input; and
    determining the speech recognition suitability value based on the one or more characteristics of the acoustic environment.

25. The electronic device of claim 24, wherein the one or more characteristics of the acoustic environment comprise a signal to noise ratio for a first frequency band of the acoustic environment.

26. The electronic device of claim 25, wherein the one or more characteristics of the acoustic environment comprise a type of noise detected in the first frequency band.

27. The electronic device of claim 25, wherein the one or more characteristics of the acoustic environment comprise a signal to noise ratio for a second frequency band of the acoustic environment.

28. The electronic device of claim 27, wherein the one or more characteristics of the acoustic environment comprise a type of noise detected in the second frequency band.

29. The electronic device of claim 24, wherein the one or more characteristics of the acoustic environment comprise a number of transient noises detected in a buffer comprising previously recorded audio of the acoustic environment.

30. The electronic device of claim 24, wherein determining the speech recognition suitability value comprises:
    determining a speech recognition suitability vector based on the audio input, wherein the speech recognition suitability vector comprises one or more elements that represent the one or more characteristics of the acoustic environment; and
using a neural network to determine the speech recognition suitability value based on the speech recognition suitability vector.

31. The electronic device of claim 19, wherein the programs further include instructions for:
displaying an icon associated with speech recognition;
receiving a user selection of the icon associated with speech recognition;
in accordance with a determination that the speech recognition suitability value is not less than a threshold value, performing speech recognition on an audio input received subsequent to receiving the user selection; and
in accordance with a determination that the speech recognition suitability value is less than the threshold value, forgoing the performance of speech recognition on the audio input received subsequent to receiving the user selection.

32. The electronic device of claim 19, wherein the output includes a visual representation of the speech recognition suitability value.

33. The electronic device of claim 32, wherein the visual representation comprises one or more bars, and wherein a value of the speech recognition suitability value is represented by a number of the one or more bars.

34. The electronic device of claim 32, wherein the visual representation comprises an icon, and wherein the speech recognition suitability value is represented by a color of the icon.

35. The electronic device of claim 34, wherein the programs further include instructions for:
determining whether the speech recognition suitability value is less than a threshold value;
in accordance with a determination that the speech recognition suitability value is less than the threshold value, displaying the icon in a grayed out state; and
in accordance with a determination that the speech recognition suitability value is not less than the threshold value, displaying the icon in a non-grayed out state.

36. The electronic device of claim 19, wherein the visual representation comprises a textual representation of the speech recognition suitability value.

37. The electronic device of claim 19, wherein the programs further include instructions for:
determining whether the speech recognition suitability value is less than a threshold value; and
in accordance with a determination that the speech recognition suitability value is less than the threshold value, outputting a message indicating a low suitability of the acoustic environment for speech recognition.

38. The method of claim 20, wherein the output includes a haptic output.

39. The method of claim 20, wherein the output includes an audio output indicating that the acoustic environment is not suitable for performing speech recognition.

40. The method of claim 20, comprising:
determining whether an option for determining speech recognition suitability is selected; and
in accordance with a determination that the option for determining speech recognition suitability is selected, determining the speech recognition suitability value based on the audio input.

41. The method of claim 20, wherein determining the speech recognition suitability value based on the audio input comprises:
determining one or more characteristics of the acoustic environment based on the audio input; and
determining the speech recognition suitability value based on the one or more characteristics of the acoustic environment.

42. The method of claim 41, wherein the one or more characteristics of the acoustic environment comprise a signal to noise ratio for a first frequency band of the acoustic environment.

43. The method of claim 42, wherein the one or more characteristics of the acoustic environment comprise a type of noise detected in the first frequency band.

44. The method of claim 42, wherein the one or more characteristics of the acoustic environment comprise a signal to noise ratio for a second frequency band of the acoustic environment.

45. The method of claim 44, wherein the one or more characteristics of the acoustic environment comprise a type of noise detected in the second frequency band.

46. The method of claim 41, wherein the one or more characteristics of the acoustic environment comprise a number of transient noises detected in a buffer comprising previously recorded audio of the acoustic environment.

47. The method of claim 41, wherein determining the speech recognition suitability value comprises:
determining a speech recognition suitability vector based on the audio input, wherein the speech recognition suitability vector comprises one or more elements that represent the one or more characteristics of the acoustic environment; and
using a neural network to determine the speech recognition suitability value based on the speech recognition suitability vector.

48. The method of claim 20, comprising:
displaying an icon associated with speech recognition;
receiving a user selection of the icon associated with speech recognition;
in accordance with a determination that the speech recognition suitability value is not less than a threshold value, performing speech recognition on an audio input received subsequent to receiving the user selection; and
in accordance with a determination that the speech recognition suitability value is less than the threshold value, forgoing the performance of speech recognition on the audio input received subsequent to receiving the user selection.

49. The method of claim 20, wherein the output includes a visual representation of the speech recognition suitability value.

50. The method of claim 49, wherein the visual representation comprises one or more bars, and wherein a value of the speech recognition suitability value is represented by a number of the one or more bars.

51. The method of claim 49, wherein the visual representation comprises an icon, and wherein the speech recognition suitability value is represented by a color of the icon.

52. The method of claim 51, wherein the programs further include instructions for:
determining whether the speech recognition suitability value is less than a threshold value;
in accordance with a determination that the speech recognition suitability value is less than the threshold value, displaying the icon in a grayed out state; and
in accordance with a determination that the speech recognition suitability value is not less than the threshold value, displaying the icon in a non-grayed out state.

53. The method of claim 20, wherein the visual representation comprises a textual representation of the speech recognition suitability value.

54. The method of claim 20, comprising:
- determining whether the speech recognition suitability value is less than a threshold value; and
- in accordance with a determination that the speech recognition suitability value is less than the threshold value, outputting a message indicating a low suitability of the acoustic environment for speech recognition.

* * * * *